(12) United States Patent
Arai et al.

(10) Patent No.: US 6,396,950 B1
(45) Date of Patent: *May 28, 2002

(54) INFORMATION PROCESSING METHOD AND APPARATUS

(75) Inventors: Tsunekazu Arai, Tama; Katsuhiko Sakaguchi, Kawasaki; Shigeki Mori, Koshigaya; Kazuhiro Matsubayashi, Yokohama; Takashi Harada, Yokohama; Eiji Takasu, Yokohama; Hiroto Yoshii, Tokyo, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/627,229

(22) Filed: Mar. 18, 1996

Related U.S. Application Data

(63) Continuation of application No. 08/115,518, filed on Sep. 1, 1993, now abandoned.

(30) Foreign Application Priority Data

| Sep. 4, 1992 | (JP) | 4-236806 |
| Sep. 11, 1992 | (JP) | 4-243481 |
| Sep. 16, 1992 | (JP) | 4-246495 |
| Sep. 16, 1992 | (JP) | 4-246499 |
| Sep. 16, 1992 | (JP) | 4-246500 |
| Sep. 16, 1992 | (JP) | 4-246501 |

(51) Int. Cl.$^7$ ................................. G06K 9/00

(52) U.S. Cl. ....................... 382/181; 382/189

(58) Field of Search .............. 382/181, 185–189, 382/209

(56) References Cited

U.S. PATENT DOCUMENTS

| 4,589,142 A | | 5/1986 | Bednar | 382/34 |
| 4,727,588 A | * | 2/1988 | Fox | 382/13 |
| 5,150,424 A | * | 9/1992 | Aguro | 382/13 |
| 5,181,256 A | * | 1/1993 | Kamiya | 382/215 |
| 5,191,622 A | * | 3/1993 | Shojima | 382/13 |
| 5,257,328 A | * | 10/1993 | Shimizu | 382/160 |
| 5,267,327 A | * | 11/1993 | Hirayama | 382/13 |
| 5,319,721 A | * | 6/1994 | Cheialas | 382/13 |

FOREIGN PATENT DOCUMENTS

| EP | 455336 | 11/1991 | G06K/9/22 |
| JP | B6239460 | 9/1980 | |

OTHER PUBLICATIONS

Patent Abstracts of Japan, vol. 15, No. 495 (Kokai 3–214281).
Patent Abstracts of Japan, vol. 12, No. 361 (Kokai 63–111585).
Patent Abstracts of Japan, vol. 15, No. 410 (Kokai 3–166677).
Patent Abstracts of Japan, vol. 14, No. 415 (Kokai 2–159689).
Patent Abstracts of Japan, vol. 15, No. 503 (Kokai 2–207387).
Patent Abstracts of Japan, vol. 13, No. 345 (Kokai 1–103787).

(List continued on next page.)

*Primary Examiner*—Yon J. Couso
(74) *Attorney, Agent, or Firm*—Fitzpatrick, Cella, Harper & Scinto

(57) ABSTRACT

An information processing method including memorizing pattern information, memorizing use information of said pattern information memorized, and displaying said pattern information memorized and said use information of said pattern information.

21 Claims, 76 Drawing Sheets

OTHER PUBLICATIONS

Patent Abstracts of Japan, vol. 14, No. 185 (Kokai 2–032487).

Patent Abstracts of Japan, vol. 13, No. 403 (Kokai 1–145789).

Patent Abstracts of Japan, vol. 15, No. 220 (Kokai 3–062186).

Patent Abstracts of Japan, vol. 13, No. 91 (Kokai 63–165183).

Patent Abstracts of Japan, vol. 10, No. 371 (Kokai 63–273928).

Patent Abstracts of Japan, vol. 11, No. 62 (Kokai 61–226823).

Patent Abstracts of Japan, vol. 13, No. 228 (Kokai 1–037683).

* cited by examiner

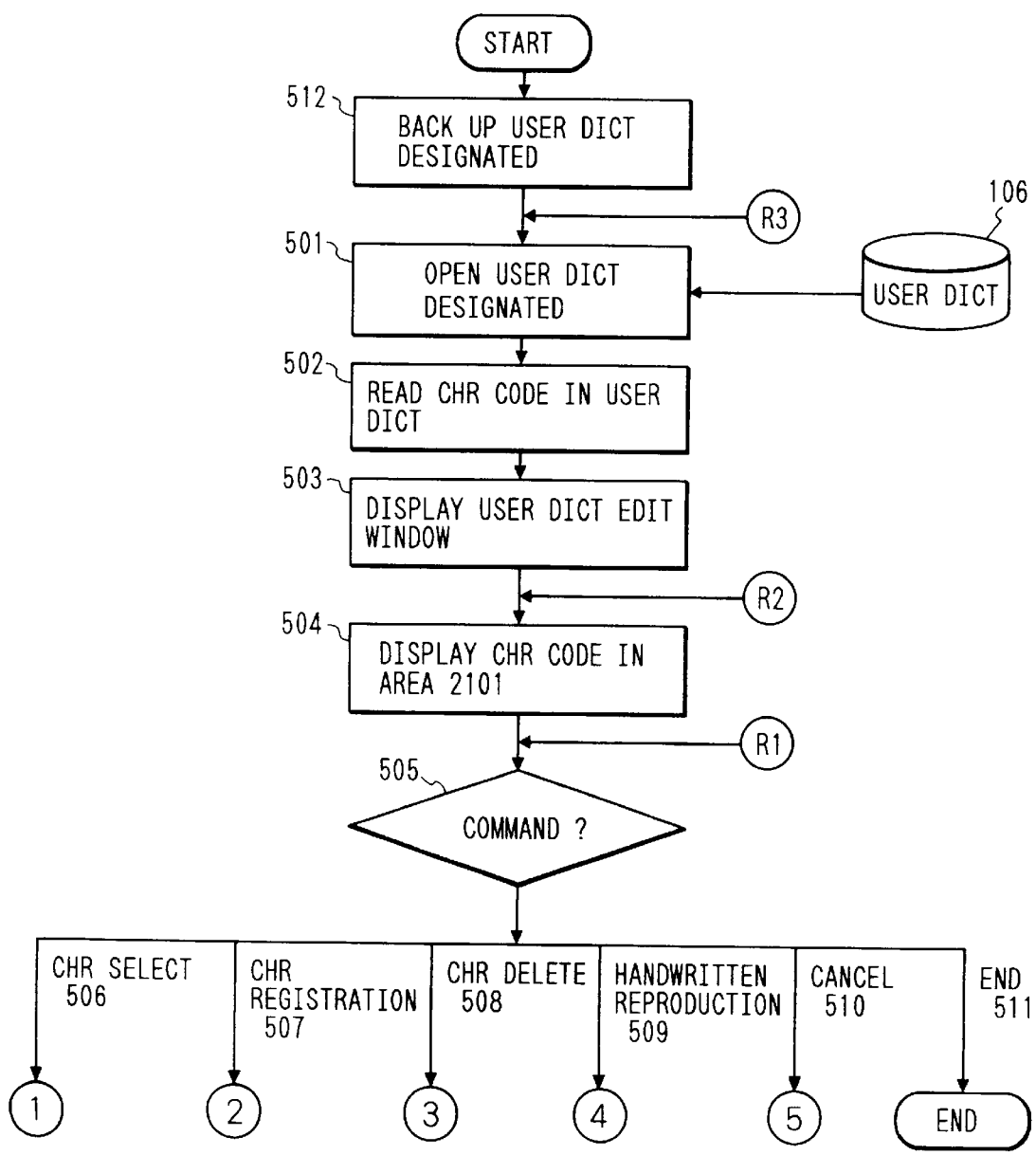

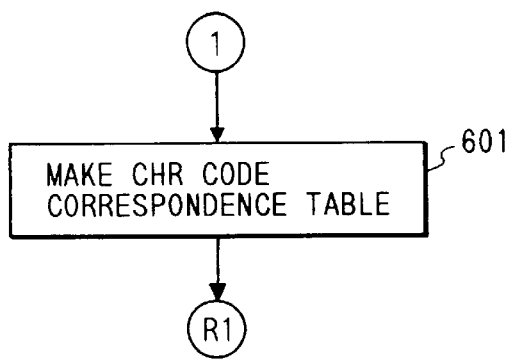
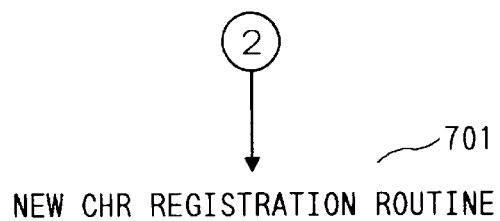
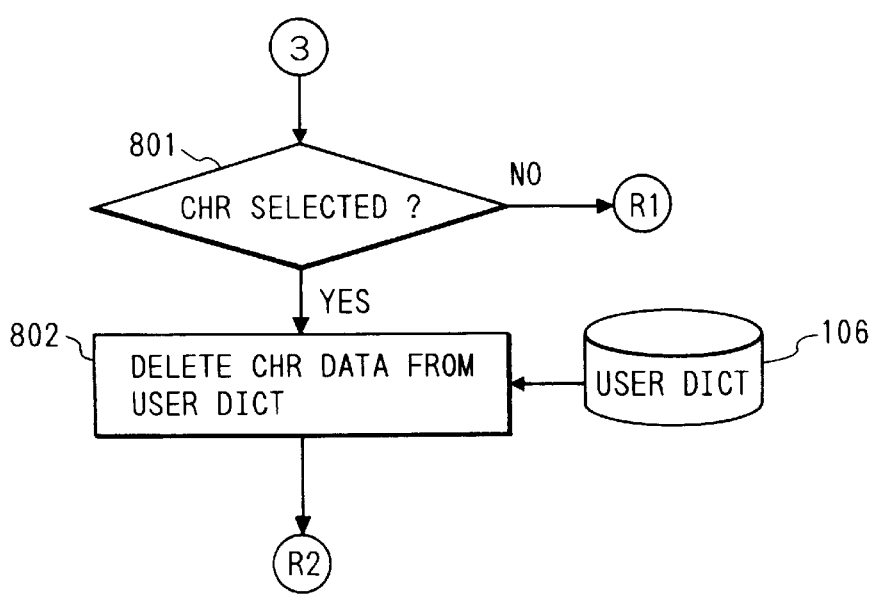

FIG. 24

| 's' | 'a' | 'k' | 'a' | 'g' | 'u' | 't' | 'i' | '¥0' |
|-----|-----|-----|-----|-----|-----|-----|-----|------|
| 'a' | 'r' | 'a' | 'i' | '¥0' | | | | |
| 'h' | 'a' | 'n' | 'a' | 's' | 'i' | 'm' | 'a' | '¥0' |
| 'u' | 'z' | 'u' | 'k' | 'i' | '¥0' | | | |

FIG. 25

| DISPLAY NO. | STORAGE NO. | CHR CODE | USAGE FREQUENCY |
|---|---|---|---|
| 1 | 6 | 0x2422 | 100 |
| 2 | 2 | 0x2526 | 100 |
| 3 | 3 | 0x3544 | 75 |
| 4 | 5 | 0x3962 | 50 |
| 5 | 1 | 0x3f37 | 100 |
| 6 | 4 | 0x5f37 | 20 |

FIG. 46

| DISPLAY NO. | STORAGE NO. | CHR CODE |
|---|---|---|
| 1 | 6 | 0x2422 |
| 2 | 2 | 0x2526 |
| 3 | 3 | 0x3544 |
| 4 | 5 | 0x3962 |
| 5 | 1 | 0x3f37 |
| 6 | 4 | 0x5f37 |

DATA STORED IN BUFFER

PEN DOWN / (x, y) / (x, y) . . .

DATA STORED IN BUFFER +

| | STROKE ORDER | OTHER INFORMATION | | |
|---|---|---|---|---|
| PEN DOWN / (x1, y1) / (x2, y2) . . . | 1 | | | |
| PEN DOWN / (x1, y1) / (x2, y2) . . . | 2 | | | |
| PEN DOWN / (x1, y1) / (x2, y2) . . . | 3 | | | |
| CONTINUED TO THE LAST STROKE | | | | |

| PARTIAL PATTERN | START STROKE | END STROKE | LEFT EDGE | RIGHT EDGE | BOTTOM EDGE | TOP EDGE |
|---|---|---|---|---|---|---|
| 艹 | 1 | 3 | 0 | 8 | 13 | 15 |
| 句 | 4 | 8 | 0 | 8 | 9 | 12 |
| 攵 | 9 | 12 | 9 | 15 | 9 | 15 |
| 馬 | 13 | 22 | 0 | 15 | 0 | 8 |

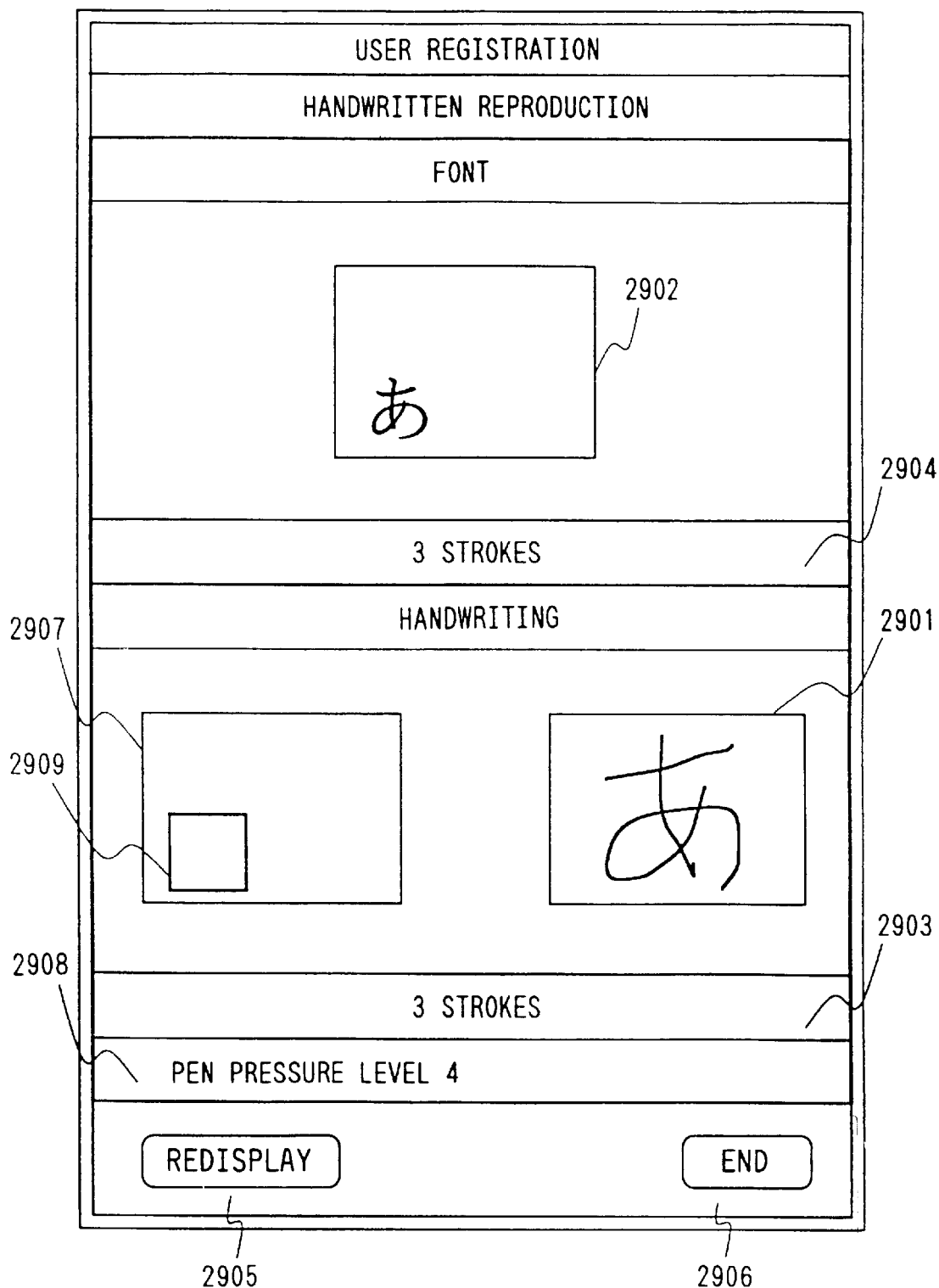

INFORMATION PROCESSING METHOD AND APPARATUS

This application is a continuation of application Ser. No. 08/115,518, filed Sep. 1, 1993, now abandoned.

BACKGROUND OF THE INVENTION

1. Field of the Invention

The present invention relates to an information processing method and apparatus, and particularly, to an information processing method and apparatus which is capable of outputting a recognition result by comparing an input pattern with a dictionary pattern.

2. Related Background Art

Conventionally, information processing apparatuses have been known in which pattern information memorized for recognition purpose can be displayed upon a designation from the user.

However, the conventional apparatuses as above noted had the following drawbacks because the registration pattern was simply displayed in the form of a list.

1) If the user registered numerous character patterns, the use condition of each pattern could not be found although some patterns were registered but unused or forgotten.

2) Though a single character could be registered multiply which may be a character or registered pattern in a basic dictionary, the use condition of each input pattern could not be found.

3) When a plurality of the same patterns were registered in like writing manner, it could not be found which pattern was effective.

Conventionally, character recognition apparatuses have been well known for recognizing an input character based on hand data of the character drawn by handwriting on a coordinate input plane such as an input tablet. Such character recognition apparatuses are provided with a registration function of registering track (hand) data specific to the user of which the recognition ratio will be low, corresponding to a particular character code. Such a registration process is carried out by a special application for registration which is activated fully independently of the process of character recognition input upon the start of the registration process being designated by the user.

Typically, there are largely two cases where the user uses such a registration function. The first case occurs when a subject character is not contained in the dictionary of the recognition device in use, and is newly registered and added thereto. The second case occurs when the track of a character entered by the user is not matched with data of the dictionary provided in the recognition device so that there is a high probability that the character is recognized falsely. In either case, the user has a very high probability that the entered character is not totally recognized or erroneously recognized. Therefore, in this case, the user tries to register the character code corresponding to the track of character to enhance the input efficiency. However, with the conventional method, it was not clear what character the user tried to register until the recognition result for the handwritten character first entered was examined. Also, there was a drawback that the registration processing, which had to be by necessity performed out of the character input mode, not only would cause the user a lot of difficulty to operate, but would also require the same character as in the input process to be entered again in the registration process, whereby the registration might not take effect if there was a large difference between actually input character and registered character.

The present invention has been achieved in the light of the above-described conventional drawbacks, and its object is to provide a character recognition device which allows the character registration to be simply made in the character input operation, and a registration method in the device.

With the above configuration, the subject character is recognized by referring to a dictionary memory, based on the input hand data, and the recognition character candidates thus recognized are displayed. The displayed candidate characters can be registered in the dictionary memory by changing the order of candidates.

Also, according to the invention, the input hand data is memorized, and a character code designating and corresponding to the memorized hand data is registered into the dictionary memory. Thus, it operates so that the subject character is recognized by referring to the dictionary memory based on the input hand data.

Conventionally, handwriting recognition devices have relied on a method in which a registration dictionary for each user (called a user dictionary) is created to enhance the character recognition ratio. With this method, it is indispensable to enter user's hand data into the recognition device, select a standard feature pattern from the hand data, and register it in the user dictionary. Also, some devices may include a function of reproducing the track of the input pattern to allow for the confirmation of the pattern of a character which was registered as the standard feature pattern.

However, the conventional reproduction methods of input patterns involved displaying the track at a constant speed as in the input process, or displaying only the shape of the pattern at a time.

Conventionally, in proper recognition means, when it was desired that the hand data of user's originality, which would not result in any aimed recognition result, be reflected on the recognizing means, a feature of the hand data of the user's originality was stored for registration in a user dictionary, and the character recognition process was performed using the user dictionary to obtain an aimed recognition result. Accordingly, if like hand data was presented by different users, the recognition result was sometimes different in some instances, so that it was necessary to provide a plurality of user dictionaries corresponding to a plurality of users. To this end, when a particular user tried to make character recognition, a method has been used in which a user dictionary is selected by preselecting the user name from a list of user dictionary holders which is displayed on the operation screen for user dictionary switching means, and the user dictionary of the particular user is set, as shown in FIG. 25.

However, with the above configuration, when a plurality of users having the user dictionary registered made use of the same character recognition device alternately, it was necessary to call out the operation screen for executing user dictionary switch means to switch the user dictionary even though the user was engaged in some other application, whereby if there were a great number of user dictionary holders, the selection of the user dictionary resulted in a very troublesome operation.

For example, an on-line character recognition device has been known which can allow the user to confirm which hand data the character stroke information registered in the recognition dictionary is based on in creation by drawing sequentially the character stroke data within the recognition dictionary to reproduce the hand data.

However, the above conventional example had a drawback that since a character was drawn at a constant speed for all the strokes composing the character, a confirmation character made up of a great number of strokes would be time-consuming, and the user desiring the confirmation only for a part of the character might spend a wasteful amount of time.

Conventionally, character recognition devices, particularly, on-line handwritten character recognition devices have involved comparing a character written by the user on a tablet with the recognition dictionary within the character recognition devices and outputting a character code having the highest degree of similarity as the recognition result. However, none of the methods or devices have been publicized having a recognition ratio of 100% with present character recognition techniques.

Therefore, research institutes and companies have made various attempts to suppress the false recognition ratio to a lower value.

One of them includes reproducing the standard pattern of a character stored in the recognition dictionary in practice. This method includes reproducing the hand data by sequentially drawing the character data (coordinate data) within the recognition dictionary, so that the user can cause user's hand data to approximate the standard pattern while referring to reproduced hand data to obtain a higher recognition ratio.

However, in the above conventional example, the character data within the recognition dictionary is usually stored in a normalized state to absorb variations in the actual position and size as input. Hence, when reproducing the character, the information of position and size has been lost, and it was impossible to recognize the original profile or state such as hand speed data.

SUMMARY OF THE INVENTION

As described above, the present invention provides a hand-written character recognition device which is capable of displaying a registered pattern comprehensibly by providing registered pattern usage information memory means and registered pattern memory information display reflector means, wherein when the registered pattern is recognized as a recognition result, the recognition frequency and average recognition score of the character pattern are memorized in registered pattern usage information memory means, and when the display of the registered pattern is designated, the registered pattern usage information is reflected on the display of the registered pattern.

As described above, according to the present invention, the registration process of a character can be simply performed in the character input operation.

As described above, according to the present invention, when a user input character present in the user registration dictionary is reproduced, the color information and sound information are added via track information addition means and track information display means, with the display environments including the display speed made variably by a designation from the user. As a result, detailed information concerning the handwritten pattern can be offered to the user, facilitating the decision as to whether or not the registered hand pattern is valid.

As described above, if the user designates a part of a character pattern displayed, the user is allowed to view that part more concentratively among other character strokes by controlling a partial stroke designated to be displayed at a different speed from the other strokes, resulting in the effect of reducing wasteful time.

As described above, according to the present invention, the hand of the standard pattern can be understood by storing character data useful as the standard pattern without any processing when creating the recognition dictionary, and drawing the character data successively. This allows the user of the character recognition device to write the user's handwritten character more recognizably, thereby giving rise to the learning effect. Also, when the recognition dictionary is a personal user dictionary, the profile of the character registered by the user can be confirmed.

Also, according to an aspect of the invention, since character data is stored in the recognition dictionary in a normalized state, with the addition of the circumscribed frame information of a standard pattern, the profile of the normalized character pattern and the position and profile of an actual character can be simultaneously observed when reproducing the character pattern. Therefore, it is possible to readily make a discrimination between similar characters due to the difference in size and position such as the syllabic nasal often appearing in Japanese characters. This can offer the information for greatly reducing false recognition between similar characters.

The recognition device as discussed above is provided with a character reproducer to inform the user of the character information within the recognition dictionary, whereby the higher recognition ratio in the character recognition the next time is expected.

BRIEF DESCRIPTION OF THE DRAWINGS

FIG. 6 is a flowchart of a user dictionary edit.

FIG. 7 is a flowchart of character selection.

FIG. 8 is a flowchart of character registration.

FIG. 9 is a flowchart of character deletion.

FIG. 24 is a configuration view of a user name file.

FIG. 25 is a configuration view of a registered character code table.

FIG. 46 is a character code correspondence table.

FIG. 87 is a handwritten character reproduction window in accordance with data of FIG. 85.

DESCRIPTION OF THE PREFERRED EMBODIMENT

Embodiment 1

A first preferred embodiment according to the present invention will be now described in detail with reference to FIGS. 1 to 30.

Figure 30:
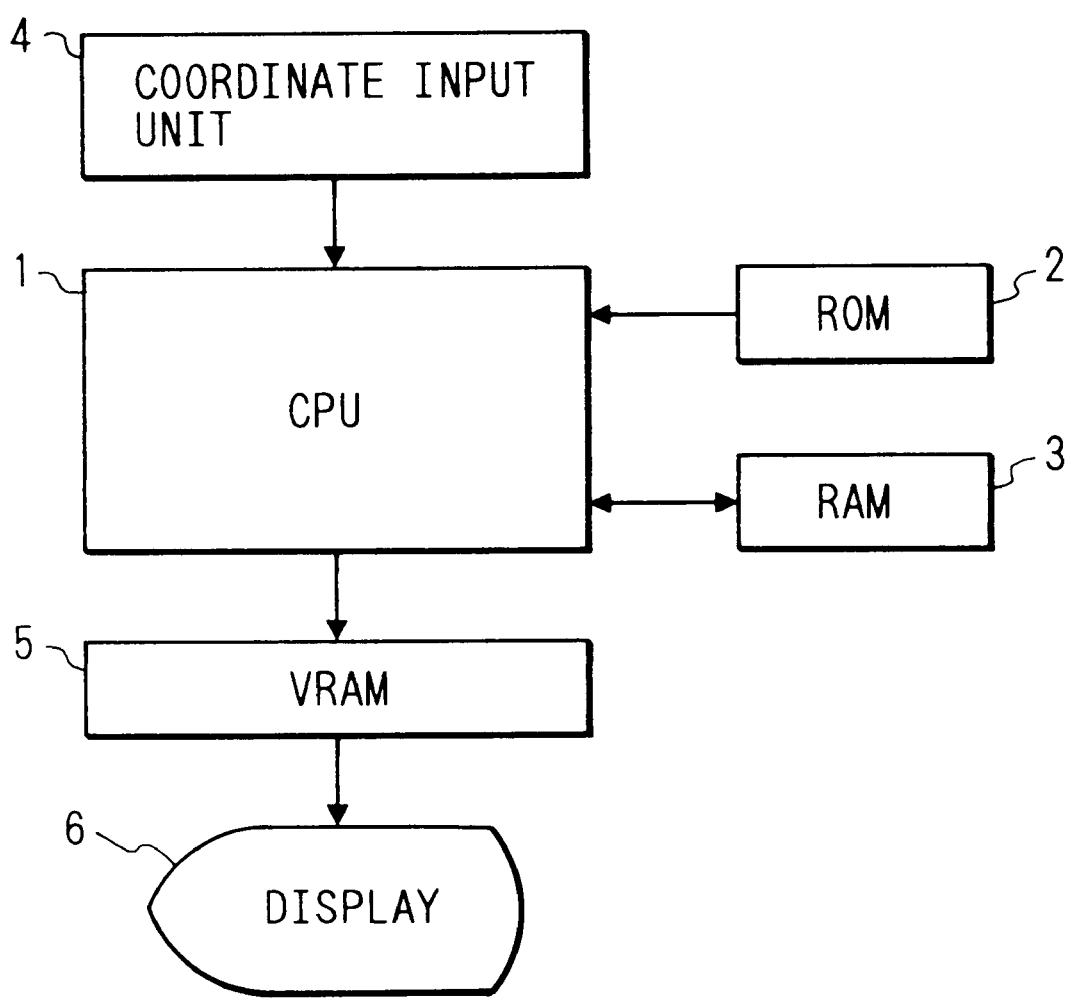
FIG. 30 is a block diagram of an information processing apparatus for carrying out the present invention.

FIG. 30 is a schematic configuration diagram of an information processing apparatus according to one embodiment of the present invention. In the same figure, reference numeral 1 represents a CPU for controlling the whole apparatus, wherein various processings are performed in accordance with programs stored in a ROM 2. Reference numeral 2 represents a ROM for storing a control program, an error processing program, and various programs operating in accordance with the flowcharts as hereinafter described. Reference numeral 3 represents a RAM for use as the work area of various programs and the temporary save area at the time of error processing. In this RAM are stored various data bases, including dictionaries for use with the recognition, as will be described later, a user dictionary 106, a user name index file 107, a character type file 108, and a character standard stroke number data base 109. Reference numeral 4 represents a coordinate input unit having a transparent coordinate input plate, not shown, and a pen, not shown, for designating the position of a coordinate point on the coordinate input plate, wherein electromagnetic induction or ultrasonic vibration is used in detecting the position of the coordinate point. Reference numeral 5 represents a VIDEO RAM (hereinafter referred to as "VRAM") having a memory corresponding one by one to the coordinate point on the coordinate input plate and storing bit information of a coordinate point input on the coordinate input plate or bit information of a dot calculated based on the coordinate point as will be described later. Reference numeral 6 represents a display for displaying bit image based on bit information stored in VRAM 5, wherein this display 6 uses an LCD but may be an EL element or CRT, for example. On this display 6, a variety of windows are displayed.

Figure 1:
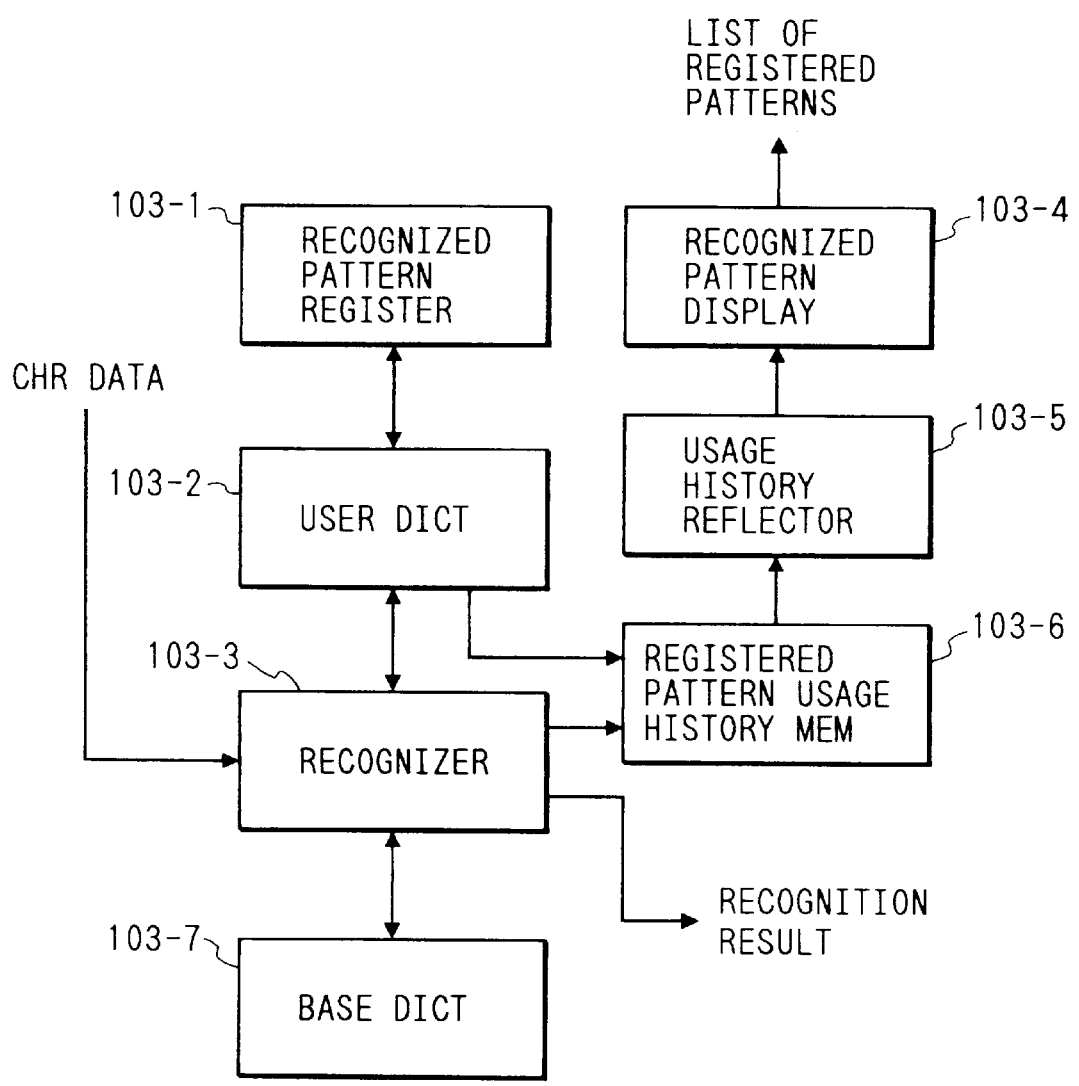
FIG. 1 is a configuration diagram of the main portion in the first embodiment.

FIG. 1 is a configuration diagram representing the configuration of a user registration character recognition process which is a feature of the present invention. In FIG. 1, reference numeral 103-1 represents recognition pattern register means, which corresponds to a new character register 104 in FIG. 2. Reference numeral 103-2 represents a user registration dictionary used by this user registration application. Reference numeral 103-3 represents recognition means for making a recognition using a dictionary registered by this user registration application, the recognition method relies on making a recognition in accordance with a well-known algorithm as described in Japanese Laid-Open Patent Publication No. 62-39460 to transmit the recognized result externally, as well as to registered pattern usage history in memory means 103-6. Reference numeral 103-7 represents a basic dictionary in which character data preregistered in a normal writing format is memorized. Recognition means 103-3 transmits the recognized result using both the basic dictionary and the user registration dictionary. If the display operation of a list of user registered patterns is instructed externally, the usage frequency memorized in 103-6 is added to the data of registration dictionary 103-2 to be transmitted to usage history display reflector means 103-5. Reference numeral 103-5 represents usage history display reflector means for changing the gray scale of character display of a registered pattern, depending on the usage frequency transmitted from 103-6, to transmit a display instruction to registered pattern display means 103-4. Reference numeral 103-4 represents registered pattern display means for displaying a list of user registered patterns as represented by a display example 2102 in FIG. 22 in accordance with an instruction transmitted from 103-5.

Figure 2:
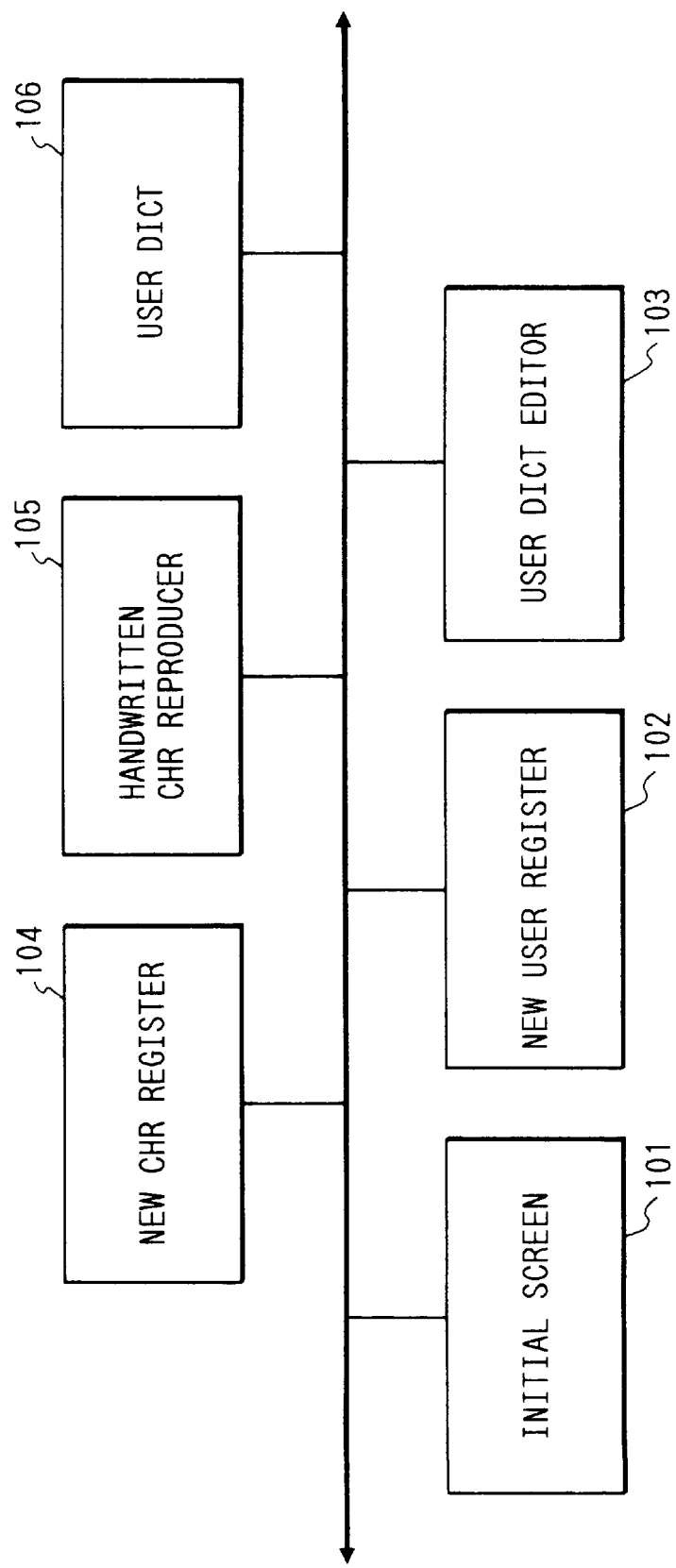
FIG. 2 is a configuration diagram of a user registration recognition device in the first embodiment.

FIG. 2 is a configuration block diagram of a user registration application in which the present invention is comprehended. Reference numerals 101 to 106 represent units each serving as a functional element of user registration in the on-line character recognition, the units being classified into a window application execution section with GUI (Graphical User Interface) and a user dictionary section. A list of registered patterns with the usage frequency characteristic of the present invention reflected therein is displayed by user dictionary editor 103 in FIG. 2. The whole of actual user registration will be described below.

Figure 22:
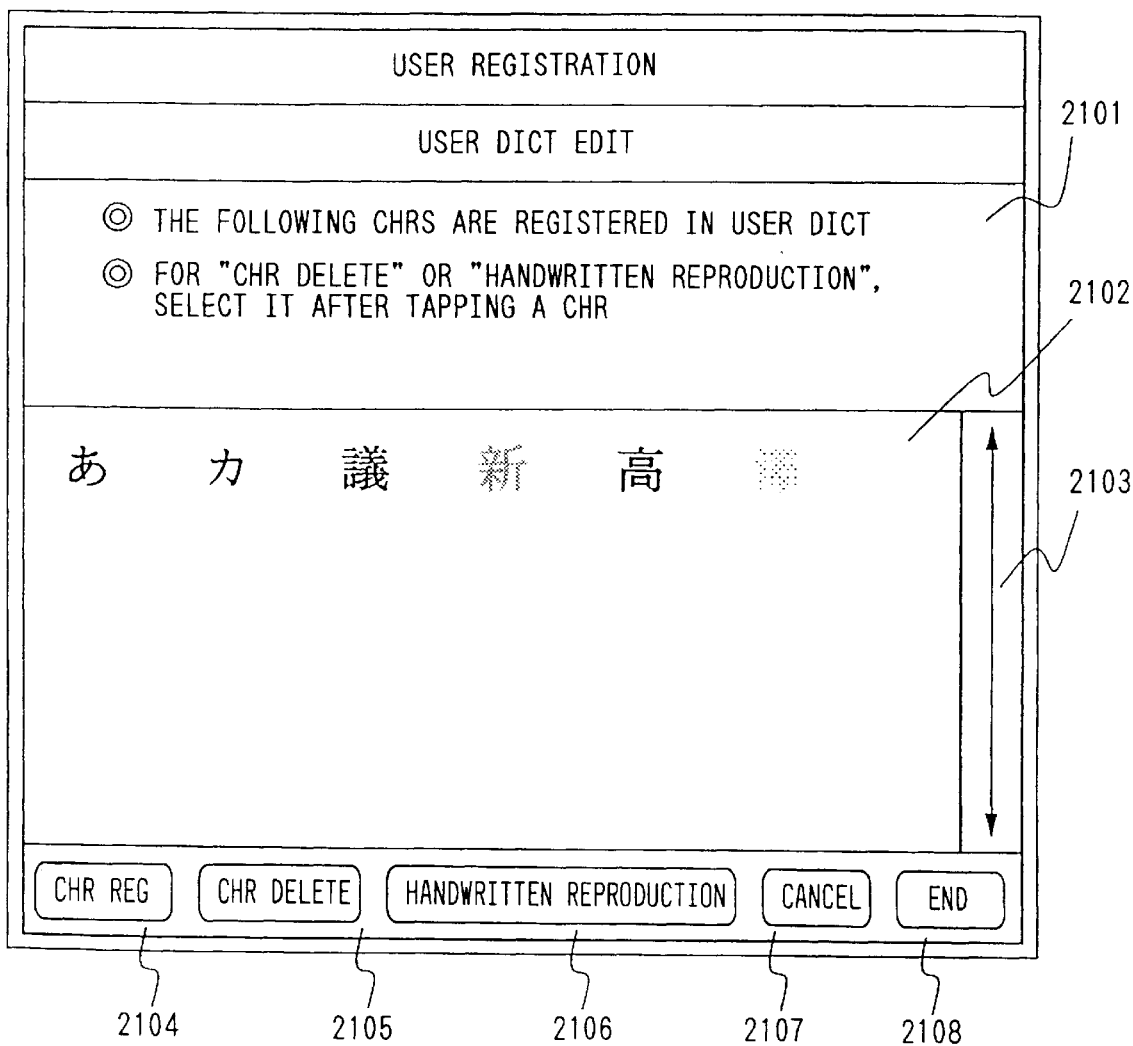
FIG. 22 illustrates a user dictionary edit screen.

Initial screen 101 allows for the display of the list of registered users, and the confirmation for the owner of the user dictionary presently set. It has other functions including designating the transfer to either the mode of newly registering the user or the mode of editing a registered character within the user dictionary. New user register 102 effects the registration of the new user. User dictionary editor 103 displays the list of characters within the user dictionary, and allows for the designation of, deletion or handwritten reproduction for each character. This list of characters is shown in FIG. 22. When displaying this list, the usage frequency of the user registered character pattern characteristic of the present invention is reflected on the display of the character pattern, and as will be seen from FIG. 22, so that the character with high usage frequency is displayed at a dense gray scale, while the character with low usage frequency is displayed at a sparse gray scale.

Also, it includes a designating function for newly registering the character handwritten by the user. New character register 104 carries out the character registration designated at the previous stage 103. Handwritten character reproducer 105 draws or reproduces the registered character designated at the previous stage 103 in the hand order. User dictionary 106 stores information of registered characters to implement the above functions. Herein, a plurality of users own different user dictionaries.

Figure 3:
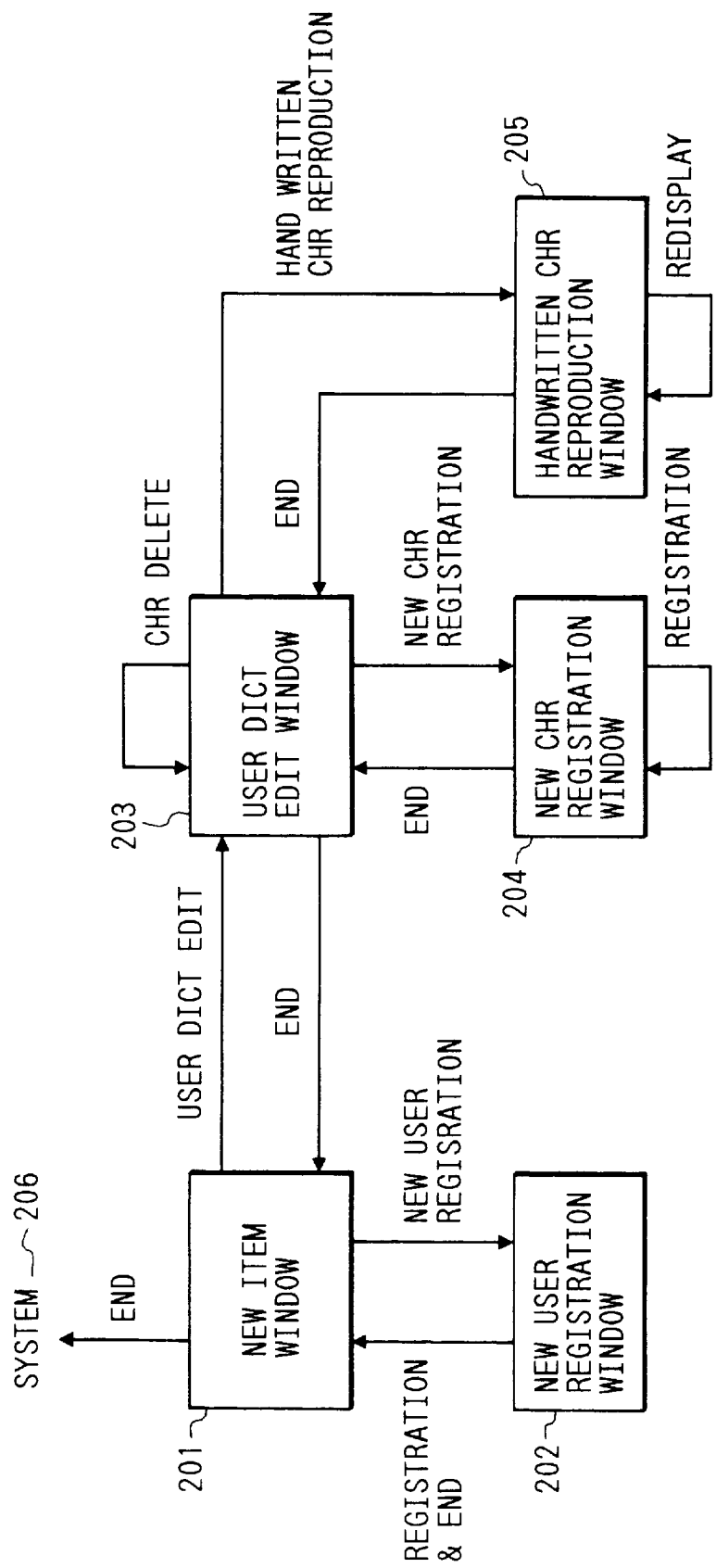
FIG. 3 is a window state transition diagram of the user registration recognition device in the first embodiment.

FIG. 3 is a window state transition diagram of user registration application. Reference numerals 201 to 205 represent windows each executing the above function, and reference number 206 represents a system to which the control is returned when this user registration application is ended. The arrows in the figure indicate the flow of control command with the button control in each window. The flow of control command and the transition of windows will be described below.

If a "new user registration" command is issued in a new item window 201, a new user registration window 202 appears newly in the form of a pop-up window. If a "registration & end" command is issued in the new user registration window 202, this pop-up window disappears, and the control is returned to the new item window 201. If a "user dictionary edit" command is issued in the new item window 201, the new item window 201 disappears, and a user dictionary edit window 203 appears newly. Herein, if a "new character registration" command is issued, a new character registration window 204 appears in the form of a pop-up window. The character registration operation on this window can be repeatedly executed unless an "end" command is issued. If the "end" command is instructed after the character is registered, the new character registration window 204 disappears, and the control is returned to the user dictionary edit window 203. A "character delete" command can be executed plural times in the user dictionary edit window 203. Further, if a "handwritten reproduction" command is issued, a handwritten character reproduction window 205 appears in the form of a pop-up window. At the same time when the window is displayed, the reproduction is started, whereby the use of a "redisplay" command allows for the redisplay repetitively. The handwritten character reproduction window disappears by issuing the "end" command, and the control is returned to the user dictionary edit window. If the "end" command is issued in the user dictionary edit window 203, the window of its own disappears and the new item window 201 appears again. Accordingly, it is only when the "end" command is issued in the initial item window 201 that the user registration application can be ended.

Note that the number of windows in the user registered application is two when the pop-up window of windows 202, 204 or 205 appears, and one when the pop-up window of window 201 or 203, appears, as described above.

Figure 4:
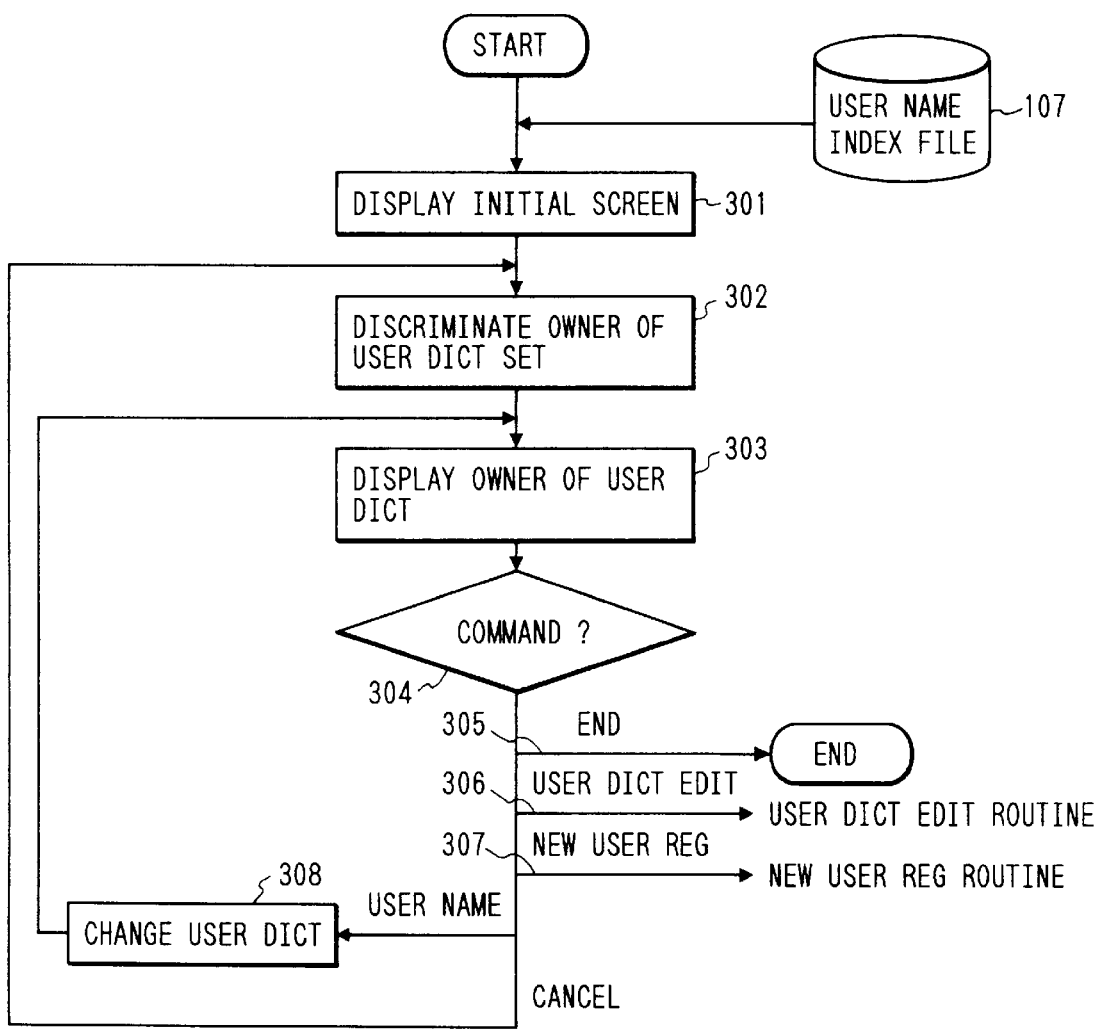
FIG. 4 is a flowchart of the overall user registration.

The details of the function in each window and the process flow will be now described with reference to the drawings of FIG. 4 and beyond.

Figure 18:
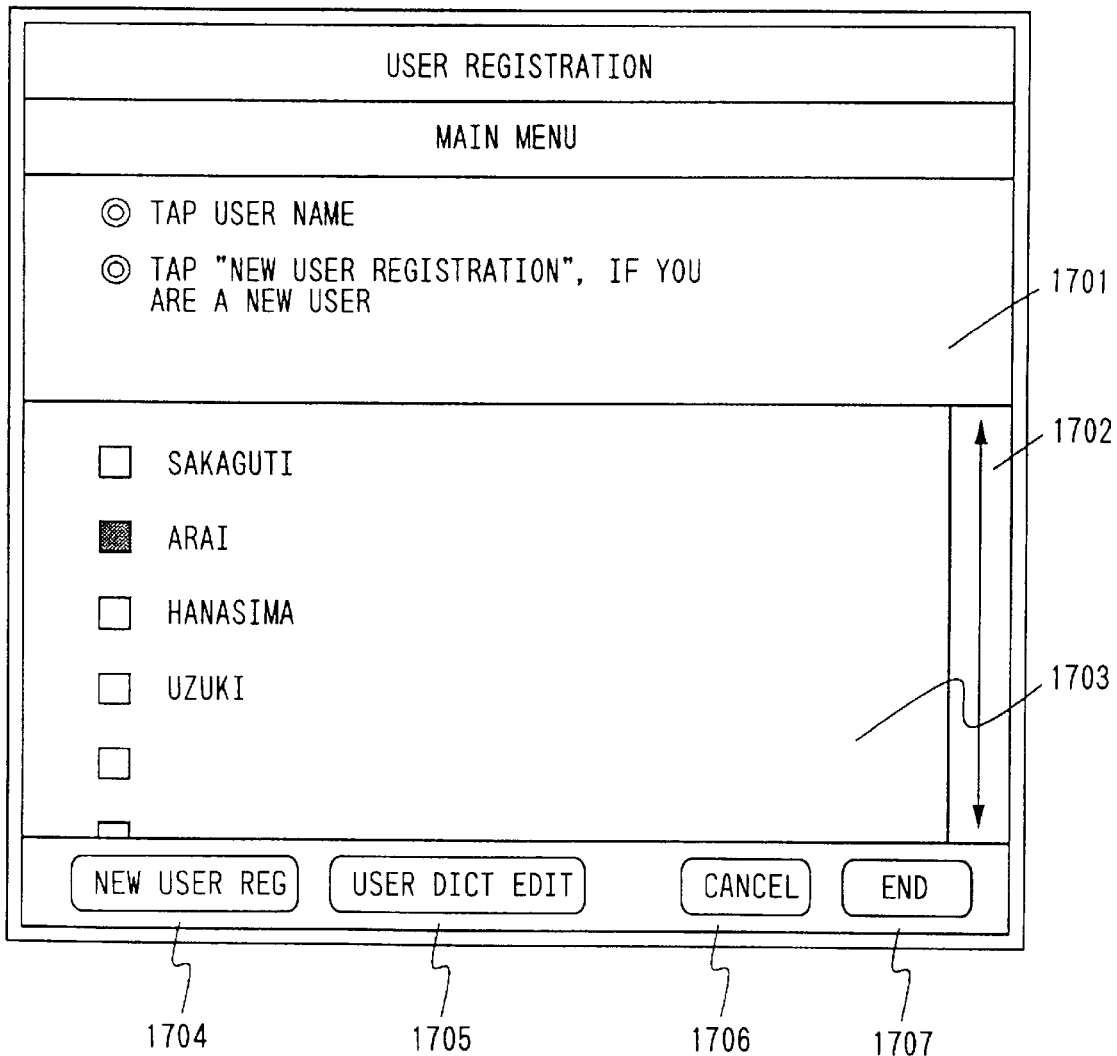
FIG. 18 illustrates a user registration screen.

First, the process flow in the initial item window will be described using FIG. 18 and a flowchart of FIG. 4. In FIG. 18, reference numeral 1701 represents a message display area, reference numeral 1703 represents a user name list display and user dictionary owner display area, reference numeral 1702 represents a scroll bar for use when registered users can not be accommodated within one screen, and reference numerals 1704 to 1707 represent buttons for calling a function by a pen tap. The present invention uses a combination of a liquid crystal and a coordinate input means with a pen. This can be replaced with a coordinate input unit comprised of a CRT and a mouse. In this case, the pen tap is replaced by the click of a mouse switch.

If the user registration application is started, a window is created at step 301, whereupon a registered user name is read from a user name index file 107. This user name index file is a disk file having a structure as shown in FIG. 24, and which is readable and writable. The created window is as shown in FIG. 18. At step 302, the owner of a user dictionary set in the system is discriminated. If the owner is discriminated, the user who is an owner of the user dictionary is marked in the user name display area 1701 at step 303. For example, the user whose user name is "Arai" is an owner in FIG. 18. If the processing up to this point is ended, the procedure waits for a command instruction by the user at step 304. If the user name is selected directly by a pointing device such as a pen, the change of the owner of the user dictionary is demanded to the system at step 308 to change the setting. For other operations with the button command, if a "user dictionary edit" button 1704 is depressed (306), the control is transferred to a user dictionary edit routine, if a "new user registration" button 1705 is depressed (307), the control is transferred to a new user registration routine, and if a "cancel" button 1706 is depressed, the setting change of the user dictionary with the user name selection as performed before this point is invalidated, and the user dictionary setting is restored to the state before starting the application. If an "end" button 1707 is depressed (305), this user registration application is ended, and the control is returned to the system.

Figure 5:
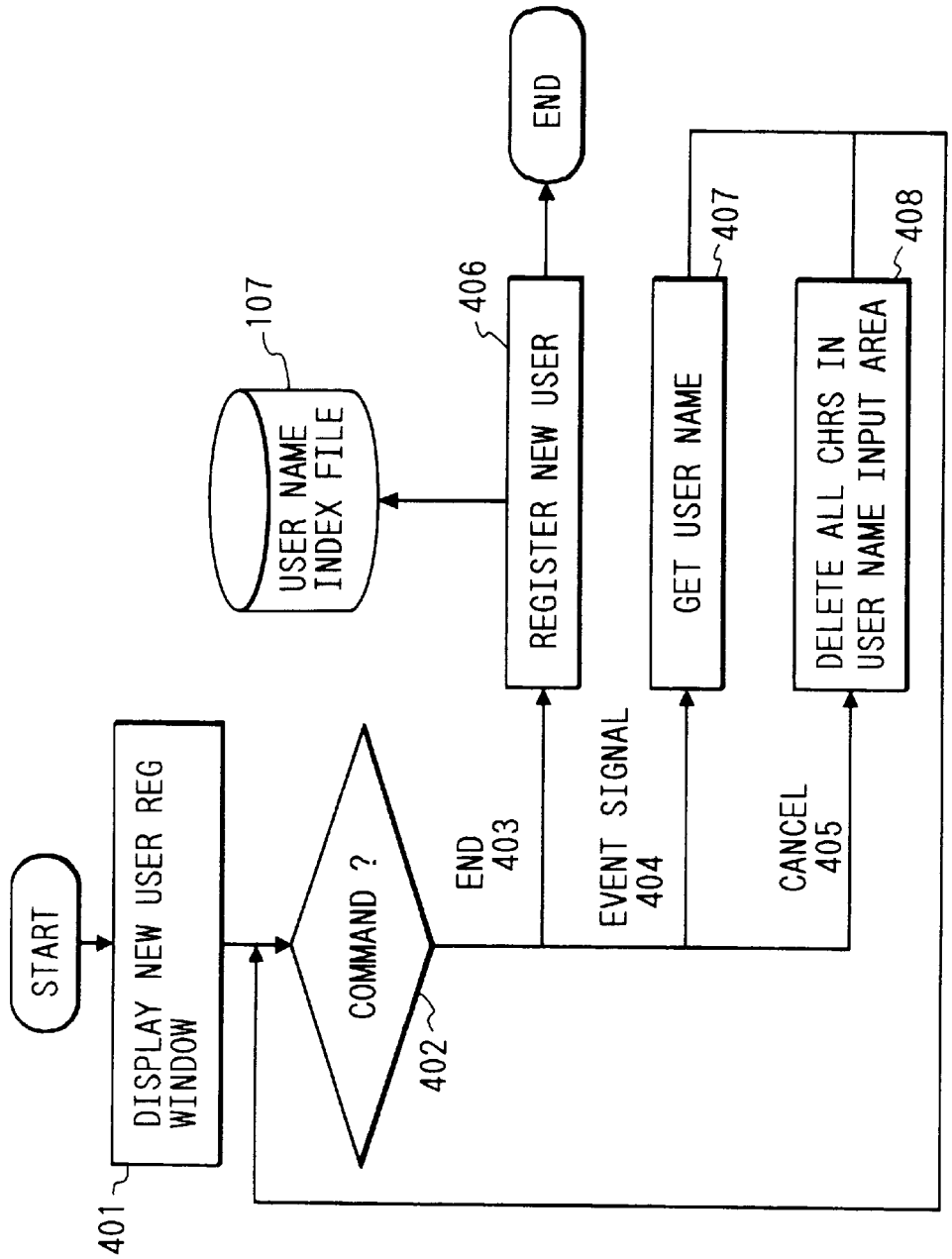
FIG. 5 is a flowchart of a new user registration.
Figure 10:
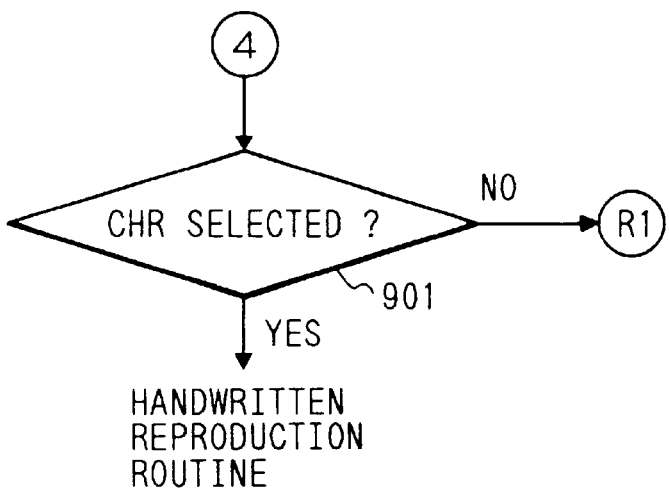
FIG. 10 is a flowchart of handwriting reproduction.
Figure 11:
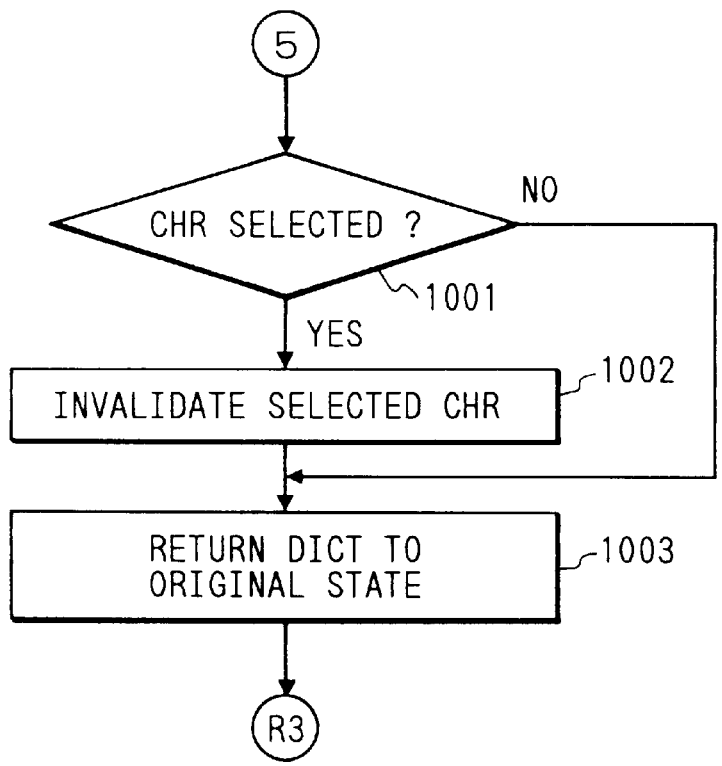
FIG. 11 is a flowchart of a cancel process.
Figure 19:
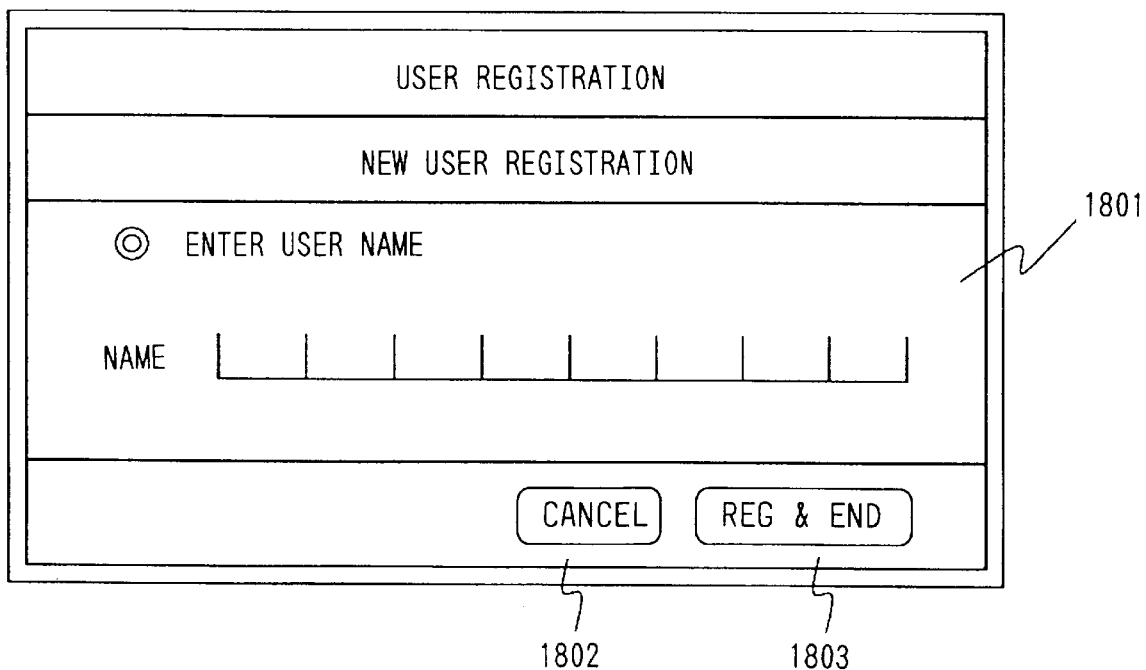
FIG. 19 illustrates a new user registration screen.

The process flow in the new user registration window will be described below with reference to FIG. 19 and a flowchart of FIG. 5. In FIG. 19, reference numeral 1801 represents a user name input area for inputting the user name, reference numeral 1802 represents a cancel function button for canceling the input of a user name, and reference numeral 1803 represents a registration & end function button for registering the input user name and ending this window.

If a "new user registration" command 1704 in the previous initial item window is instructed, a pop-up window as shown in FIG. 19 is displayed (401). Then, the operation is placed in a wait state for a command to be instructed by the user. In the event a signal by a pen-down operation is detected in a user name input area 1801 (404), an existing recognition routine is called. This routine subjects a character hand drawn in the user name input area to the on-line character recognition process to convert character data to character code (407). If a "registration & end" button command 1803 is instructed, the user name input and converted in the user name input area is determined as a new user name which is then additionally registered to the user name index file 107 (406). Thereafter, the current window is erased, and the control is returned to the initial item window again. On the other hand, if a "cancel" button command 1802 is instructed, the characters entered into the user name input area are all deleted (408), and the operation is placed again in a wait state for a user name input command.

The process flow in the user dictionary editor will be described below with reference to FIG. 22 and a flowchart of FIG. 6. In FIG. 22, reference numeral 2101 represents a message display area, reference numeral 2102 represents a registered character list display area characteristic of the invention, reference numeral 2103 represents a scroll bar which allows more registered characters to be displayed, and reference numerals 2104 to 2108 represent function calling buttons actuatable by a pen tap. As will be seen from FIG. 22, the usage frequency of registration pattern can be known at a glance by virtue of the depth of the character display.

If a "user dictionary edit" button 1705 is depressed, a user dictionary 106 designated is copied and stored separately (512). This provides for a back up copy if the dictionary edit operation is canceled. Then, the user dictionary is opened to read character codes within the user dictionary into a buffer area (502). Herein, to make characters within the user dictionary to correspond to displayed characters, one to one, a character code correspondence table is created (601 in FIG. 7). For example, when six characters are registered, the correspondence table is as shown in FIG. 25.

In FIG. 25, the column next to the character code is an area for memorizing the character pattern usage frequency. This character code correspondence table is created because if a multiplicity of dictionary character data with the same character code exist, the retrieval of dictionary data is not allowed uniquely only with the information of character code in the editing of character with the "delete" or "reproduce" command. The user dictionary edit window as illustrated in FIG. 22 is displayed based on this character code correspondence table (503).

At step S504 in FIG. 6, a character code read is displayed in the registered character list display area 2101, while the gray scale of the character on the display is changed depending on the value of the usage frequency stored in the memory area as illustrated in FIG. 25. The gray scale is 100% if the usage frequency is 90 or greater, 75% if the usage frequency is from 75 to 90, 50% if the usage frequency is from 50 to 75, and 25% if the usage frequency is below 50. In an example of FIG. 25, characters "あカ茗" having a usage frequency of 100 are displayed at a gray scale of 100%, a character "城" having a usage frequency of 75 is displayed at a gray scale of 75%, a character "衦" having a usage frequency of 50 is displayed at a gray scale of 50%, and a character "豢" having a usage frequency of 20 is displayed at a gray scale of 25%, as illustrated in FIG. 22.

Figure 26:
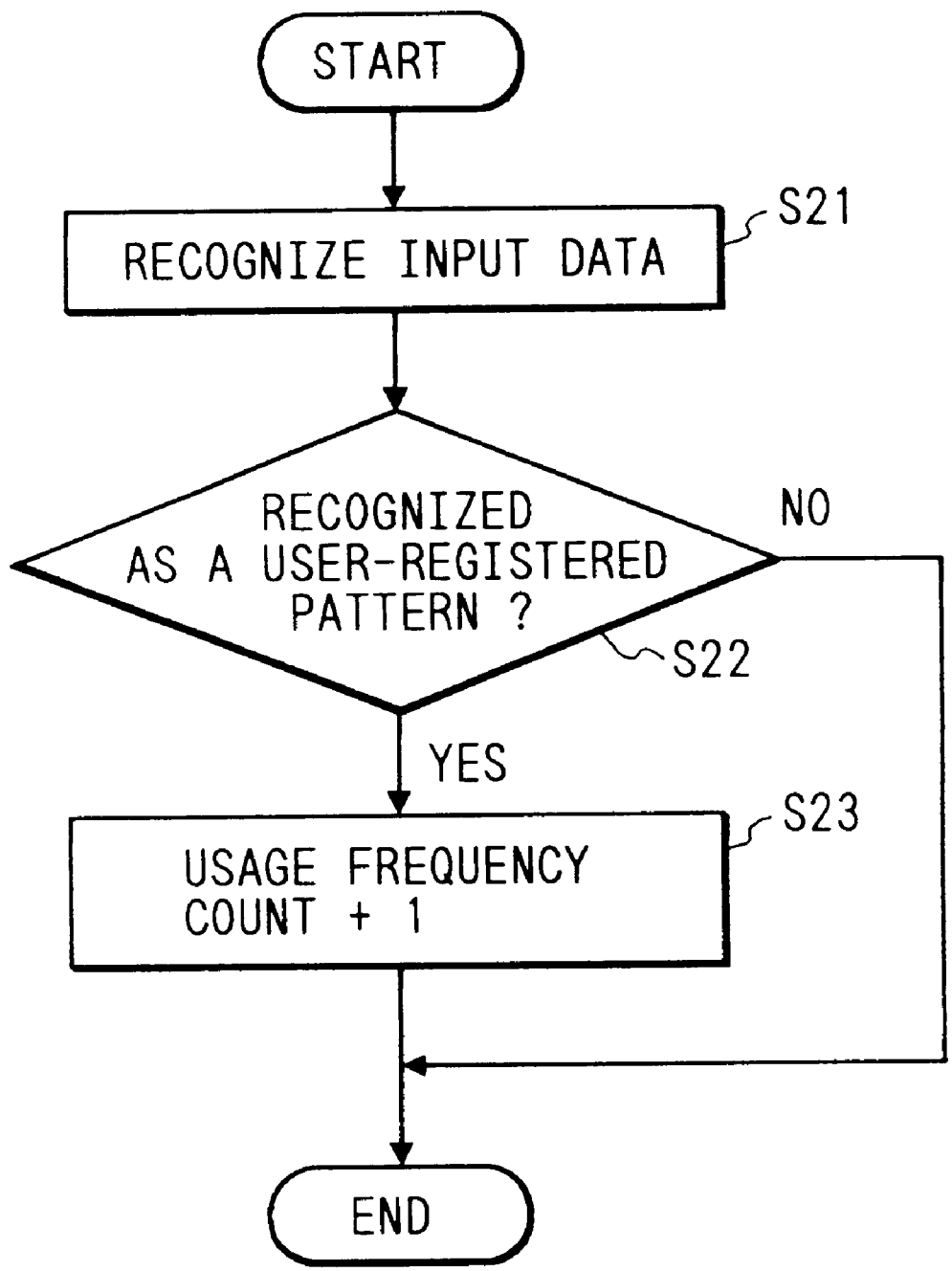
FIG. 26 is a flowchart of usage frequency memory process.

The setting process of the usage frequency will be now described along with a flowchart of FIG. 26. At step S21, input stroke data is recognized in accordance with a conventionally known algorithm as described in Japanese Laid-Open Patent Publication No. 62-39460, and using a user registered dictionary 103-2 and a basic dictionary 103-7 as illustrated in FIG. 1, so that a character code is output as the recognition result.

Next, at step S22, a discrimination is made to see whether or not the recognition result is a user registered pattern. For example, where "あカ城緊急隊" is registered in the example, if "あ" is input and recognized as a registered pattern "あ", the program proceeds to step S23, or if it is recognized as a basic dictionary pattern "あ", the frequency memory process of user registered dictionary pattern is ended.

At step S23, frequency information of the user registered pattern in the usage frequency memory area is incremented. This is simply accomplished by counting one once the registered pattern is used. That is, if "あ" is input and recognized as "あ" in the user registered it pattern, the value of user registered pattern "あ" in the usage frequency memory area is incremented. In FIG. 25, value 100 located next to value 0x2422 in the first row is counted to obtain 101. However, the usage frequency used in practice is different depending on the character. Since the usage frequency of "あ" is high t and that of "緊" is low, it is necessary that the relative actual usage frequency may be set in consideration of such situation. The value of the usage frequency memorized divided by (the cumulative character recognition number multiplied by the value of the character usage frequency) is reflected as the actual usage frequency on the display. Therefore, the rarely used character will reach a usage frequency of 100, as illustrated in FIG. 25, if adapted several times, while a character which will be at least once written in ten characters is prevented to reach a usage frequency of 100 unless adapted 10 times after 100 times of recognition has been made.

Thereafter, the operation is placed in the wait state for a command instructed by the user (505). If a signal by a pen down operation is detected in the registration character list display area, a character located by a pen down operation is selected (506). The display number on the character code table is obtained from positional information of the selected character. The storage location of the dictionary character data practically stored in the user dictionary is determined from its display number to obtain dictionary character data to be edited. If a "character registration" button command 2104 is designated (507), the control is transferred to a new character registration routine (701 in FIG. 8). If a "character delete" button command 2105 is designated (509), a discrimination is made as to whether or not the character in the registered character list display area is selected (801 in FIG. 9). If not selected, the operation returns to the wait state for a command instruction (505). If already selected, the dictionary data storage area of the character to be deleted is located using the character code correspondence table as previously noted. When it is found, the dictionary character data stored in the actual user dictionary is deleted (802). At the same time when the content of user dictionary 106 is changed, the character code correspondence table is also changed to update the character display of registered character list display area (504). If a "handwritten reproduction" button 2106 is depressed (509), the control is transferred to a handwritten reproduction routine when there is a character selected, or the operation is placed in the wait state for a character to be selected when there is no character selected (901). If a "cancel" button command 2107 is designated (510), a discrimination is made as to whether or not the character in the registered character list display area is selected (1001 in FIG. 11). If any character is selected, the character is invalidated, the display is placed in a character unselected state (1002), and the content of the registered dictionary is restored to the original state before starting the dictionary edit window (1003). With this operation, the editing is enable to restart. An "end" button command 2108 erases this user dictionary edit window, and returns the control to the previous initial item window.

Figure 12:
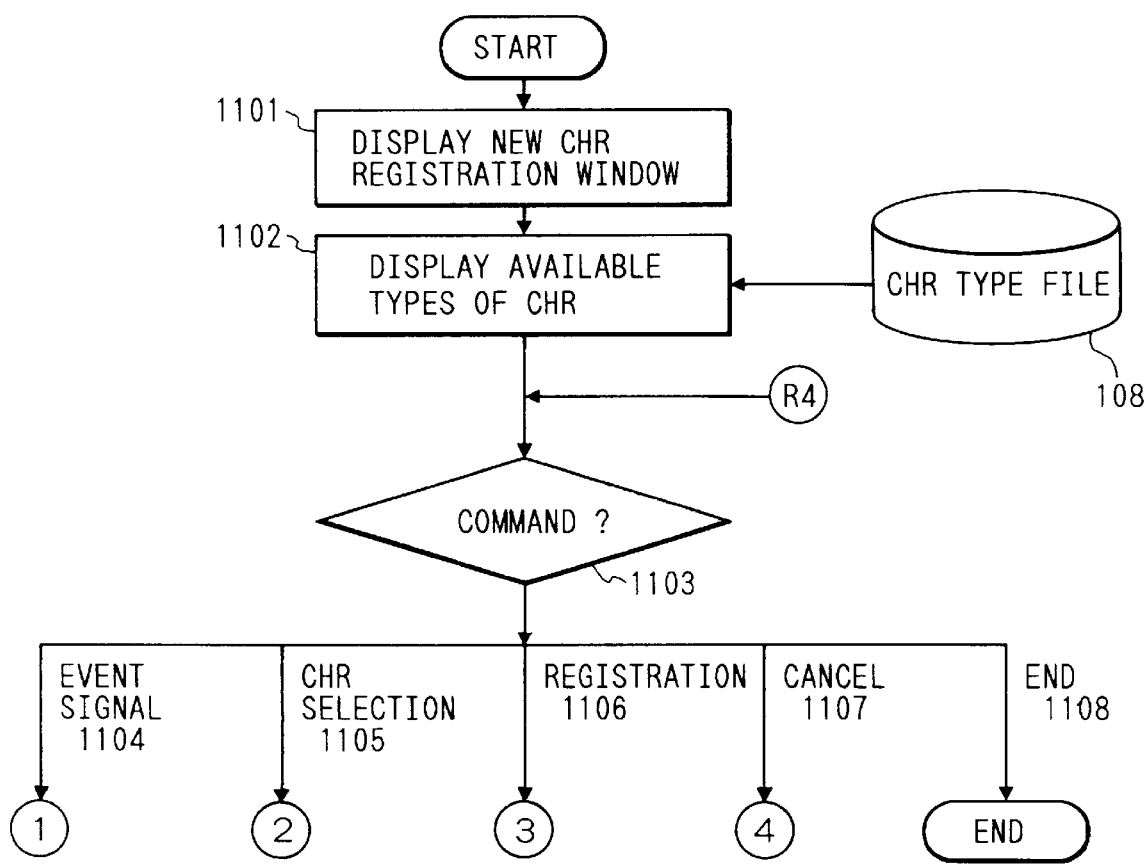
FIG. 12 is a flowchart of new character registration.
Figure 13:
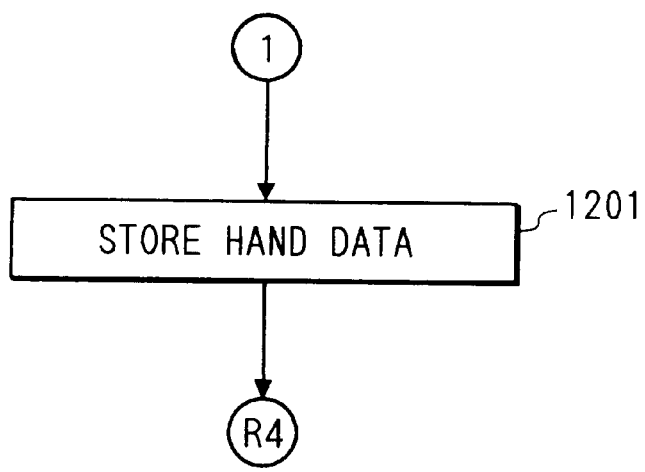
FIG. 13 is a flowchart for memorizing character hand data.
Figure 14:
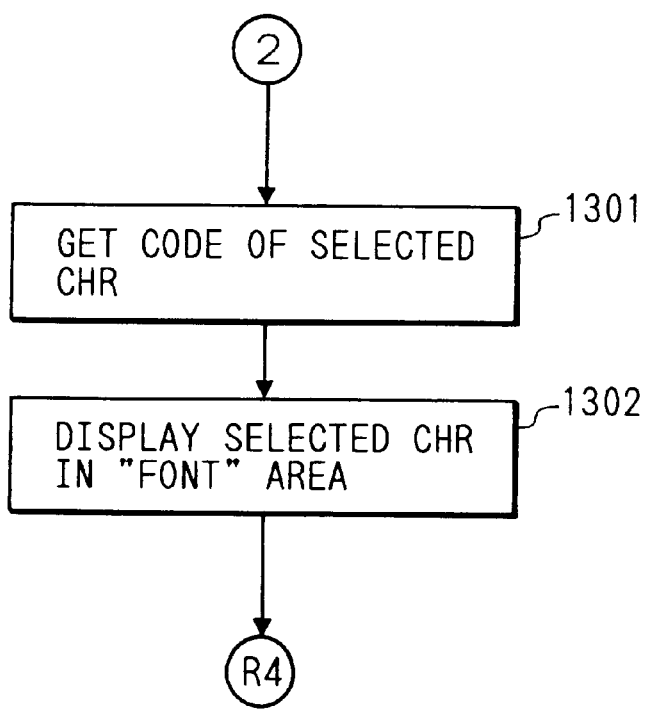
FIG. 14 is a flowchart of character selection in the new character registration.
Figure 15:
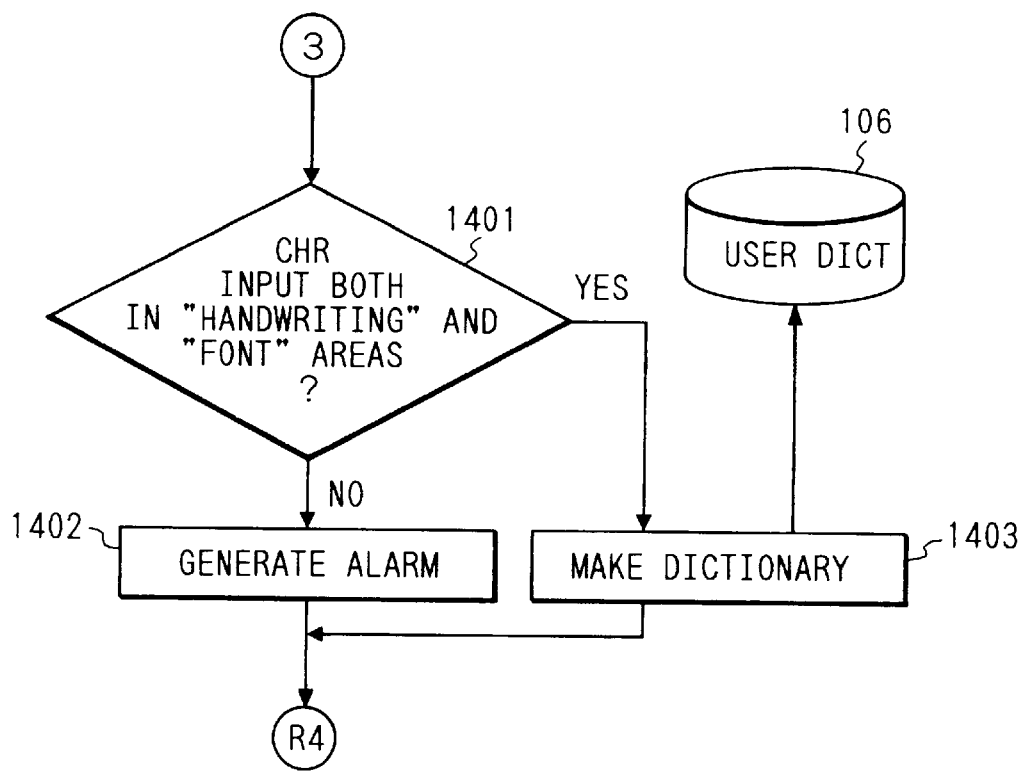
FIG. 15 is a flowchart of character registration in the new character registration.
Figure 16:
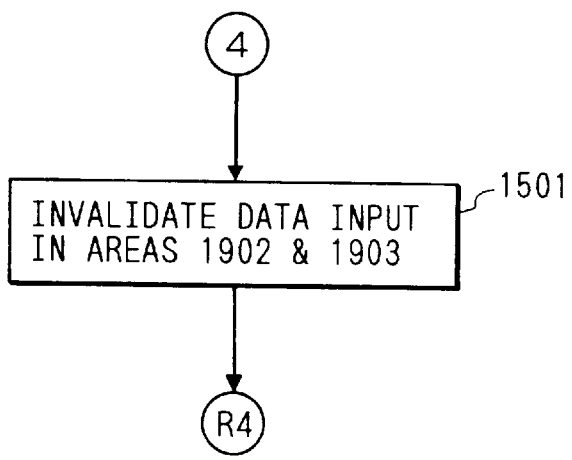
FIG. 16 is a flowchart of a cancel process in the new character registration.
Figure 20:
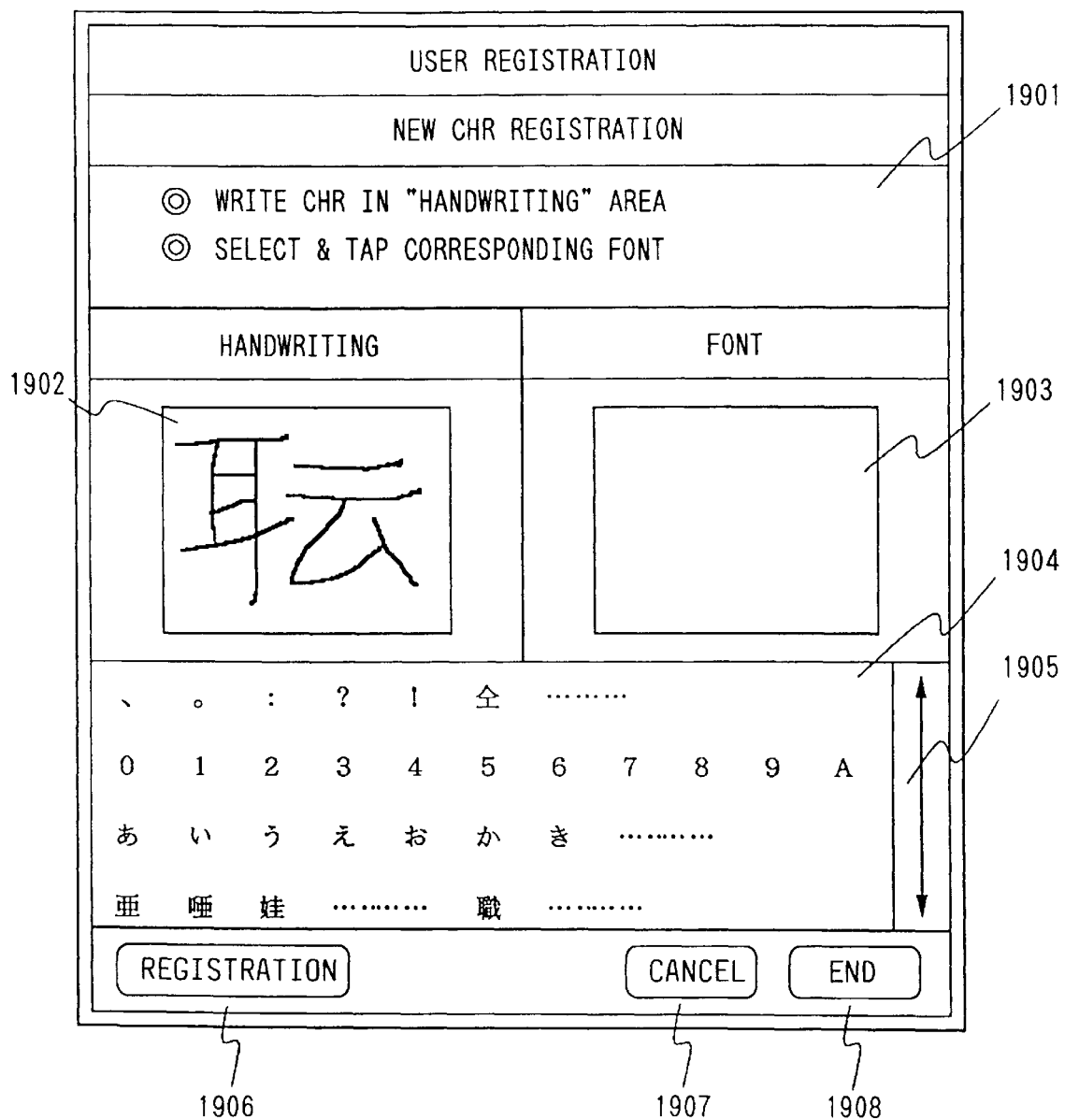
FIG. 20 illustrates a new character registration screen (before character selection).
Figure 21:
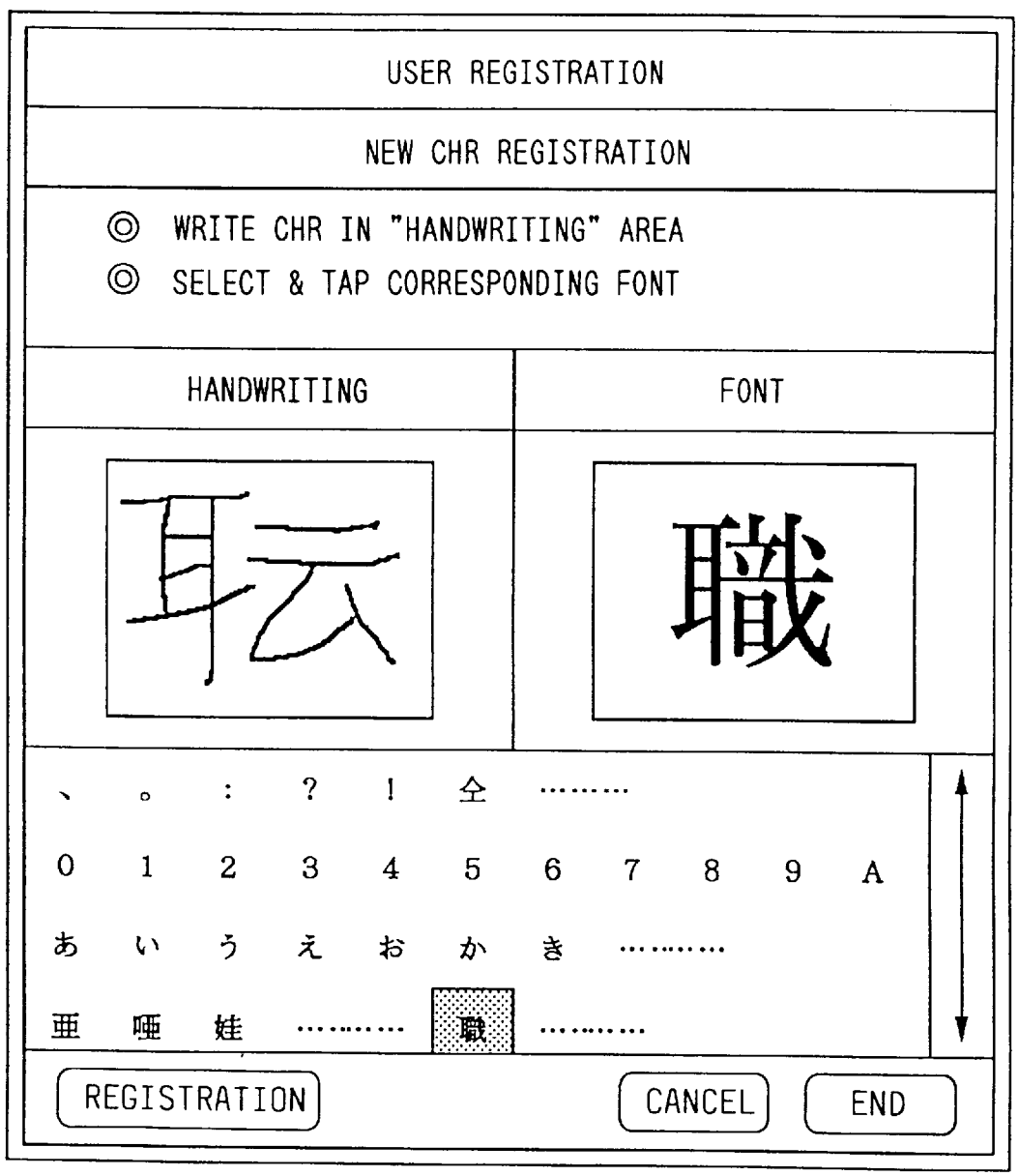
FIG. 21 illustrates a new character registration screen (after character selection).

The process flow of a new character register operation will be described below using FIGS. 20 and 21 and a flowchart of FIG. 12. In FIG. 20, reference numeral 1901 represents a message display area, reference numeral 1902 represents a handwritten character input area, reference numeral 1903 represents a font character input area, reference numeral 1904 represents an input code list area, reference numeral 1905 represents a scroll bar which allows more character codes to be displayed, and reference numerals 1906 to 1908 represent function calling buttons actuatable by a pen tap.

If a "character registration" 2104 is designated in the previous user dictionary editor, a skeleton of a screen as illustrated in FIG. 20 is created for the display in the form of pop-up window (1101). By the character registration herein used is meant a task for assigning character data by a user's original handwriting to a corresponding character code. Hence, a data input area for acquiring user's handwritten data and a character code input area corresponding thereto are necessary, wherein "handwritten" column 1902 is a handwritten data input area and "font" column 1903 is a character code input area, as illustrated in FIG. 20. Reference numeral 1904, located centrally downward in FIG. 20, represents an input code list for inputting the character code, the character code being input by selecting it from the list. Accordingly, the registerable character types must be displayed in the input code list, for which it is necessary that a character type file 108 storing the registerable character types is created (1109). The registerable character types are displayed by reading this file (1102). If this display is ended, the operation waits for a command instruction from the user (1103). If a pen down input signal input by the user is detected in the "handwritten" column, its hand data is stored as a set of two-dimensional coordinates in a buffer area (1201 in FIG. 13), and drawn in the "handwritten" column at the same time. FIG. 20 illustrates a state where the user has entered a handwritten pattern corresponding to "幾" as indicated at 1902. The input of a corresponding character code is performed in such a manner as to select a character code from the input code list, temporarily store it in the buffer area, and then get it (1301 in FIG. 14). The selected character is displayed in larger scale in the "font" column at every time (1302). If a "registration" button command 1906 is designated, it is confirmed whether or not both the handwritten character in the "handwritten" column and the character in the "font" column are input (1401). If both are input, the creation of a recognition dictionary for that character is started (1403). The creation of the recognition dictionary is accomplished by creating the standard pattern from character data by a well-known method. As a result, this standard pattern is newly created in the user dictionary 106, or added thereto (1404). If the input of hand data and a character code is insufficient, a warning is generated (1402), and the same process is repeated until both the handwritten character data and the character code of the character to be registered are input. If a "cancel" button command 1907 is designated, both the character data and the character code input in the "handwritten" and "font" columns are invalidated (1501 in FIG. 16), and the input is enabled again. FIG. 21 illustrates a state where a character "䅈" has been entered by selecting it from the character code list. The "end" button command 1908 serves to erase this new character registration window and return the control to the user dictionary editor.

Figure 17:
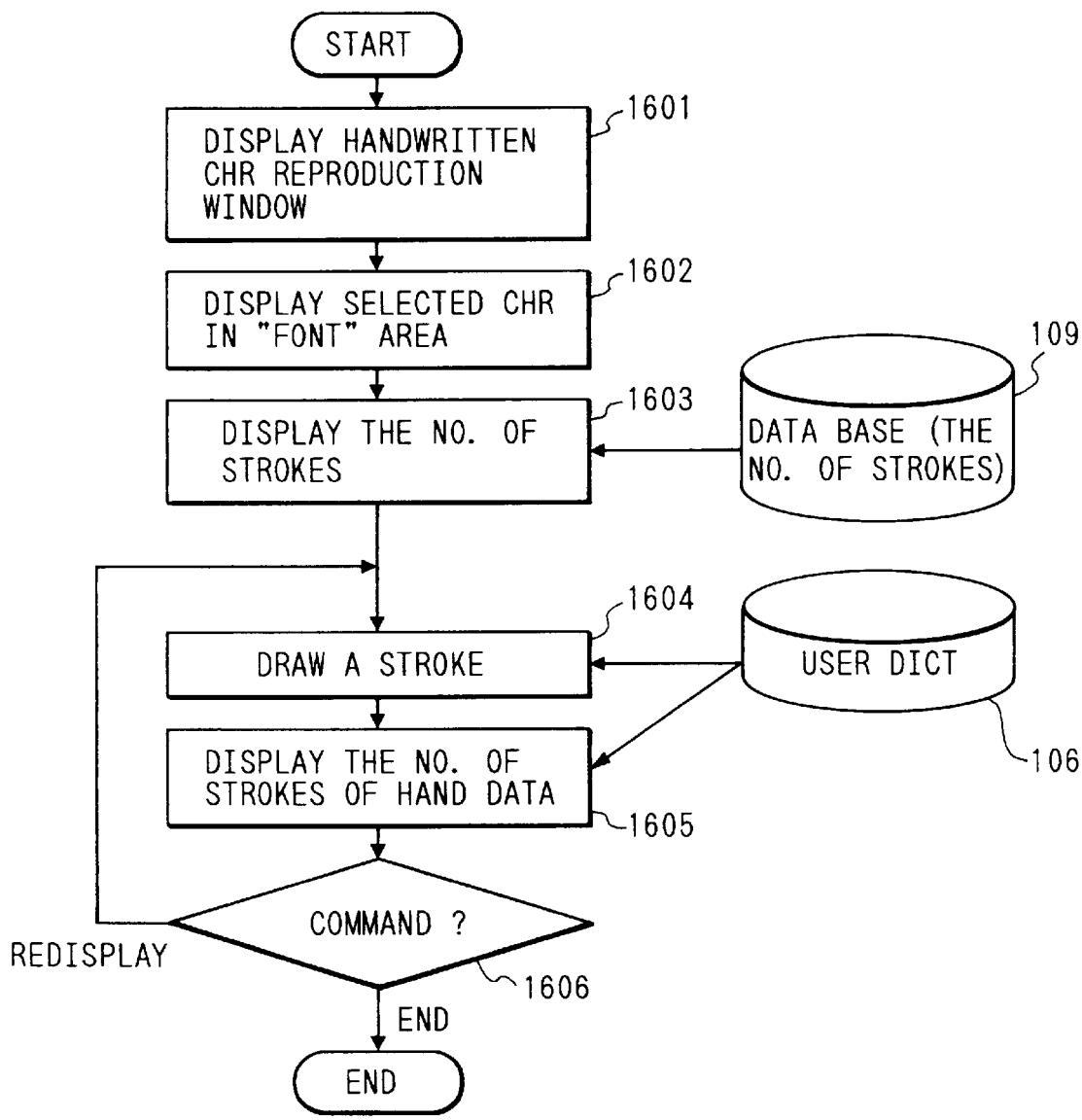
FIG. 17 is a flowchart of character reproduction.
Figure 23:
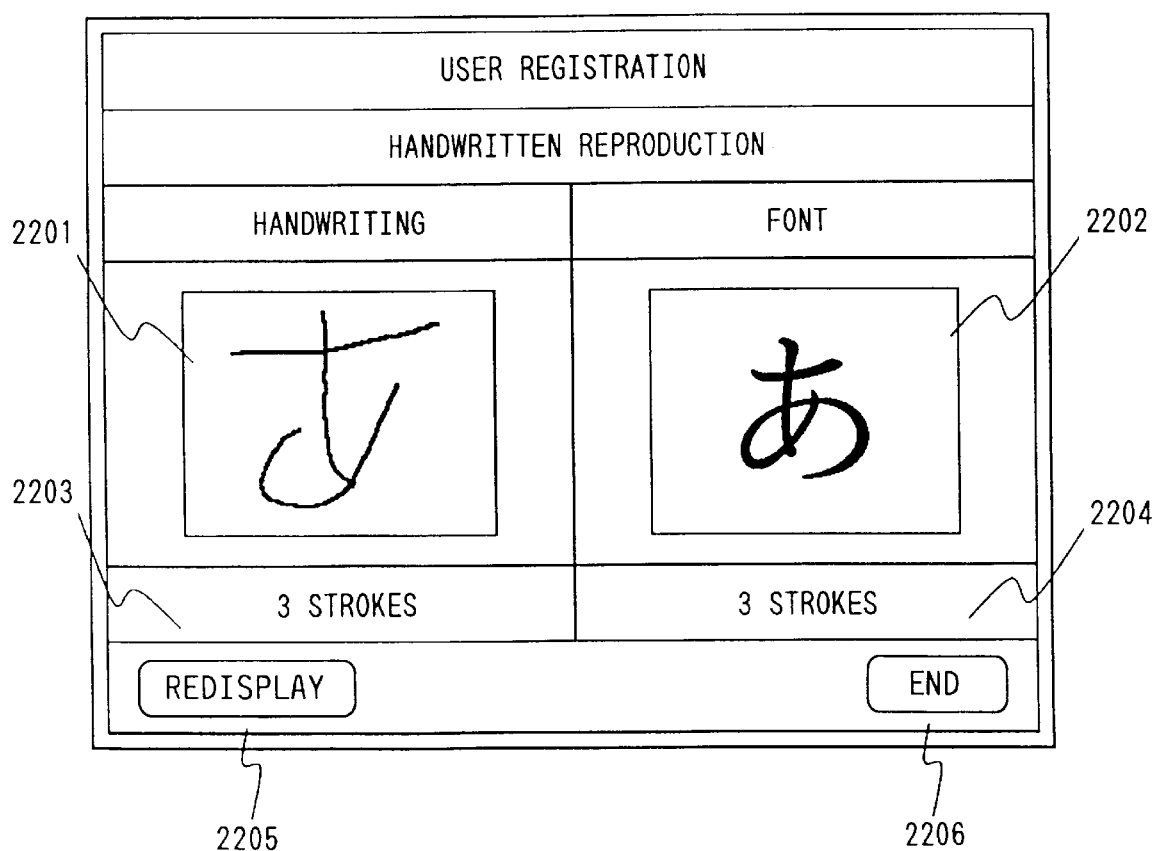
FIG. 23 illustrates a handwriting reproduction screen.

The process flow in the handwritten character reproducer will be described below using FIG. 23 and a flowchart of FIG. 17. In FIG. 23, reference numeral 2201 represents a handwritten character reproduction area, reference numeral 2202 represents a font display area destined for the handwritten character, reference numeral 2203 represents a hand stroke number display area of the handwritten character, reference numeral 2204 represents a standard stroke number display area of a subject font, and reference numerals 2205, 2206 represent function calling buttons actuatable by pen tap.

If a "handwritten reproduction" command button 2106 is designated in the previous user dictionary editor, a skeleton of a screen as illustrated in FIG. 23 is created and displayed in the form of pop-up window (1601). Since it is already confirmed that the character code is selected in the previous user dictionary editor, the enlarged font of the character is first displayed in the font area (1602). The number of strokes of the character is displayed together with the font display (1603), which is accomplished by preparing for a data base for character standard stroke number 109 in which the standard stroke number is described for each character (1607), and retrieving the subject character. To reproduce the character data within the user dictionary 106 requires temporary extraction of dictionary data corresponding to the selected character, which is enabled by utilizing the previous character code correspondence table. Since the dictionary data of the corresponding character contains coordinate points as well as information of pen down and pen up operations, it is possible to determine of which stroke number the coordinate point belongs to a hand. Using this, the handwriting can be drawn by linearly connecting the coordinate points sequentially within the same stroke (1604).

The number of strokes for hand data is defined by counting how many times the pen down operation is made, and displayed (1605). If the button command (1606) is "redisplay" 2205, the reproduced drawn data is erased, and hand reproduction is performed again by using dictionary data. If an "end" button command 2206 is designated, this handwritten character reproduction window is erased, and the control is transferred to the registered character editor. FIG. 23 illustrates a view where the character "あ" is selected and the character hand is half reproduced.

Note that the window creation and signal detection as described in the text can be accomplished by using any of a number of well-known techniques. While a pen was adopted as the pointing device, it is apparent that a mouse can be operated to enable the selection and entry.

Figure 27:
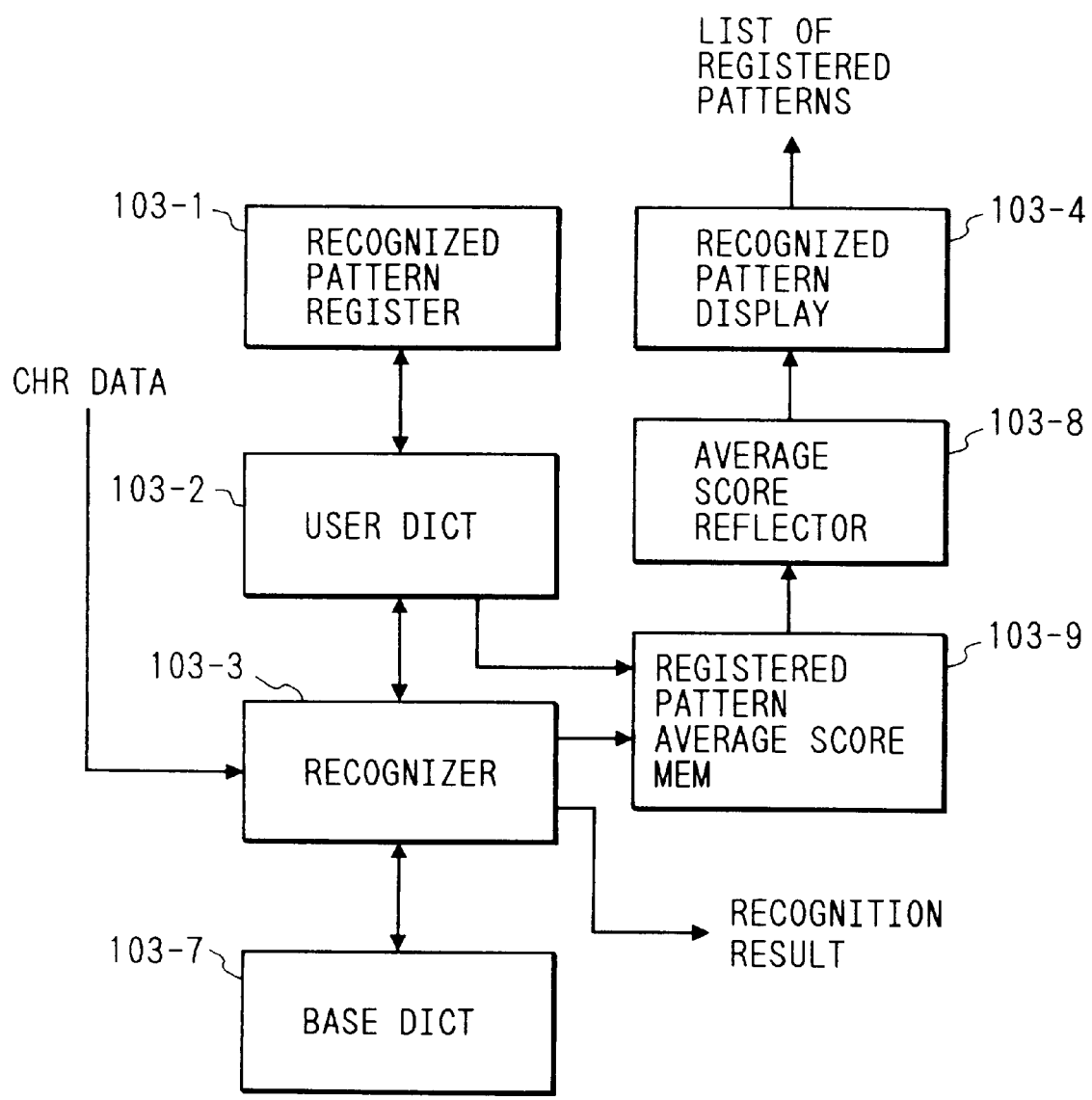
FIG. 27 is a configuration diagram of the main portion in the second embodiment.
Figure 28:
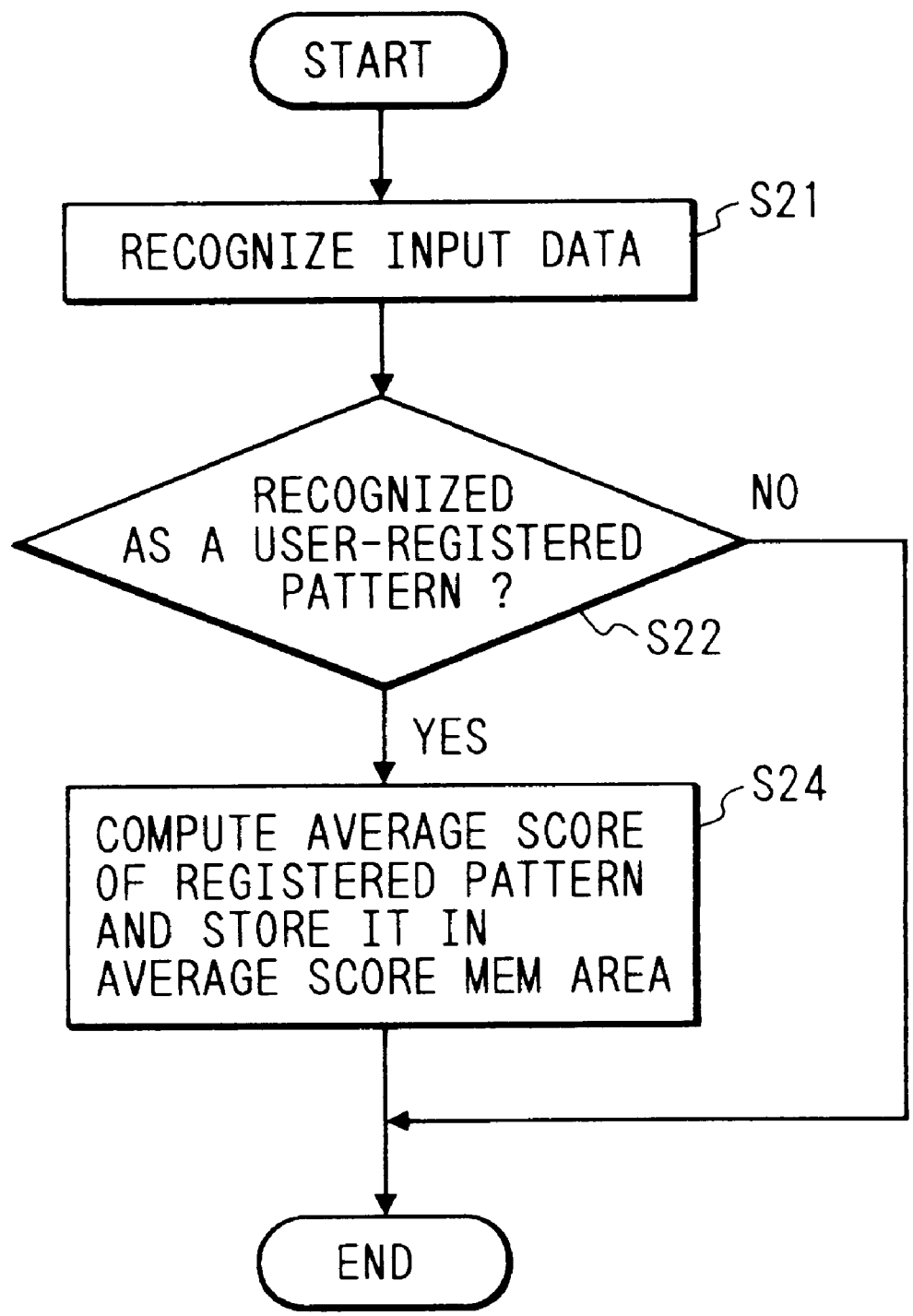
FIG. 28 is a flowchart of an average score memory process in the second embodiment.

In this embodiment, if registered pattern usage history memory means 103-6 of FIG. 6 is replaced with registered pattern average score memory means 103-9 of FIG. 27, and usage history display reflector means 103-5 of FIG. 1 is replaced with average score display reflector means 103-8 of FIG. 27, the recognized average score can be memorized and reflected on the display of the registered pattern list when the recognized result is a user registered pattern. The memory process of the average score will be described below along with a flowchart of FIG. 28.

At step S21, input stroke data is recognized by recognition means 103-3 of FIG. 27, and the character code and score are output as the recognition result. The score has a maximum of 100 points and a minimum of 0 points.

At step S22, a discrimination is made as to whether or not the character code of the recognition result is a pattern of a registration dictionary. This can be simply achieved because recognition means 103-3 makes a recognition by distinguishing between the user registered dictionary pattern and the basic dictionary pattern.

If the character code is a registered pattern, the program proceeds to step S24, of if the recognition result is a pattern of a basic dictionary, the registered pattern score memory process is ended.

At step S24, the average score of the registered pattern is calculated, and memorized in the average score memory area. In the average score memory area of the registered pattern are memorized the current average score and the number of times of recognition. It is seen that the usage frequency memory area of FIG. 25 has been replaced with the average score memory area. The current average score multiplied by the number of times of recognition, to which a score of this time is added, is divided by the stored number of times of recognition plus one to obtain a new average score, and the new average score and the recognized score up to this time are memorized.

The process wherein the average score thus obtained is used to display the character code read at step 504 in FIG. 6 in the registered character list display area 2101 will be described below.

In this case, the gray scale of displaying the character is changed depending on the value in the average score memory area. The gray scale is 100% if the average score is 80 or greater, 75% if the average score is from 75 to 80, 50% if the average score is from 50 to 75, and 25% if the average score is below 50. In an example of FIG. 25, characters "あかさ" having an average score of 100 are displayed at a gray scale of 100% as illustrated in FIG. 22, a character "䅈" having an average score of 75 is displayed at a gray scale of 75%, a character "䅈" of having an average score of 50 is i displayed at a gray scale of 50%, and a character "䅈" having an average score of 20 is displayed at a gray scale of 25%.

The characters having a bad average score can provide easy-to-use information for the user because correct character pattern is unregistered, and readily recognizable if registered again.

Figure 29:
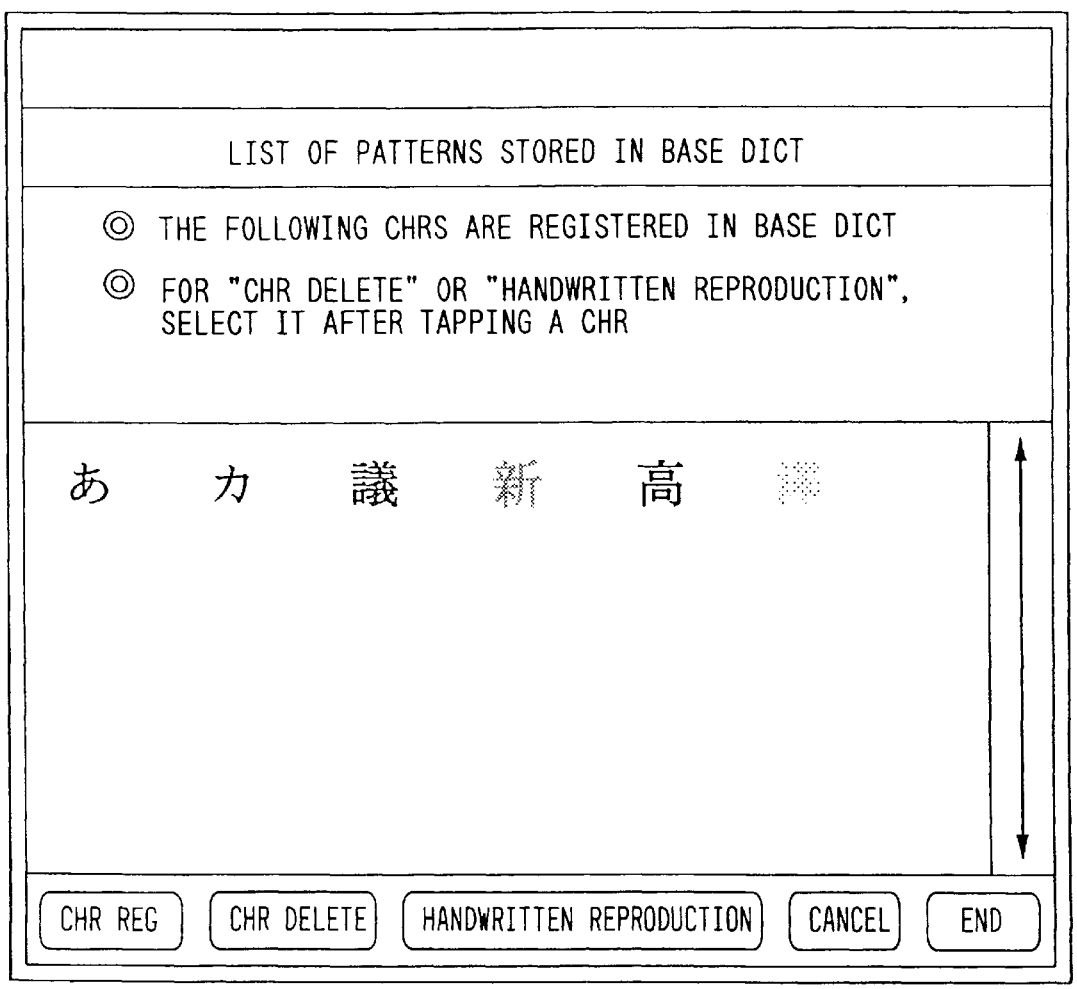
FIG. 29 is a display example of a basic pattern list in the second embodiment.

Also, by providing the average score memory area in the basic dictionary, a process equivalent to the registered pattern average memory process can be performed when the basic pattern is recognized. This process, if performed, can be reflected on the average score of its character in the display of a basic dictionary list, as illustrated in FIG. 29. For frequently written characters having low average scores in the basic character pattern, the usability can be drastically improved if the user pattern is registered.

It will be appreciated that the color may be naturally used in the color display unit although the list is differently displayed. Also, the numerical value of the memory area can be displayed directly under the character. Or the graphic representation of a crossbar may be presented under the character.

Embodiment 2

A second preferred embodiment of the present invention will be now described with reference to the accompanying drawings of FIGS. 31 to 36.

Figure 31:
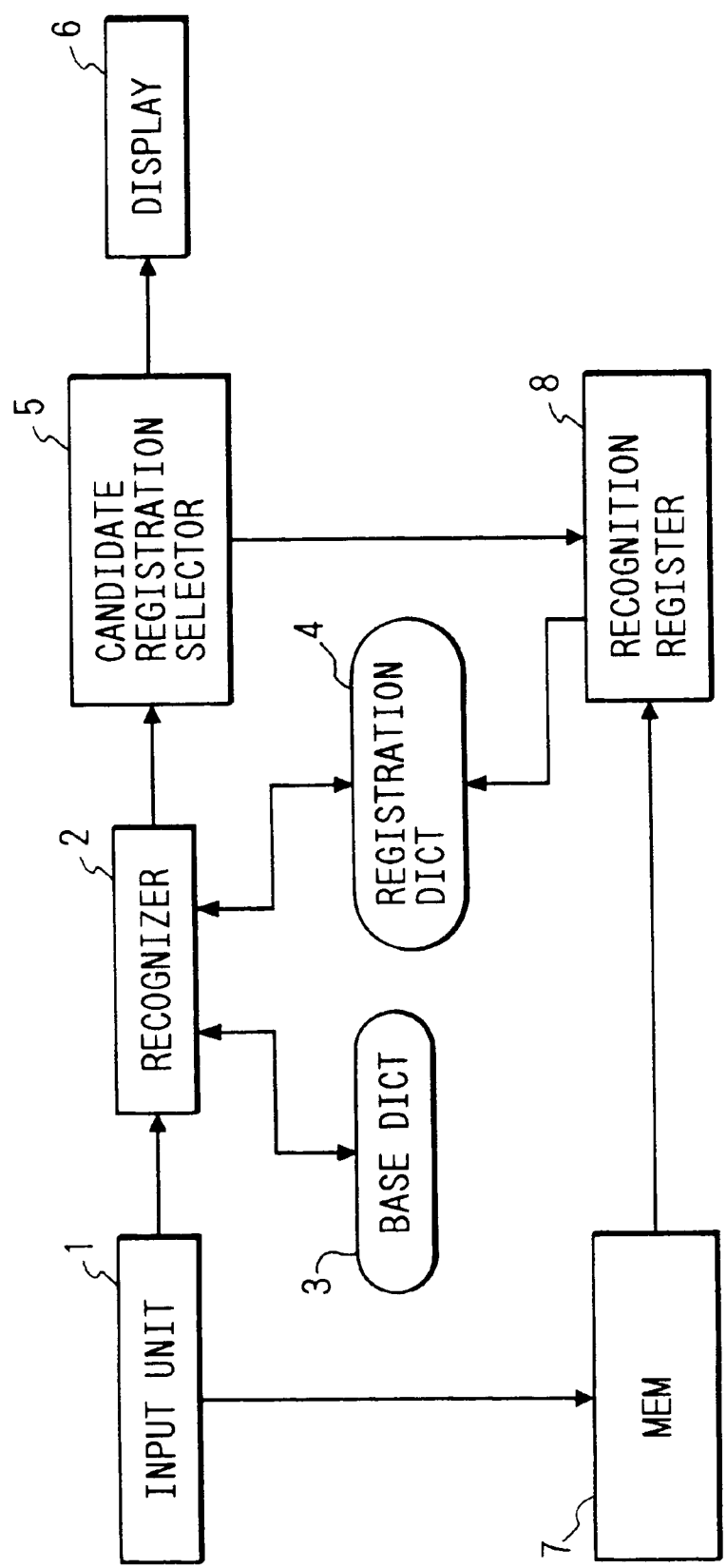
FIG. 31 is a functional block diagram illustrating the functional configuration of a character recognition device in the second embodiment.

FIG. 31 is a block diagram illustrating the functional configuration of a character recognition device in this embodiment.

In FIG. 31, reference numeral 1 represents an input unit, which is comprised of a coordinate input device such as a tablet, wherein a character to be recognized can be entered by the user who draws or handwrites the character to be recognized on this tablet, using a pen or the like. The character data thus input is in the form of a coordinate point set designated by a pen or the like on the tablet plane. Also, this input unit 1 transmits coordinate data composed of one character as input to a recognizer 2, as well as to a memory unit 7 for storage.

In the figure, a recognizer 2 is a well-known character recognition unit for reading coordinate data indicating the track of one character and transmitting a plurality of candidate characters with the character code of a recognized result and its recognition score as one candidate by referring to a basic dictionary 3 and a registration dictionary 4. Reference numeral 5 represents a candidate registration selector for allowing the user to select a correct recognition result from the plurality of candidate characters output from the recognizer 2 arranged in the order of their score. Herein, the normal candidate selector is equipped with a registration calling function, which can be readily called if the user sees the candidate of recognition and intends the recognition registration. Reference numeral 6 represents a display for displaying a candidate registration selection screen and so on. Reference numeral 8 represents a recognition register, which operates upon a calling for registration being instructed by the candidate registration selector 5. This recognition register 8 memorizes feature data in the registration dictionary 4, with the track of one character input from the input unit 1 and memorized in the memory unit 7 as the input data, in the format of a dictionary for use in the recognizer 2.

Figure 32:
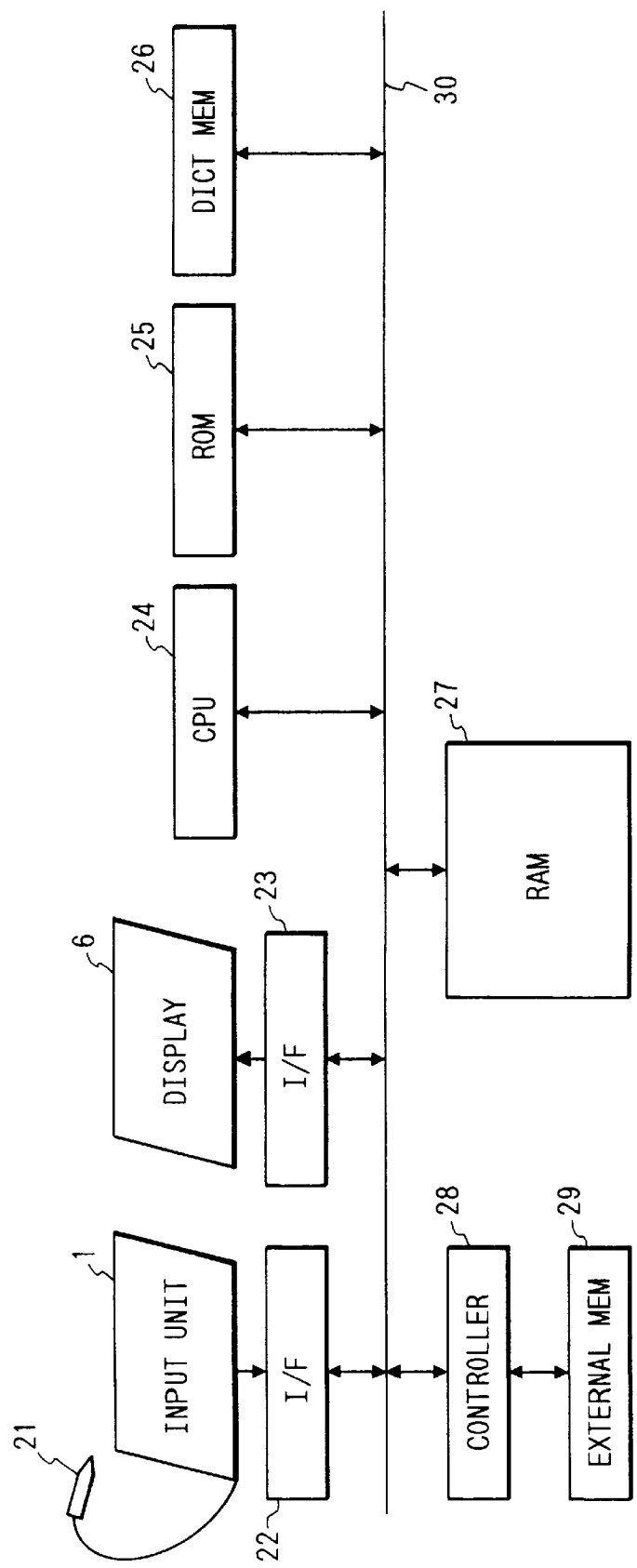
FIG. 32 is a block diagram illustrating the schematic configuration of the character recognition device in the second embodiment.

FIG. 32 is a block diagram illustrating the schematic configuration of the character recognition device in this embodiment, wherein common parts to FIG. 31 are indicated by like numbers.

In FIG. 32, reference numeral 21 represents an input pen for designating the coordinate on the tablet plane of input unit 1, the coordinate position designated by this pen 21 being transmitted via an interface unit 22 to a system bus 30. Display 6, which is provided underneath a transparent tablet of input unit 1, displays the hand data of a character input by handwriting on the tablet plane and its recognized result. Reference numeral 24 represents a CPU for controlling the whole device in accordance with a control program stored in a ROM 25, wherein the functions of recognizer 2, candidate registration selector 5, memory unit 7 and recognition register 8, as shown in FIG. 31, are implemented by the CPU 24, ROM 25 and RAM 27. The ROM 25 stores the control program for the CPU 24, and various data such as character fonts, corresponding to character codes. Reference numeral 26 represents a dictionary memory for use in the recognition, which contains the basic dictionary 3 and the registration dictionary 4, as previously described. Reference numeral 27 represents a RAM for use as the work area for the CPU 26, as well as temporarily memorizing various data. Reference numeral 29 represents an external memory such as a hard disk for storing various data input via controller 28. Note that the previously-cited dictionaries are stored in this external memory 29.

The operation of the character recognition device in this embodiment will be described below with reference to FIGS. 33A and 33B.

Figure 33A:
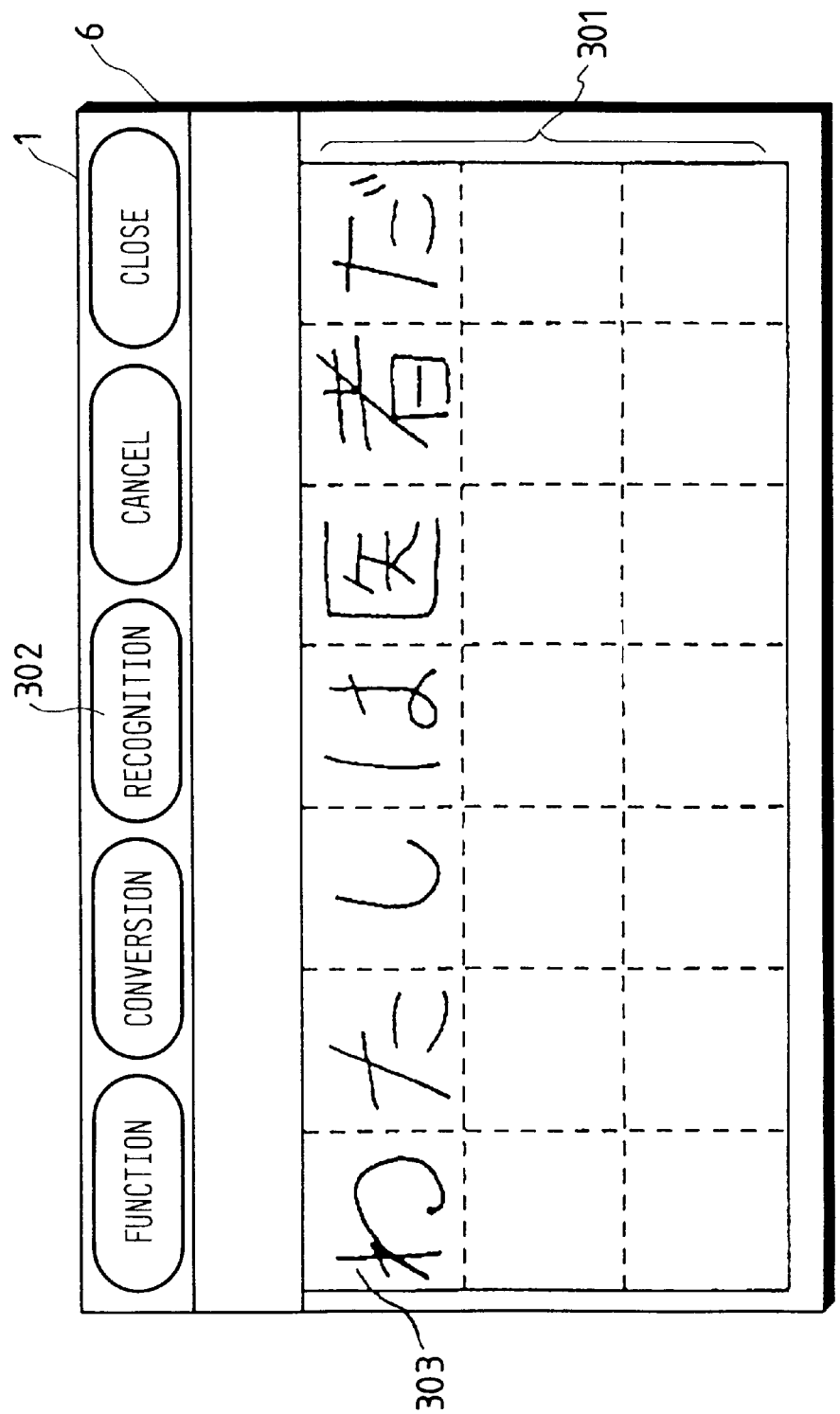
FIGS. 33A and 33B are examples of a character input into an input unit in the character recognition device of the second embodiment, and a display example of its recognized result.

FIG. 33A is a view illustrating the tablet plane of input unit 1, the display content in this figure being displayed on the display 6 provided in the lower side of the transparent tablet plane. Reference numeral 301 represents a handwritten character input area, one character being entered into each lattice of this area by the input pen 21. FIG. 33A illustrates an example where the user writes by hand "I am a doctor". In this state, if the recognition button 302 is depressed by the input pen 21, the recognition operation is started in the recognizer 2. Note that the data indicating the track of a character input by the user is memorized in the memory unit 7 for every character.

Figure 33B:
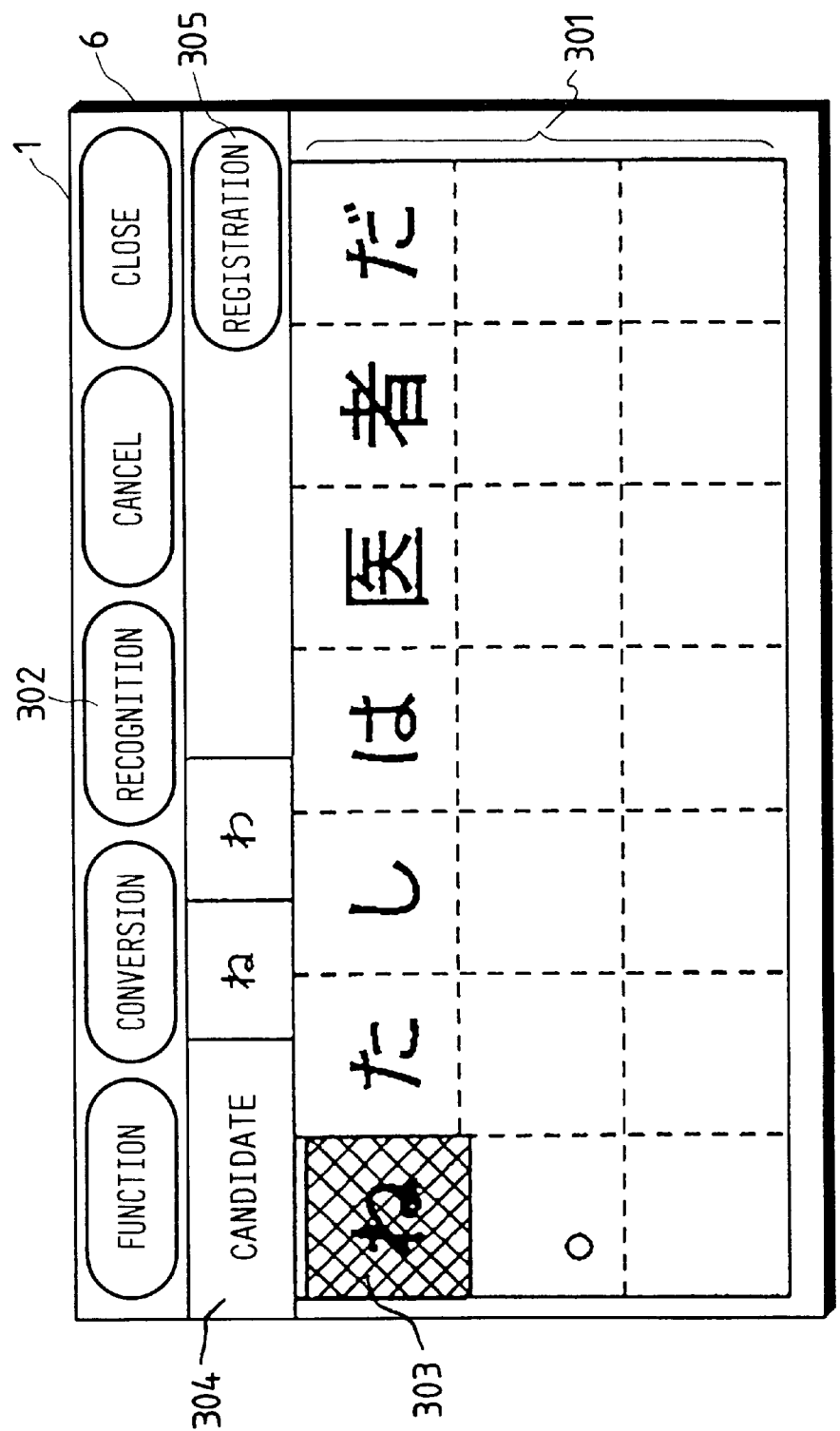

FIG. 33B illustrates a state where the recognized result by the recognizer 2 is displayed.

Herein, the character of each lattice is recognized, the character font corresponding to character code of recognized character is read from the ROM 25, and displayed on the display 6. On this screen, the recognized result and the candidates of the recognized character can be displayed. That is, if the lattice in the handwritten character input area 301 ("あ" in an example of FIG. 33) is designated, as illustrated in FIG. 33B, recognized characters ("あ" "わ") are displayed in an area indicated at 304. In this case, although the user entered "わ" in the lattice 302, the character was recognized as "あ".

Herein if a character in the lattice 303 is indicated in FIG. 33A is entered, "わ" is possibly registered as the most preferential candidate character where the order of the recognition candidates is as shown in FIG. 33B. If "わ" does not exist in the recognition candidate, it is meant that the user's handwritten character has not been recognized, so that the recognition candidate character may be possibly registered. In such a case, by designating a registration button as indicated at 305, the recognition register 8 of FIG. 1 can be activated.

The operation from the inputting of handwritten character to the registration selection in the character recognition device of this embodiment will be described below with reference to a flowchart of FIG. 34. Note that the control program for executing this processing is stored in the ROM 25.

First, at step S1, a subject character of recognition is entered on the tablet of input unit 1, as shown in FIG. 33A. The hand data of the input character is displayed on the display 6 as if it were directly drawn on the tablet. Thus, the characters are sequentially entered into the lattices of the character input area 301, with character data (hand data) memorized one in each lattice, and thereafter, if the recognition button 302 is designated, the program proceeds from step S2 to step S3, where the character recognition process is started.

This recognition process performs a recognition operation for each character, so that the candidates for each character and its score are output. Then, the program proceeds to step S4, where from the result of recognized character in each character frame, a character code corresponding to a character having the best score is obtained from among the character candidates, and a character pattern corresponding to the character code is read from the ROM 25 and displayed as illustrated in FIG. 33B. Then, when it is desired to select the candidate based on the recognition results, the subject character frame is designated as illustrated in a designation example of FIG. 33B, whereupon the program proceeds to step S5 to discriminate whether or not the candidate is selected.

If any of the lattices representing the recognition result is designated as illustrated in FIG. 33B, the program proceeds to step S6, where candidate characters are listed as illustrated in FIG. 33B. If no lattice is designated, the program proceeds to step S11 to discriminate whether or not the end of recognition input is designated. If the end is designated, the recognition process is ended.

At step S6, a list of candidates and a registration designation button 305 are displayed as illustrated in a display column 304 of FIG. 33B. In this state, if a character "か" is designated, for example, the program proceeds from step S7 to step S8, where the candidate order is changed. Thereby, with the score of selected candidate character ("か" in this example) being perfect as the first candidate, the program returns to step S4 to repeat the described proceedings.

If the registration button 305 is designated, the program proceeds from step S9 to step S10, where the registration process is initiated. In this case, the track of the input subject character memorized in the memory unit 7 at step S1 is also given as a parameter. Thereafter, the registered character is added as the candidate having the highest score, and the program returns to step S4 to display on the display 6 again. In the registration process at step S10, for example, a new registration screen is displayed on the display 6, the order of the recognized candidate characters is changed on the screen, or when there is no subject character candidate, the input of the character is performed. Also, when neither candidate order change nor registration is designated, the program proceeds to step S11 to investigate whether or not the other key button is designated. If so, the program proceeds to step S12 to perform a process corresponding to the designated button.

In the above manner, the registration of a desired character can be made while confirming the recognized result of the character input or handwritten by the user. While in this embodiment, the registration button 305 was displayed on the candidate selection screen, it is noted that the registration button may be predisplayed or provided on the tablet plane. Further, a symbol denoting the registration is marked at one of the recognized candidate characters, and the registration process can be activated by designating the symbol.

While in this embodiment the registration is made in selecting the candidate of the recognized result, an example in which the registration is made after the input of a character will be described below. Note that the track of a character as input is memorized in the memory unit 7 only if the character is candidate selected and corrected, and in registration, the hand data of a character memorized in the memory unit 7 is displayed again on the display 6 to select whether or not it is registered.

Figure 35:
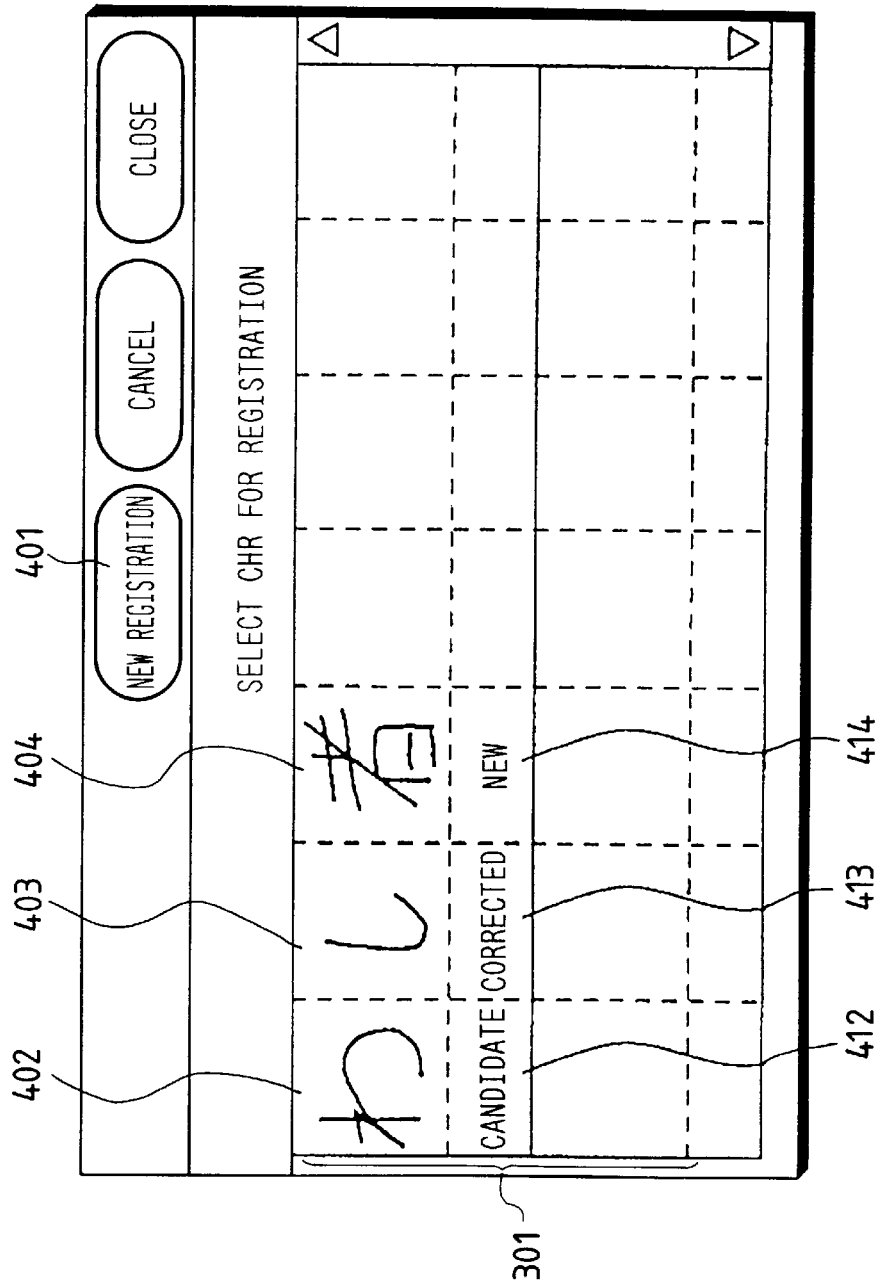
FIG. 35 is a view illustrating the registration process in the second embodiment.

FIG. 35 is a view illustrating a registration screen in this embodiment.

In the figure, reference numerals 402 and 404 represent track display area for displaying the character as candidate selected or corrected among characters input as indicated in FIG. 33A. Herein, other blank lattices are used as the area for entering the character track which is newly registered independently of the input time as is conventional. Also, reference numerals 412 to 414 represent the type of character track, indicating whether the character track displayed in the track area 402 to 404 as the object of registration has been candidate selected (412), corrected (413), or totally newly registered (414).

In FIG. 35, it is indicated that a character "か" in track area 402 has been candidate selected at the At previous recognition input, and a character "い" in track area 403 has been input but falsely written at the recognition input, or corrected and deleted because of no intended character among the candidates. Also, a character "有" in track area 404 has been newly written at the new registration on this input screen, but not at the recognition input. These are shown by the types 412 to 414 as "candidate", "corrected" and "new", respectively.

Figure 36:
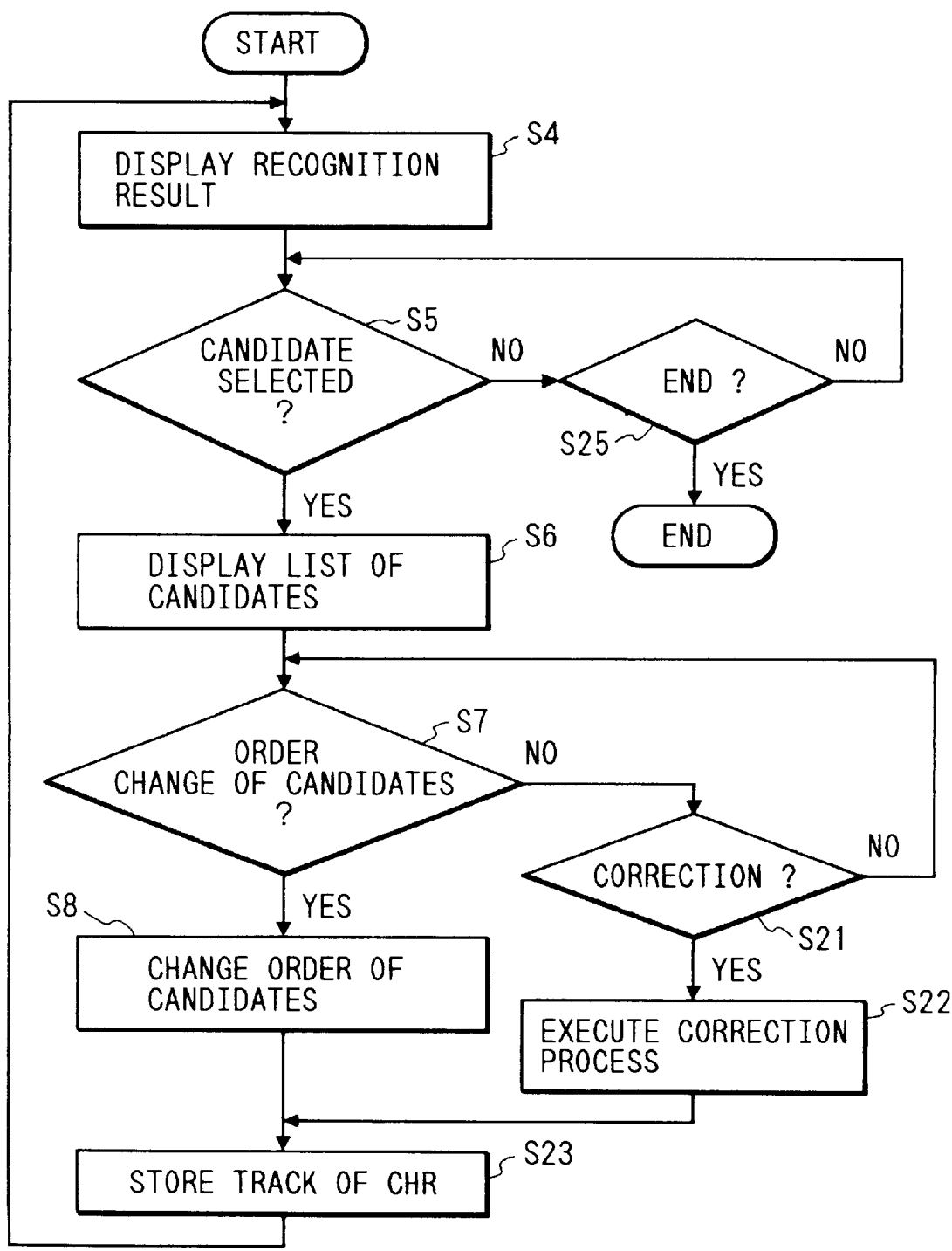
FIG. 36 is a flowchart illustrating the operation in the second embodiment.

FIG. 36 is a flowchart showing the operation of memory unit 7 at the recognition input in the character recognition device. The memory operation of the character track used for the registration will be briefly described using this figure.

Figure 34:
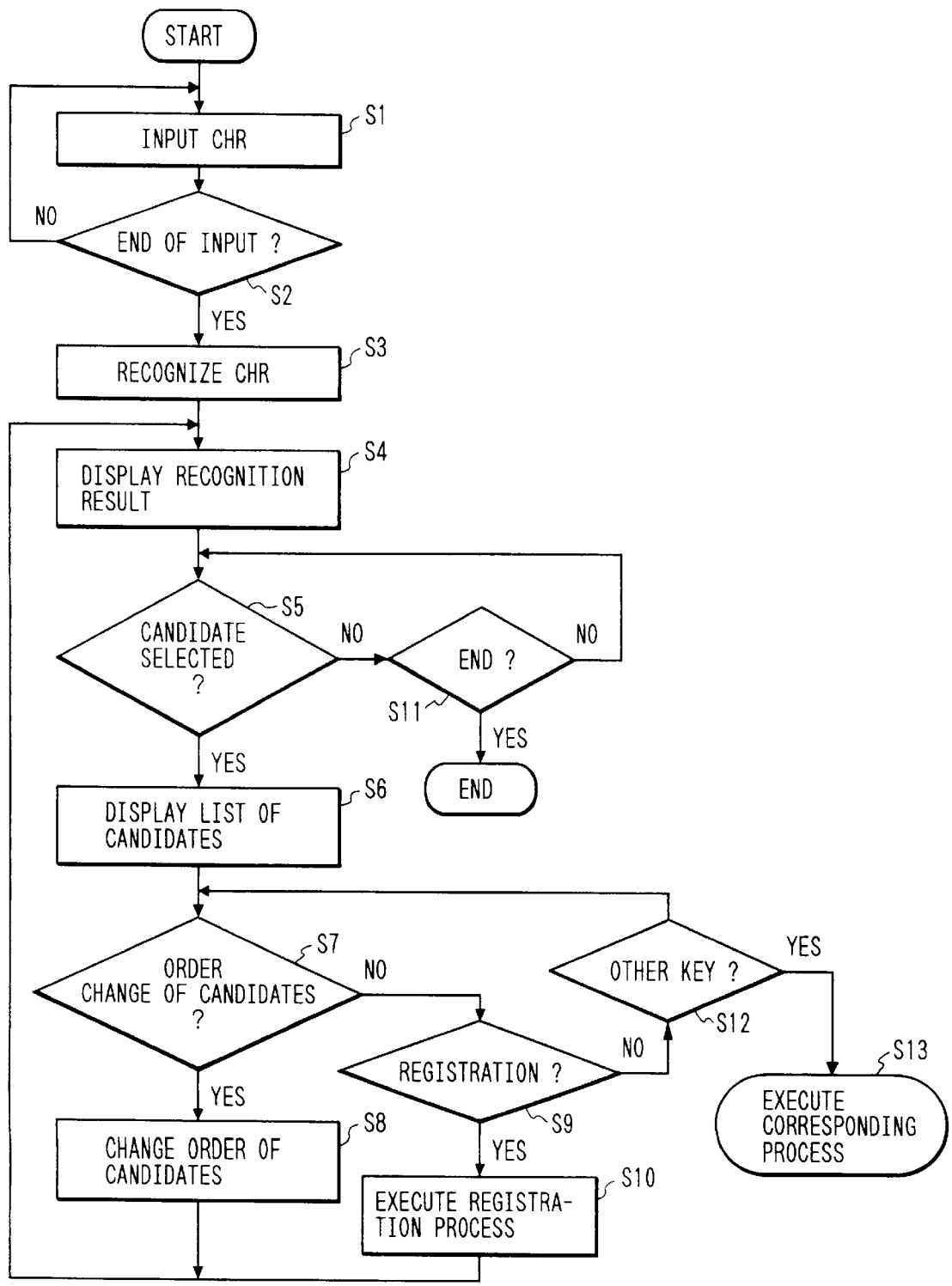
FIG. 34 is a flowchart illustrating the character recognition and the selection and registration process of a candidate character in the character recognition device of the second embodiment.

This flowchart is involved in the processing to be activated after steps S1 to S3 in FIG. 34, part of which has been omitted for a simpler description. Also, the processing from step S4 to step S8 is exactly the same as that from step S4 to step S8 in FIG. 34, and the explanation thereof is omitted. Note that a control program for executing this processing is stored in ROM 25.

At step S21, a check is made to determine whether or not the correction button displayed on the display 6 has been designated, when no intended character is displayed among the candidates of the recognition result, or when a wrong character is input. Herein, if the correction process is designated, the program proceeds to step S22, the deletion of a character previously input, and the input of a new character are conducted for the correction. Then, to memorize the character track before correction, the track before correction is temporarily stored, and passed to the processing at step S23. At step S23, the track of character subjected to a change of candidate order and the flag indicating the change of candidate order are memorized, if the step S23 is executed after changing of a candidate order performed at step S8. On the other hand, if the step S23 is executed after correction at step S22, the character track before correction transferred thereto and the flag indicating the correction process are memorized. In the end judgment of the recognition input process at step S25, if the end is judged, the memory area of the input character is released, the track and type memorized at step S23 are stored as the information memorized for the registration.

As described above, if the memory unit 7 is prepared for the registration, the track and type information as indicated at 402 to 404 and corresponding 412 to 414 in FIG. 35 can be retrieved, based on this memorized information, when the registration process is activated. Thus, the character which has not been sufficiently recognized at the recognition input when the recognition registration is made and the character which is not present in the recognition dictionary can be simply registered.

As described above, if the information concerning the character track input at the recognition input is memorized, and the registration of the information is selected, the user has the effect of being able to readily and simply register the character not present in the recognition dictionary, or the character which is bad in the accuracy of recognition. Further, the user has more convenience because there is no need of entering the track to be registered again at the registration.

Embodiment 3

A third preferred embodiment of the present invention will be now described in detail with reference to FIGS. 3, 7, 8, 10, 11, 13, 14, 16, 18–21, 23, 24, 30, and 37.

FIG. 30 is a schematic configurational diagram illustrating the configuration of an information processing apparatus according to one embodiment of the present invention. In the same figure, reference numeral 1 represents a CPU for controlling the whole apparatus, wherein various processings are performed in accordance with programs stored in a ROM 2. Reference numeral 2 represents a ROM for storing a control program, an error processing program, and various programs operating in accordance with the flowcharts as hereinafter described. Reference numeral 3 represents a RAM for use as the work area of various programs and the temporary save area at the time of error processing. In this RAM are stored various data bases, including dictionaries for use with the recognition, as will be described later, a user dictionary 106, a user name index file 107, a character type file 108, and a character standard stroke number data base 109. Reference numeral 4 represents a coordinate input unit having a transparent coordinate input plate, not shown, and a pen, not shown, for designating the position of coordinate point on the coordinate input plate, wherein electromagnetic induction or ultrasonic vibration is used in detecting the position of a coordinate point. Reference numeral 5 represents a VIDEO RAM (hereinafter referred to as "VRAM") having a memory corresponding one by one to the coordinate point on the coordinate input plate and storing bit information of a coordinate point input on the coordinate input plate or bit information of a dot calculated based on the coordinate point as will be described later. Reference numeral 6 represents a display for displaying a bit image based on bit information stored in VRAM 5, wherein this display 6 uses an LCD but may be an EL element or CRT, for example. On this display 6, a variety of windows, as will be described later, are displayed.

Figure 37:
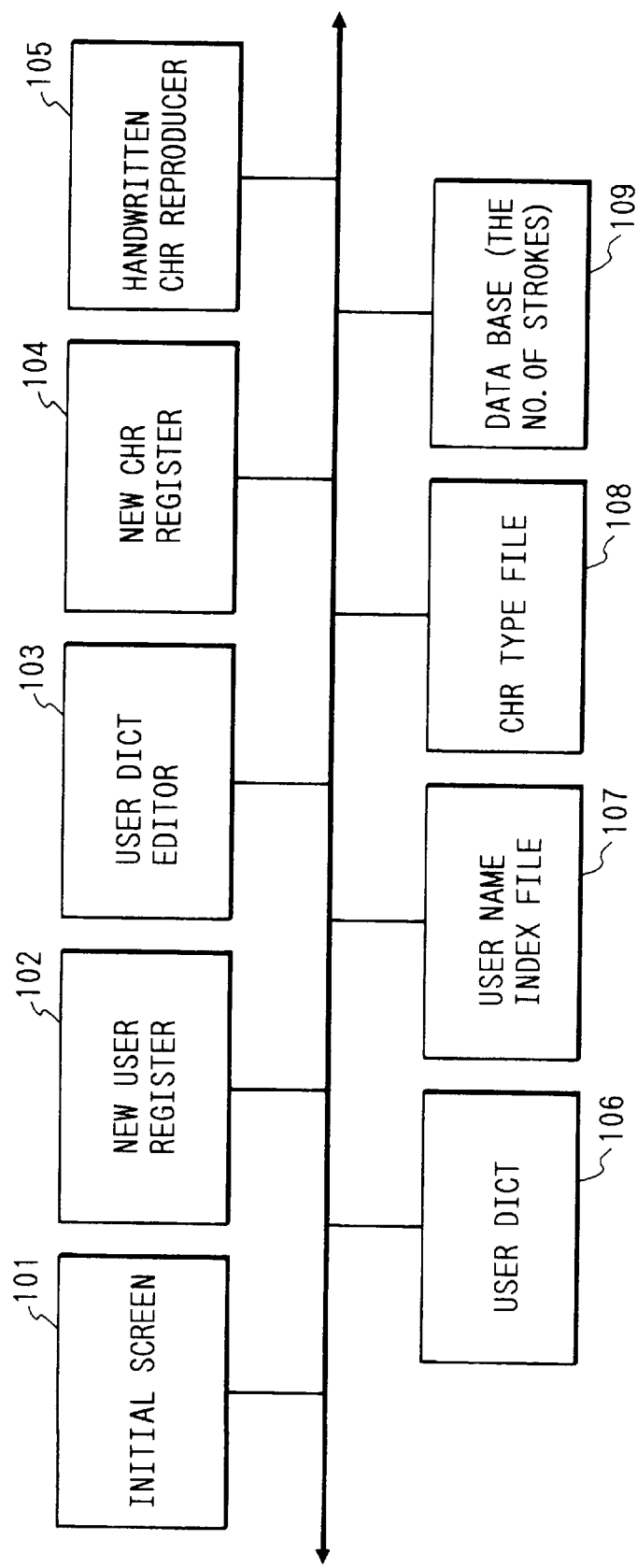
FIG. 37 is a block diagram illustrating the configuration of a user registration application.

FIG. 37 is a configuration block diagram of a user registration application for implementing the present invention. Reference numerals 101 to 106 represent units each serving as a functional element of user registration in the on-line character recognition, the units being classified into a window application execution section (101 to 105) with GUI (Graphical User Interface) and a user dictionary section (106 to 109).

Initial screen 101 allows for the display of the list of registered users, and the confirmation for the owner of the user dictionary presently set. It has other functions including a designating function for the mode of newly registering the user and the mode of editing registered character within user dictionary. New user register 102 effects the registration of the new user. User dictionary editor 103 displays the list of characters within the user dictionary, and allows for the designation of deletion or handwritten reproduction for each character. Also, it includes a designation function for newly registering the character handwritten by the user. New character register 104 carries out the character registration designated at the previous stage 103. Handwritten character reproducer 105 draws or reproduces the registered character designated at the previous stage 103 in the hand order. User dictionary 106 stores information of registered characters to implement the above functions. Herein, a plurality of users own different user dictionaries. User name index file 107 registers user names owning the user dictionary 106. Character type file 108 stores registerable character type data, and character standard stroke number data base 109 stores the standard stroke number for each character.

FIG. 3 is a window state transition diagram of user registration application. Reference numerals 201 to 205 represent windows for executing each function of FIG. 37, wherein each window, the example of which will be described later, appears on the display 6. Reference numeral 206 represents a system to which the control is returned when this user registration application is ended. The arrows in the figure indicate the flow of control command to be entered with the button control in each window. The flow of control command and the ansition of windows will be described below using FIG. 3.

If a "new user registration" command is issued in new item window 201, a new user registration window 202 appears newly in the form of pop-up window. If a "registration & end" command is issued in the new user registration window 202, this pop-up window disappears, and the control is returned to the new item window 201. If a "user dictionary edit" command is issued in the new item window 201, the new item window 201 disappears, and a user dictionary edit window 203 appears newly. Herein, if a "new character registration" command is issued, a new character registration window 204 appears in the form of a pop-up window. The character registration operation on this window can be repeatedly executed unless an "end" command is issued. If the "end" command is instructed after the character is registered, the new character registration window 204 disappears, and the control is returned to the user dictionary edit window 203. A "character delete" command can be executed plural times in the user dictionary edit window 203. Further, if a "handwritten reproduction" command is issued, a handwritten character reproduction window 205 appears in the form of a pop-up window. At the same time when the window is displayed, the reproduction is started, whereby the use of a "redisplay" command allows for the redisplay repetitively. The handwritten character reproduction window disappears by issuing the "end" command, and the control is returned to the user dictionary edit window. If the "end" command is issued in the user dictionary edit window 203, the window of its own disappears and the new item window 201 appears again. Accordingly, it is only when the "end" command is issued in the initial item window 201 that the user registration application can be ended.

Note that the number of windows in the user registered application is two when the pop-up window of window 202, 204 or 205 appears, and one when the pop-up window of window 201 or 203 appears, as described above.

Figure 38:
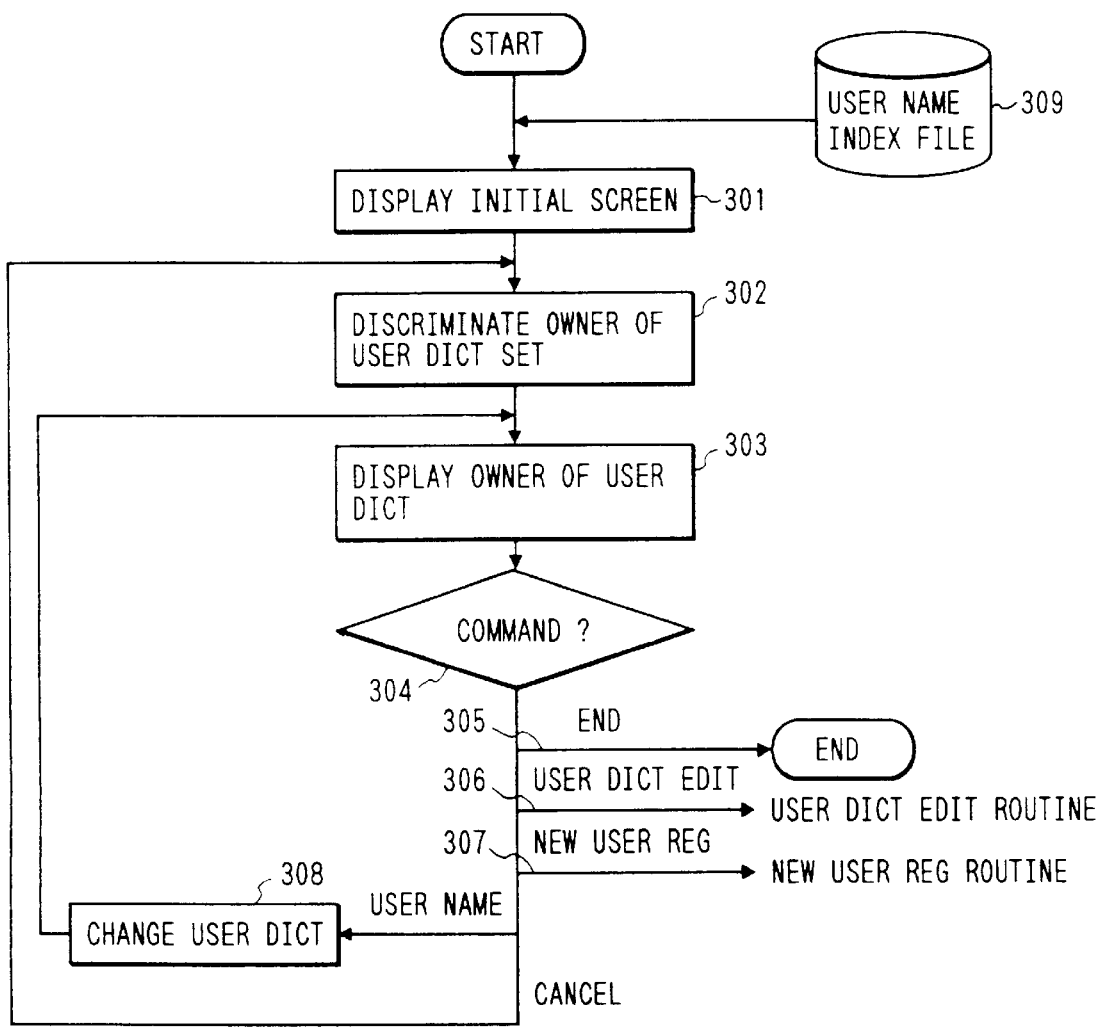
FIG. 38 is a flowchart of a process in an initial screen.

The details of the function in each window and the process flow will be now described with reference to the drawings of FIG. 38 and beyond.

First, the process flow in the initial item window will be described using FIG. 18 and a flowchart of FIG. 38. In FIG. 18, reference numeral 1701 represents a message display area, reference numeral 1702 represents a user name list display and user dictionary owner display area, reference numeral 1703 represents a scroll bar for use when registered users can not be accommodated within one screen, and reference numerals 1704 to 1707 represent buttons for calling a function by a pen tap.

If the user registration application is started, a window is created at step 301, whereupon a registered user name is read from the user name index file 107. This user name index file is a disk file having a structure as shown in FIG. 24, and which is readable and writable. The created window is as shown in FIG. 18. At step 302, the owner of a user dictionary set in the system is discriminated. If the owner is discriminated, the user who is an owner of a user dictionary is marked in the user name display area 1701 at step 303. For example, the user whose user name is "Arai" is an owner in FIG. 37. If the processing up to this point is ended, the procedure waits for a command instruction by the user at step 304. If the user name is selected directly by a pointing device such as a pen, the change of the owner of the user dictionary is demanded to the system at step 308 to change the setting. For other operations with the button command, if a "user dictionary edit" button 1704 is depressed (306), the control is transferred to a user dictionary edit routine, if a "new user registration" button 1705 is depressed (307), the control is transferred to a new user registration routine, and if a "cancel" button 1706 is depressed,the setting change of user dictionary with the user name selection as performed before this point is invalidated, and the user dictionary setting is restored to the state before starting the application. If an "end" button 1707 is depressed (305), this user registration application is ended, and the control is returned to the system.

Figure 39:
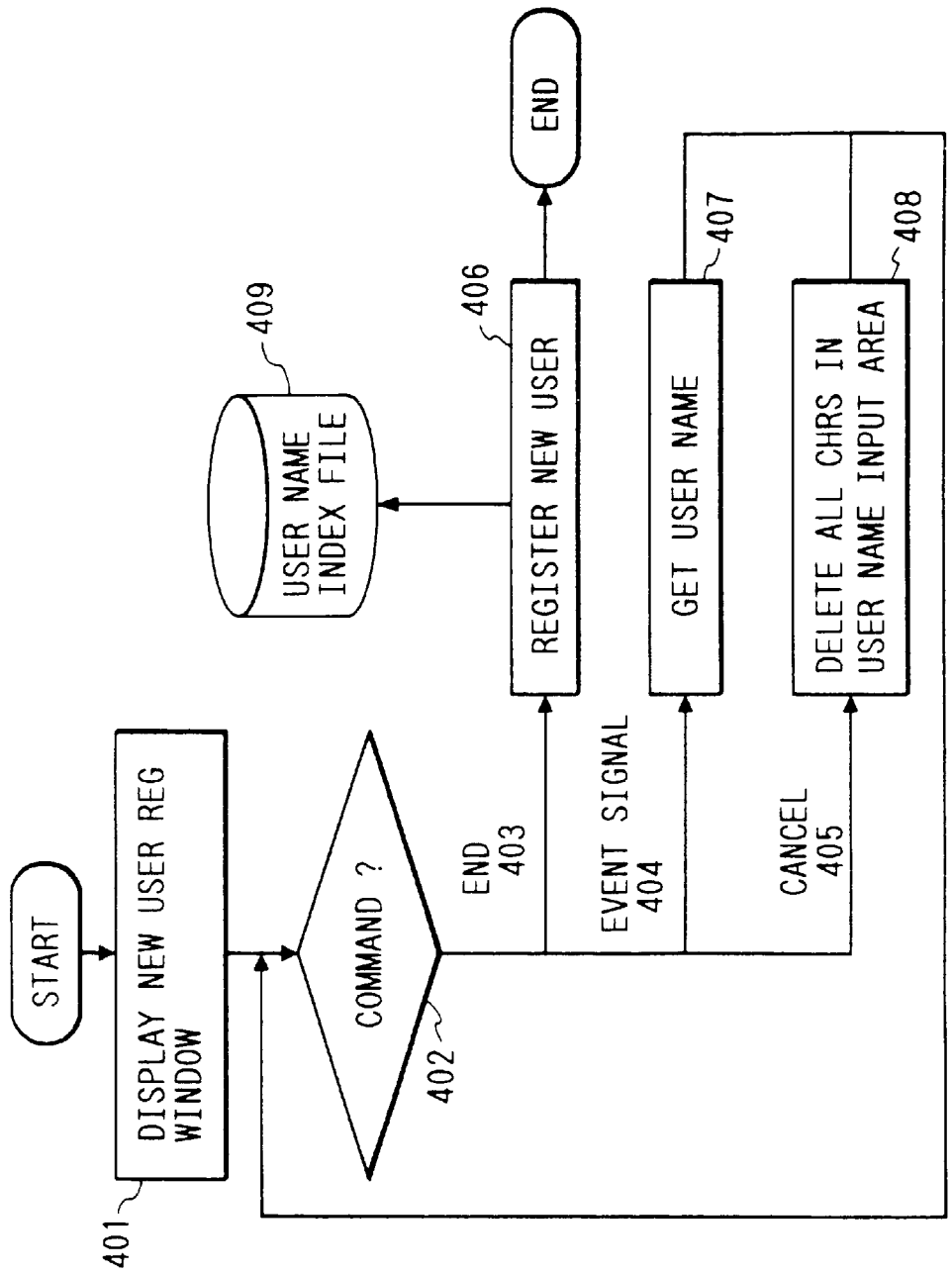
FIG. 39 is a flowchart of a process in a new user registration screen.

The process flow in the new user registration window will be described below with reference to FIG. 19 and a flowchart of FIG. 39. In FIG. 19, reference numeral 1801 represents a user name input area for inputting the user name, reference numeral 1802 represents a cancel function button for canceling the input of a user name, and reference numeral 1803 represents a registration & end function button for registering the input user name and ending this window.

If a "new user registration" command 1704 in the previous initial item window is instructed, a pop-up window as shown in FIG. 19 is displayed (401). Then, the operation is placed in a wait state for a command to be instructed by the user. If an event signal by a pen-down operation is detected in user name input area 1801 (404), an existing recognition routine is called. This routine subjects a character hand drawn in the user name input area to the on-line character recognition process to convert character data to character code (407). If a "registration & end" button command 1803 is instructed, the user name input and converted in the user name input area is determined as a new user name which is then additionally registered to the user name index file 107 (406). Thereafter, the current window is erased, and the control is returned to the initial item window again. On the other hand, if a "cancel" button command 1802 is instructed, the characters entered into the user name input are all deleted (408), and the operation is placed again in a wait state for a user name input command.

Figure 40:
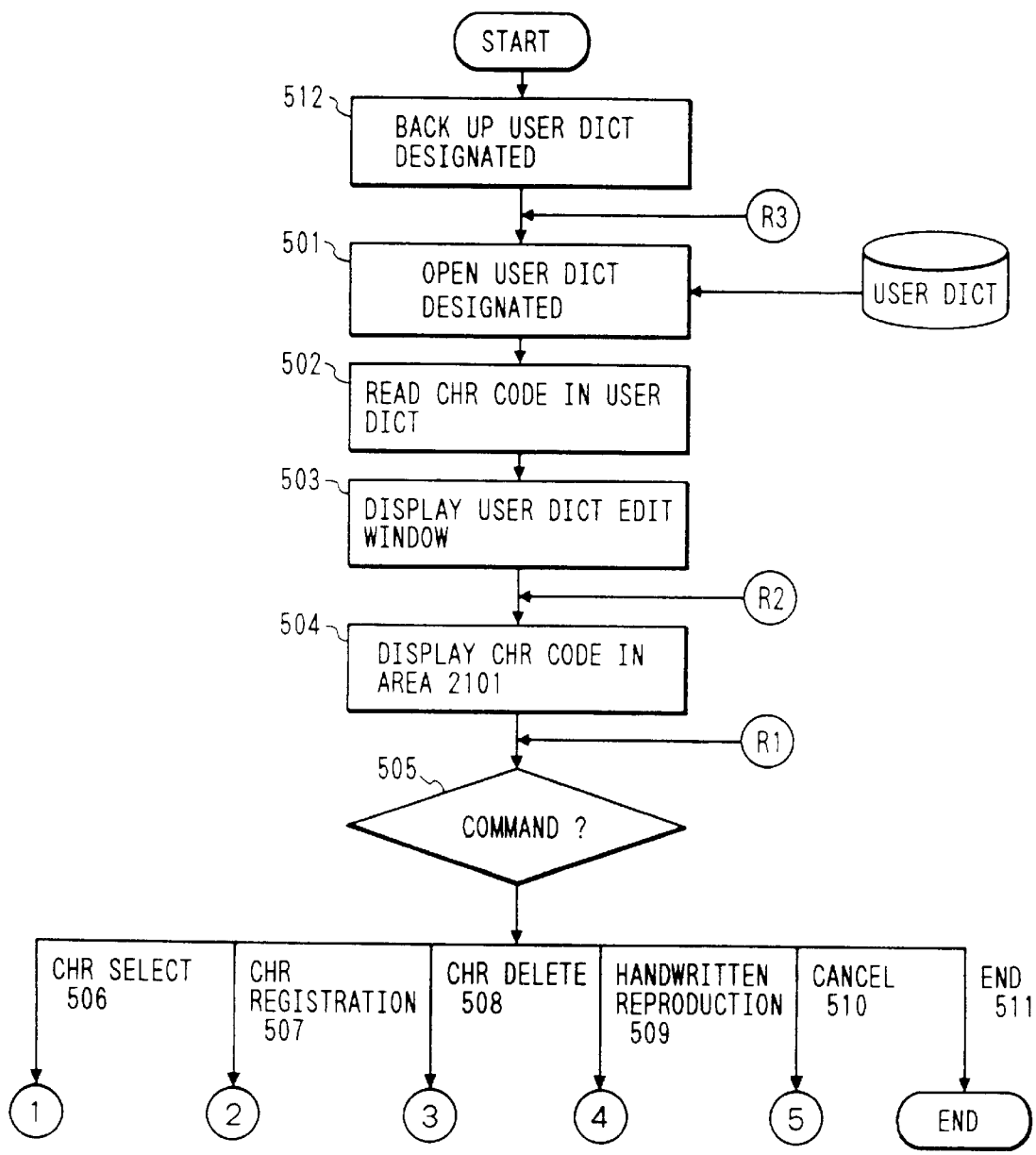
FIG. 40 is a flowchart of a process in a user dictionary editor.
Figure 45:
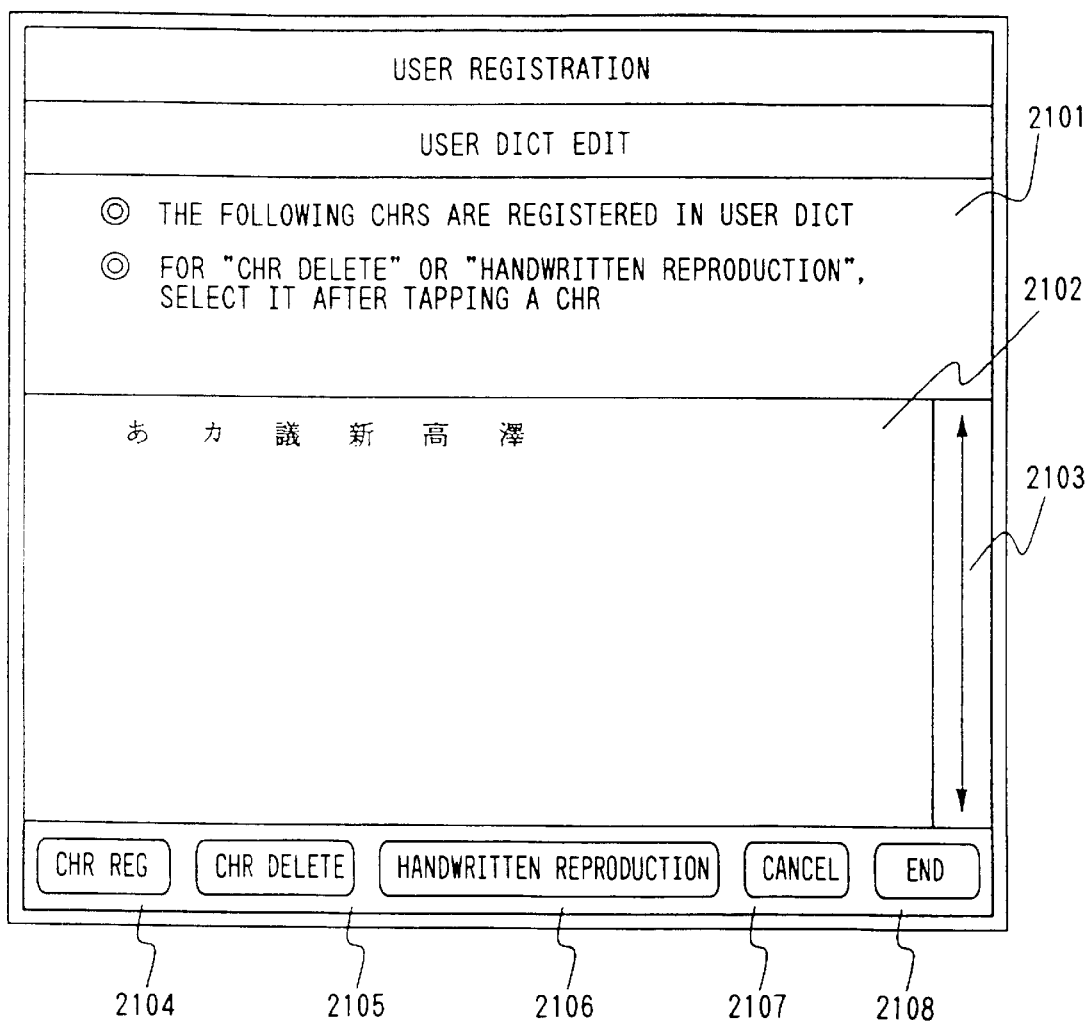
FIG. 45 is a user dictionary edit window.

The process flow in the user dictionary editor will be described below with reference to FIG. 45 and a flowchart of FIG. 40. In FIG. 45, reference numeral 2101 represents a message display area, reference numeral 2102 represents a registered character list display area, reference numeral 2103 represents a scroll bar which allows more registered characters to be displayed, and reference numerals 2104 to 2108 represent function calling buttons responsive to a pen tap.

Figure 41:
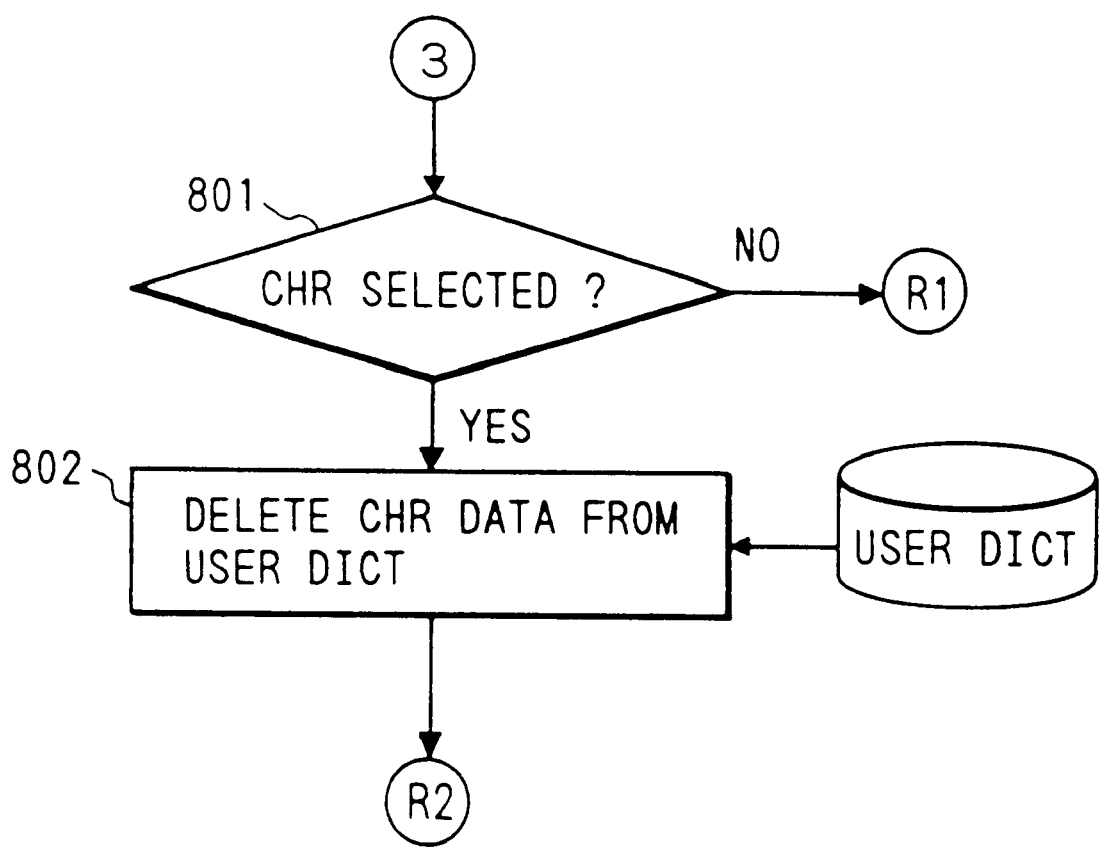
FIG. 41 is a flowchart of a character deletion process.

If a "user dictionary edit" button 1705 is depressed in the previous initial item window, a user dictionary 106 designated is copied and stored separately (512). This provides for a back up copy if the dictionary edit operation is canceled. Then, the user dictionary is opened to read character codes within the user dictionary into a buffer area (502). Herein, to make characters within the user dictionary to correspond to displayed characters, one to one, a character code correspondence table is created (601 in FIG. 7). For example, when six characters are registered, the correspondence table is as shown in FIG. 46. This character code correspondence table is created because if a multiplicity of dictionary character data with the same character code exist, the retrieval of dictionary data is not allowed uniquely only with the information of the character code in the editing of a character with the "delete" or "reproduce" command. The user dictionary edit window as illustrated in FIG. 45 is displayed based on this character code correspondence table (503). A character code read at this time is displayed in the registered character list display area 2101 (504). Thereafter, the operation is placed in the wait state for a command instructed by the user (505). If a signal by a pen down operation is detected in the registered character list display area, a character located by a pen down operation is selected (506). The display number on the character code table is obtained from the positional information of the selected character. The storage location of dictionary character data practically stored in the user dictionary is determined from its display number to obtain dictionary character data to be edited. If a "character registration" button command 2104 is designated (507), the control is transferred to a new character registration routine (701 in FIG. 18). If a "character delete" button command 2105 is designated (509), a discrimination is made as to whether or not the character in the registered character list display area is selected (801 in FIG. 41). If not selected, the operation returns to the wait state for a command instruction (505). If already selected, the dictionary data storage area of a character to be deleted is located using the character code correspondence table as previously noted. When it is found, the dictionary character data stored in the actual user dictionary is deleted (802). At the same time when the content of a user dictionary is changed, the character code correspondence table is also changed to update the character display of registered character list display area (504). If a "handwritten reproduction" button 2106 is depressed (509), the control is transferred to a handwritten reproduction routine when there is a character selected, or the operation is placed in the wait state for a character to be selected when there is no character selected (901). If a "cancel" button command 2107 is designated (510), a discrimination is made as to whether or not the character in the registered character list display area is selected (1001 in FIG. 37). If any character is selected, the character is invalidated, the display is placed in a character unselected state (1002), and the content of the registered dictionary is restored to the original state before starting the dictionary edit window (1003). With this operation, the editing is enabled to restart. An "end" button command 2108 erases this user dictionary edit window, and returns the control to the previous initial item window.

Figure 42:
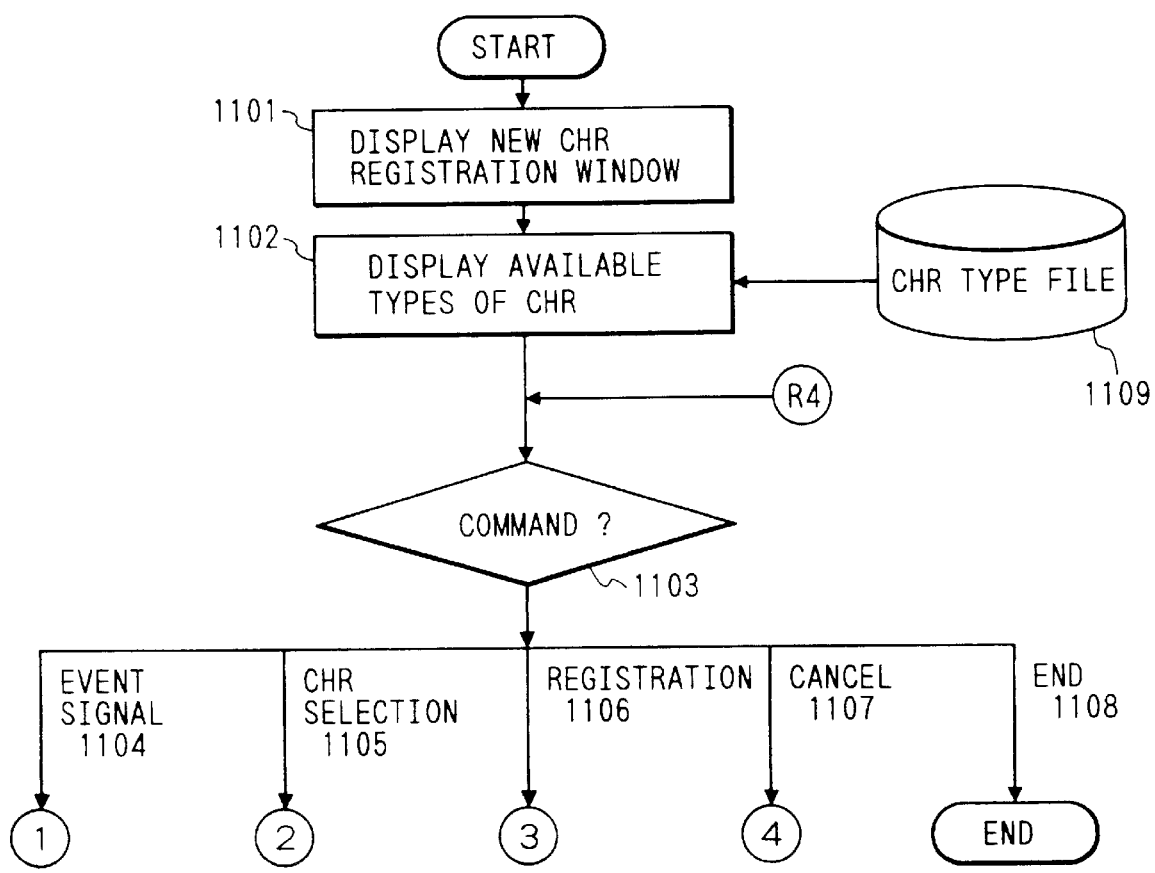
FIG. 42 is a flowchart of a process in a new character register.

The process flow of the new character register will be described below using FIGS. 20 and 21, and a flowchart of FIG. 42. In FIG. 20, reference numeral 1901 represents a message display area, reference numeral 1902 represents a handwritten character input area, reference numeral 1903 represents a font character input area, reference numeral 1904 represents an input code list area, reference numeral 1905 represents a scroll bar which allows more character codes to be displayed, and reference numerals 1906 to 1908 represent pen tap responsive function calling buttons.

Figure 43:
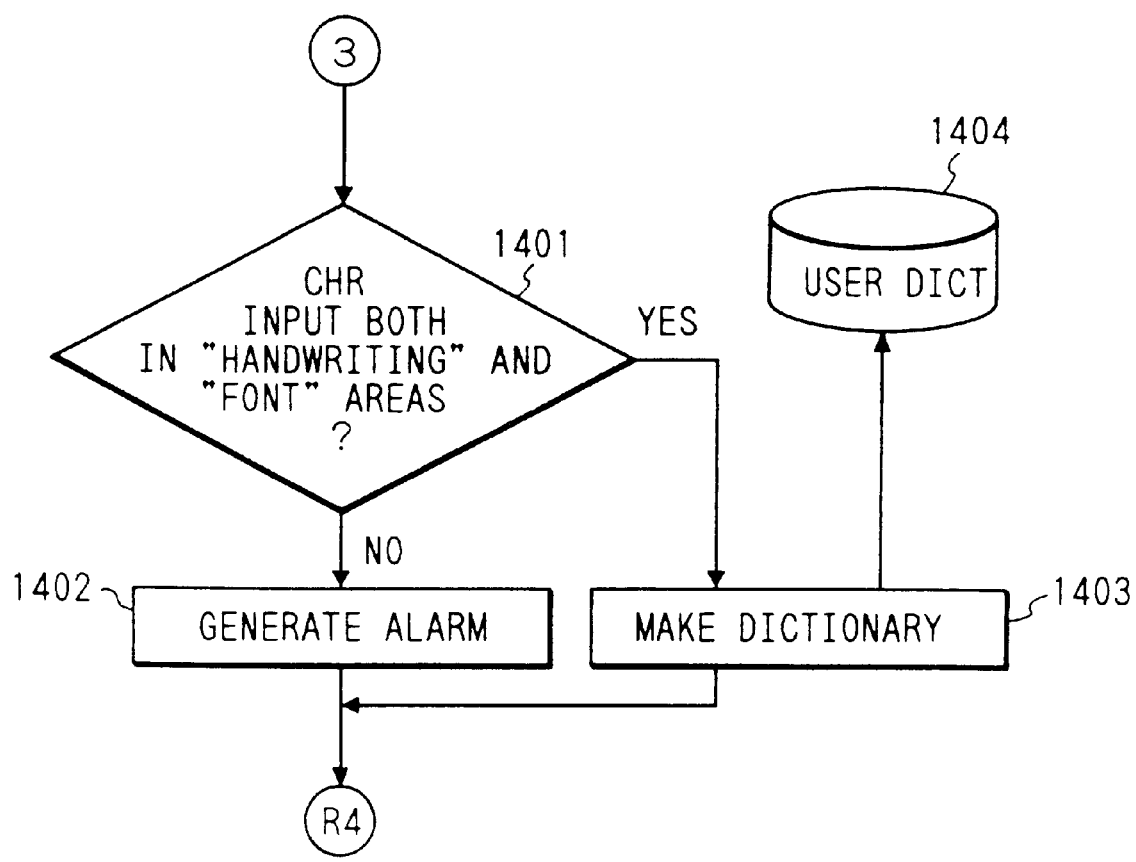
FIG. 43 is a flowchart of a registration process.

If a "character registration" 2104 is designated in the previous user dictionary editor, a skeleton of a screen as illustrated in FIG. 20 is created for the display in the form of pop-up window (1101). By the character registration herein used is meant a task for assigning character data by the user's original handwriting to a corresponding character code. Hence, a data input area for acquiring user's handwritten data and a character code input area corresponding thereto are necessary, wherein "handwritten" column 1902 is a handwritten data input area and "font" column 1903 is a character code input area, as illustrated in FIG. 20. Reference numeral 1904 of FIG. 43 represents an input code list for inputting the character code, the character code being input by selecting it from the list. Accordingly, the registerable character types must be displayed in the input code list, for which it is necessary that a character type file storing the registerable character types is created beforehand (1109). The registerable character types are displayed by reading this file (1102). If this display is ended, the operation waits for a command instruction from the user (1103). If a pen down input signal input by the user is detected in the "handwritten" column, its hand data is stored as a set of two-dimensional coordinates in a buffer area (1201 in FIG. 13), and drawn in the "handwritten" column at the same time. FIG. 20 illustrates a state where the user has entered a handwritten character corresponding to a font "珠" as indicated in 1902. The input of corresponding character code is performed in such a manner as to select a character code from the input code list, temporarily store it in the buffer area, and then get it (1301 in FIG. 14). The selected character is displayed in larger scale in the "font" column at every time (1302). If a "registration" button command 1906 is designated, it is confirmed whether or not both the handwritten character in the "handwritten" column and the character in the "font" column are input (1401). If both are input, the creation of a recognition dictionary for that character is started (1403). The creation of the recognition dictionary is accomplished by creating the standard pattern from character data by a well-known method. As a result, this standard pattern is newly created in the user dictionary, or added thereto (1404). If the input of hand data and character code is insufficient, a warning is generated (1402), and the same process is repeated until both the handwritten character and the character code of the character to be registered are input. If a "cancel" button command 1907 is designated, both the character data and the character code input in the "handwritten" and "font" columns are invalidated (1501 in FIG. 15), and the input is enabled again. FIG. 21 illustrates a state where a character "珠" has been entered by selecting it from the character code list. The "end" button command 1908 serves to erase this new character registration window and return the control to the user dictionary editor.

The process flow in the handwritten character reproducer will be described below using FIG. 23 and a flowchart of FIG. 44. In FIG. 23, reference numeral 2201 represents a handwritten character reproduction area, reference numeral 2202 represents a front display area destined for the handwritten character, reference numeral 2203 represents a hand stroke number display area of the handwritten character, reference numeral 2204 represents a standard stroke number display area of a subject font, and reference numerals 2205, 2206 represent pen tap responsive function calling buttons.

If a "handwritten reproduction" command button 2106 is designated in the previous user dictionary editor, a skeleton of a screen as illustrated in FIG. 23 is created and displayed in the form of pop-up window (1602). Since it is already confirmed that the character code is selected in the previous user dictionary editor, the enlarged font of the character is first displayed in the font area (1603). The number of strokes of the character is displayed together with the font display (1603), which is accomplished by preparing for a data base for a character standard stroke number in which the standard stroke number is described for each character (1607), and retrieving the subject character. To reproduce the character data within the user dictionary requires temporary extraction of dictionary data corresponding to the selected character, which is enabled by utilizing the previous character code correspondence table. Since the dictionary data of the corresponding character contains coordinate points as well as information of pen down and pen up operations, it is possible to determine of which stroke number the coordinate point belongs to a hand. Using this, the handwriting can be drawn by linearly connecting the coordinate points sequentially within the same stroke (1604).

The number of strokes for hand data is defined by counting how many times the pen down operation is made, and displayed (1605). If the button command (1606) is "redisplay" 2205, the reproduced drawn data is erased, and hand reproduction is performed again by using dictionary data. If an "end" button command 2206 is designated, this handwritten character reproduction window is erased, and the control is transferred to the registered character editor.

FIG. 23 illustrates a view where the character "あ" is selected and character hand is half reproduced.

Note that the window creation and signal detection as described in the text can be accomplished by using any of well-known techniques. While a pen was adopted as the point device, it is apparent that a mouse can be operated to enable to selection and entry.

Figure 44:
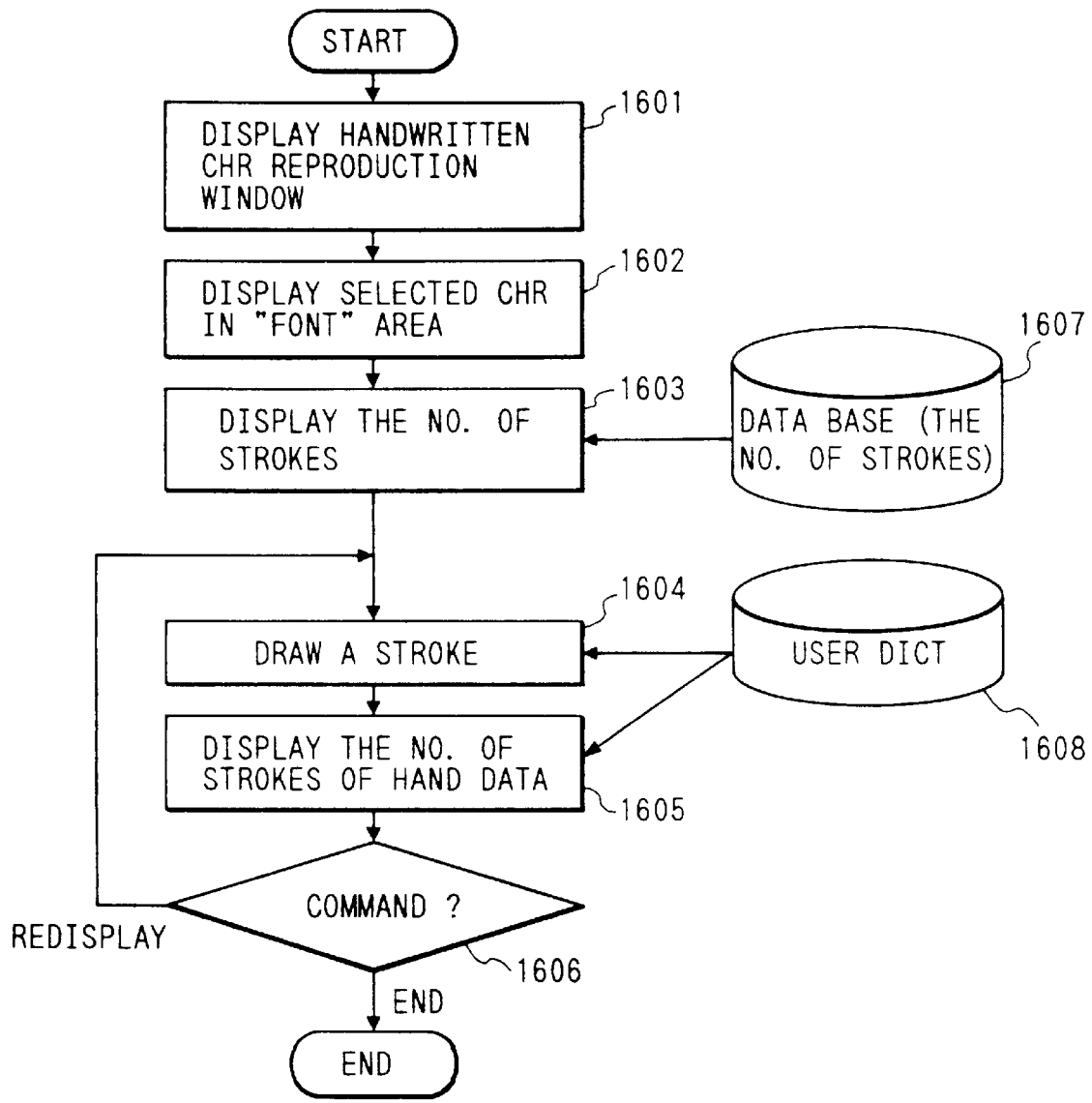
FIG. 44 is a flowchart of a process in a handwritten character reproducer.
Figures 47, 48:
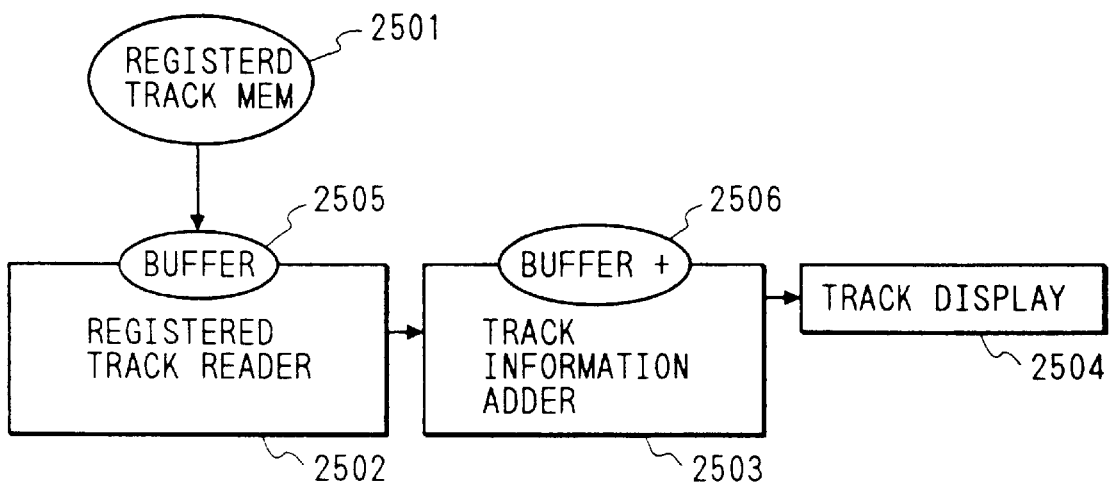
FIG. 47 is a block diagram of a reproduction display unit.
FIG. 48 illustrates a data control content of a buffer.
Figures 49, 50:
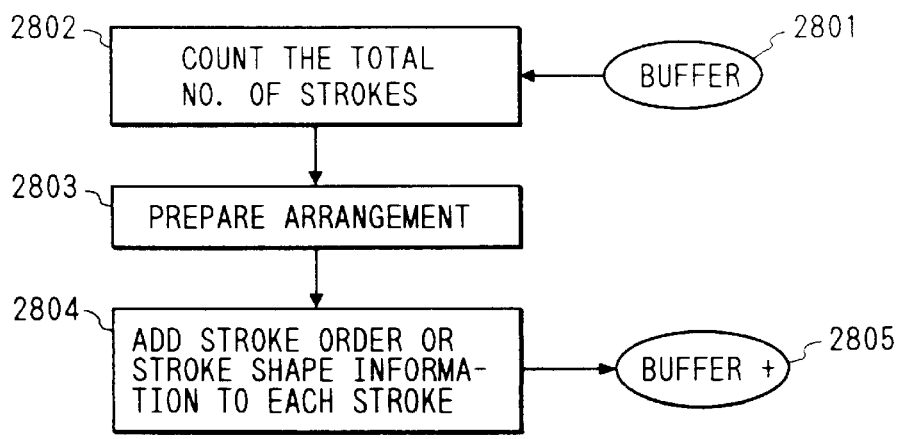
FIG. 49 illustrates a data content of buffer +.
FIG. 50 is a flowchart of track information adder means.

FIG. 47 is a detail configurational diagram of a reproduction display unit in this embodiment, corresponding to the portion consisting of steps 1604 and 1608 shown in FIG. 44 which is a flowchart of handwritten character reproducer (105) of FIG. 37, as previously described. The arrows in the figure indicate the data flow. Reference numeral 2501 represents registered track recording means, corresponding to step 106 of FIG. 37 or 1608 of FIG. 44. Reference numeral 2502 represents registered track reading means for reading the registered track stored in the registered track recording means into a buffer (2505). Reference numeral 2503 represents track information adder means for adding new information to track information stored in the buffer into a buffer+ (2506). Reference numeral 2504 represents track display means for displaying the information of buffer+ (2506) in the handwritten character reproduction area (2201) of FIG. 23. FIG. 48 illustrates a specific content of the buffer. The buffer directly stores the coordinates of points made up by pen-down, pen-up and stroke operations. FIG. 27 illustrates a specific content of buffer+. Buffer+ stores raw data of each stroke in an array and additional information including the order of the stroke in the order of the handwriting. FIG. 19 illustrates a flowchart of track information adder means (2503). The arrows in the figure indicate the data flow. First, the number of pen-up and pen-down operations are read from the buffer (2801) to count the total number of strokes (hands) (2802). Based on this total number of strokes, an array for the buffer+ (2805) containing the additional information is prepared (2803). Next, information reflecting the order of hand (color, sound and so on) or information reflecting the stroke shape is added to each stroke (2804) for storage into the buffer+ (2805).

The above-described constitution is all common to the following examples.

Figure 51:
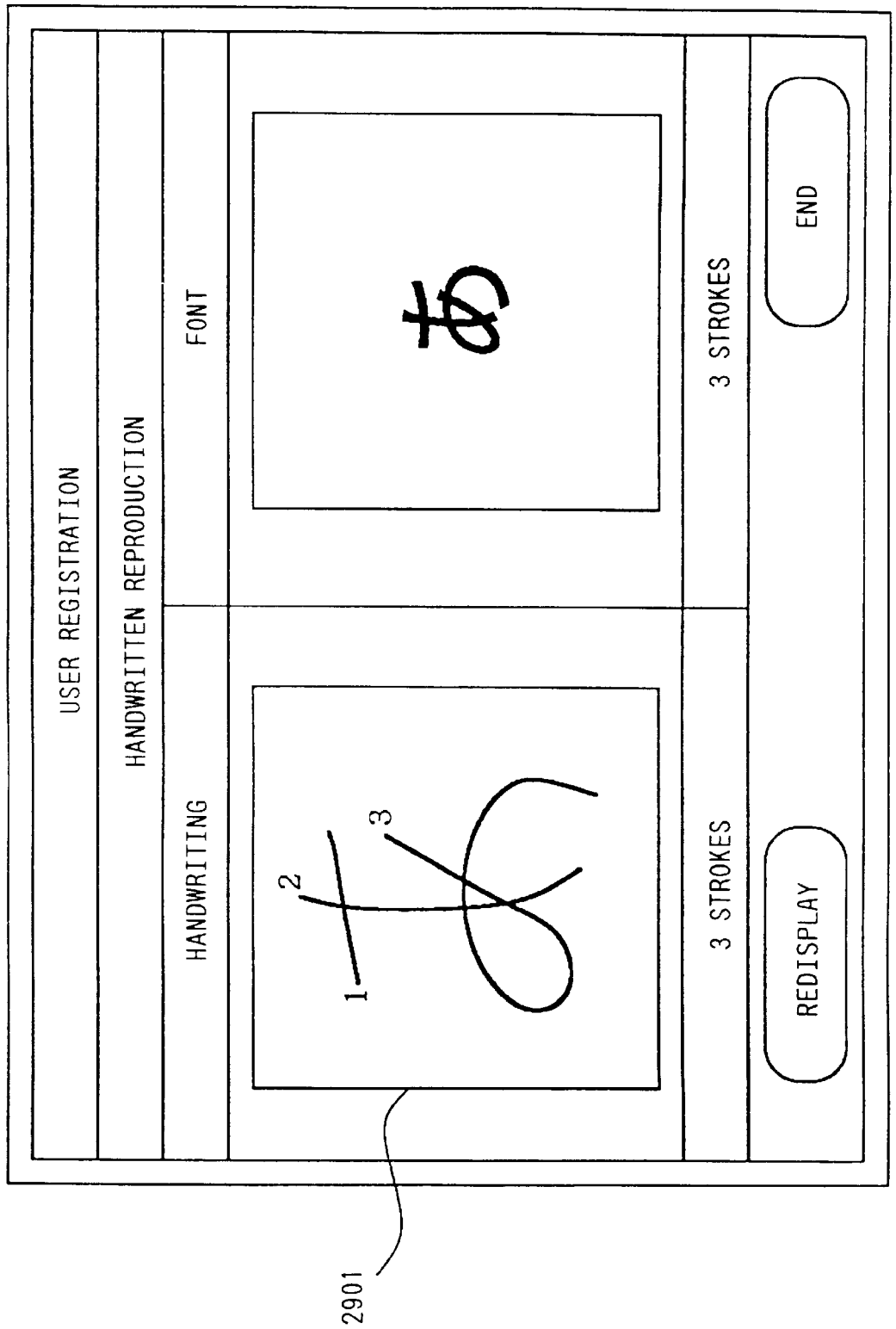
FIG. 51 is a handwritten character reproduction screen window (2).

An example of adding the stroke order number to each stroke by track information adder means (2503) will be described below. And track display means (2504) displays the stroke order number at the start or end point of each stroke in the handwritten character reproduced area of FIG. 51.

Figure 52:
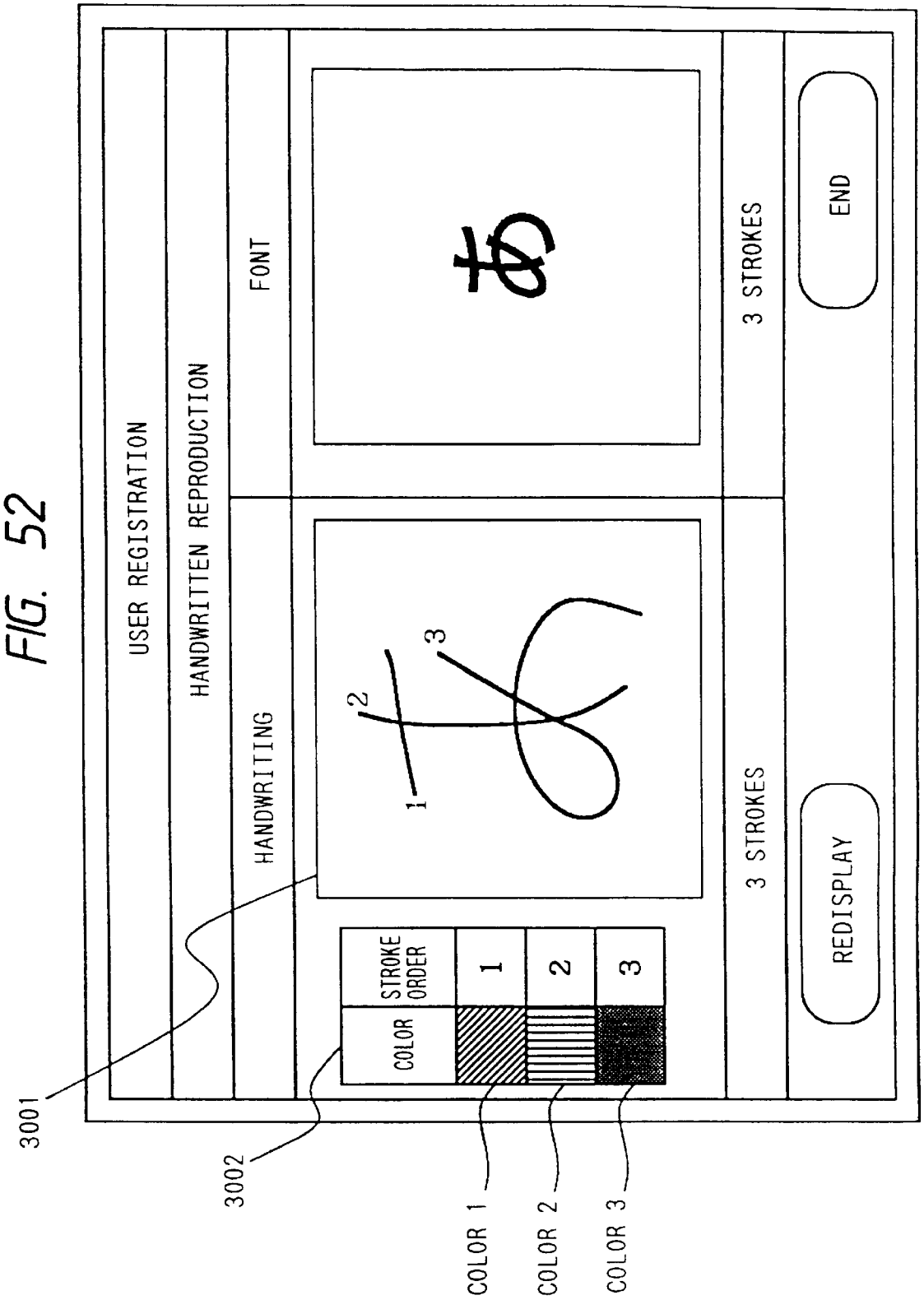
FIG. 52 is a handwritten character reproduction screen window.

An example of adding color information by track information adder means (2503) will be described below. Namely, a character having a stroke number of 3, as illustrated in FIG. 52, is displayed at 3001, with color 1 assigned to stroke 1, color 2 to stroke 2, and color 3 to stroke 3. Reference numeral 3002 represents a table listing the correspondence between color and stroke, the stroke order numbers being denoted corresponding to respective colors. In this case, if the number of strokes increases, the number of colors increases. For example, the mixing ratio of two kinds of coloring matter (red and blue or others) may be divided by the number of strokes, so that the stroke order can be reflected sensibly with the color. Note that if a greater number of strokes is given, the same color is possibly allocated to different strokes.

An example of adding sound information by the track information adder means (2503) will be described below. For example, the track display means (2504) reproduces added sounds during the display times of a stroke, with a sound "ド" added to the first stroke, "レ" to the second stroke, and "ミ" to the third stroke.

Or irrespective of the stroke order, sound information reflecting the shape of each stroke is added. For example, a higher sound is assigned to the stroke having higher Y coordinate, and a lower sound to the stroke having lower Y coordinate. And the track display means (2504) reproduces the sound with the frequency changing during the display times of a stroke. This allows the user to be provided with information concerning the shape of a stroke not only visually but also aurally.

An example of adding a function to a part of track display means (2504) of FIG. 25 will be described below.

Figure 53:
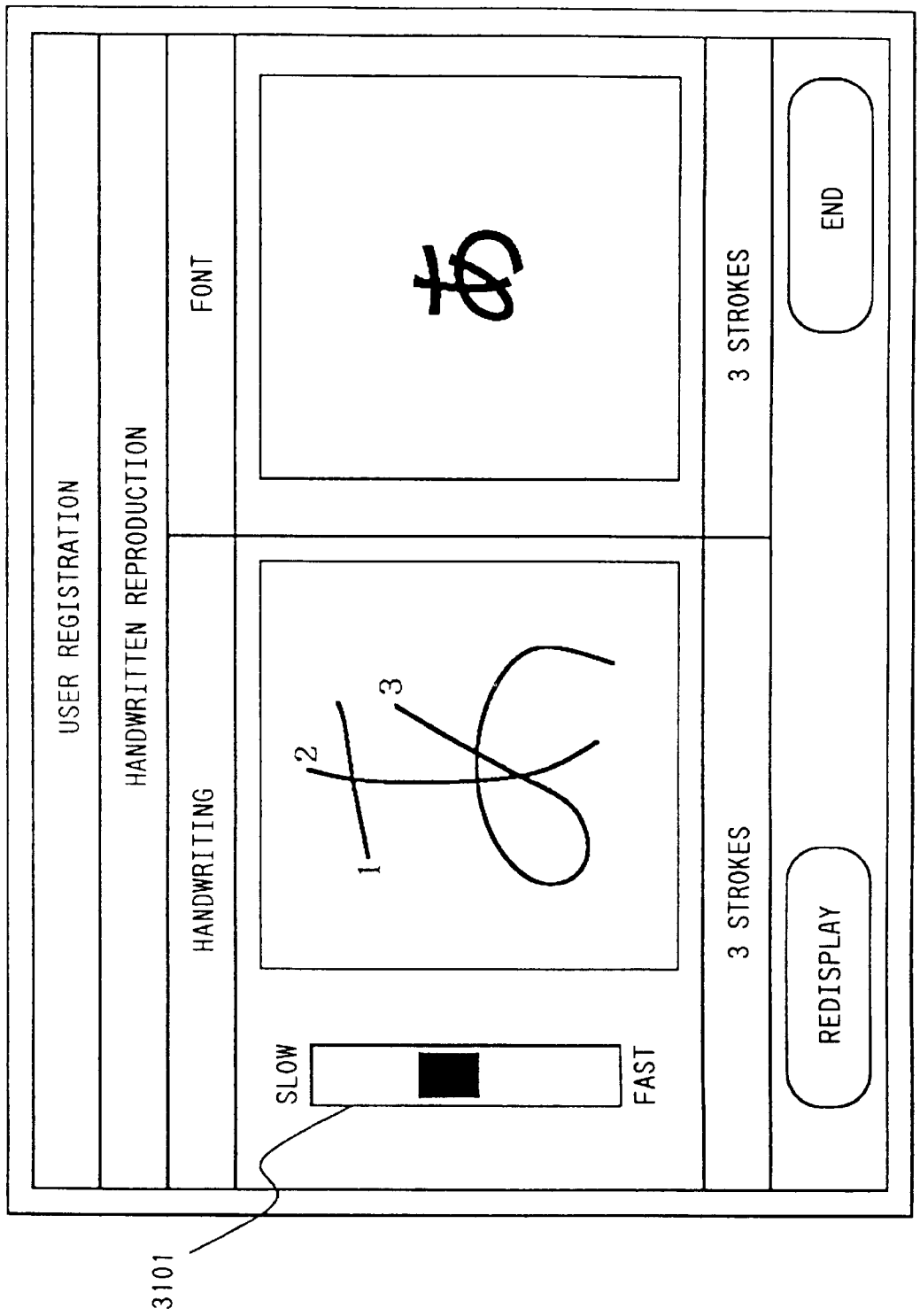
FIG. 53 is a handwritten character reproduction screen window (4).

Dial 3101 is added to GUI as illustrated in FIG. 53, wherein the display speed of each stroke is varied by operating this dial by the mouse. That is, if the dial is moved to the "slower" side, each stroke is displayed more slowly, while if the dial is moved to the "faster" side, each stroke is displayed more rapidly. The limit of "slower" is a stop of stroke display, and the limit of "faster" is an instantaneous display of the the stroke.

Figure 54:
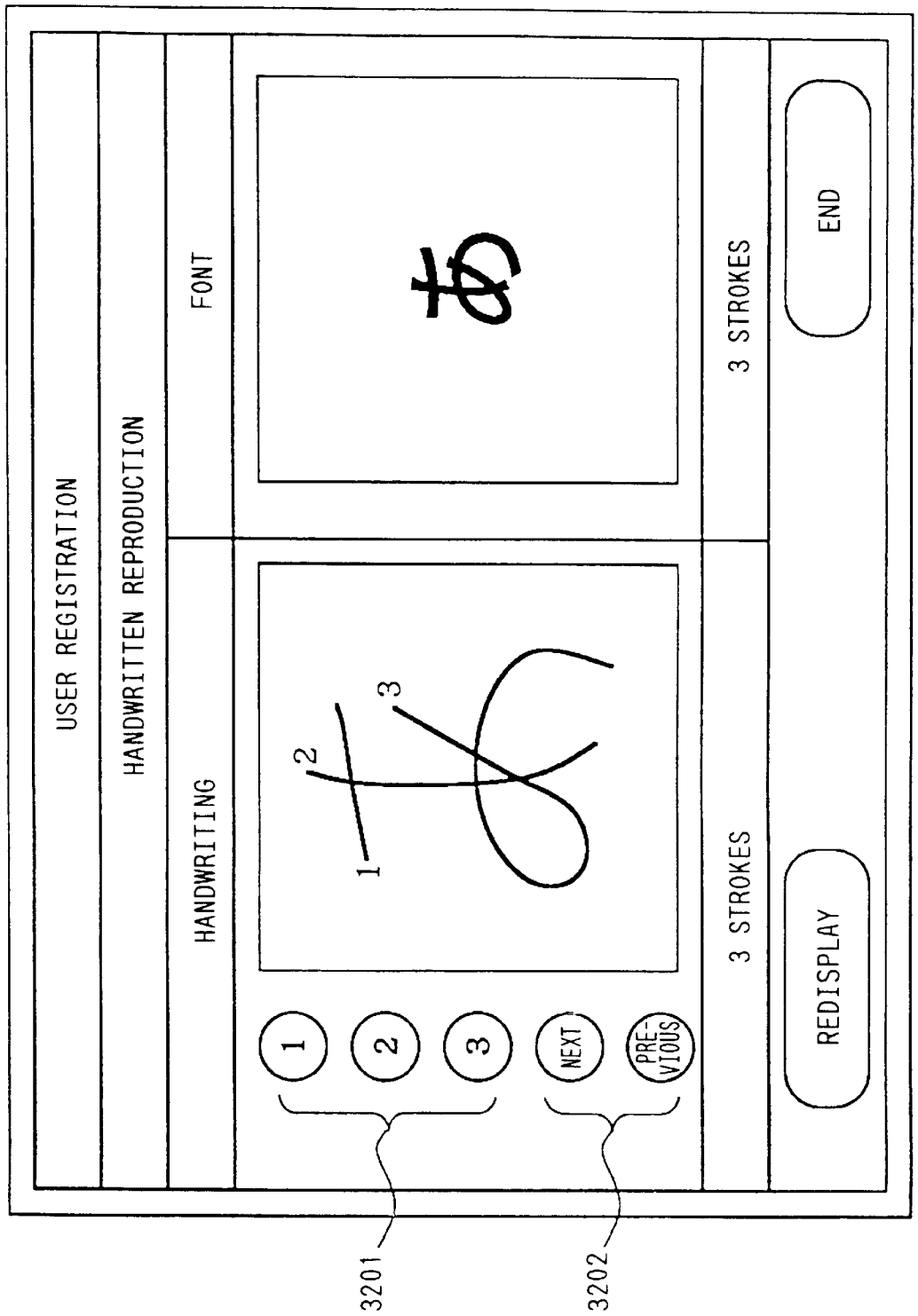
FIG. 54 is a handwritten character reproduction screen window (5).

An example of adding a function to a part of track display means (2504) will be described below. For example, buttons 3201 denoting the stroke order are provided as illustrated in FIG. 54, wherein the stroke is displayed corresponding to the stroke order number of the button clicked by mouse or depressed. In this case, the buttons corresponding to the total number of strokes (hands) are prepared.

Or a next or a previous stroke button 3202 may be clicked by mouse or depressed to change the order of display, and vary the display time interval between strokes.

An example of adding a function to track display means (2504) of FIG. 25 will be described below.

Figure 55:
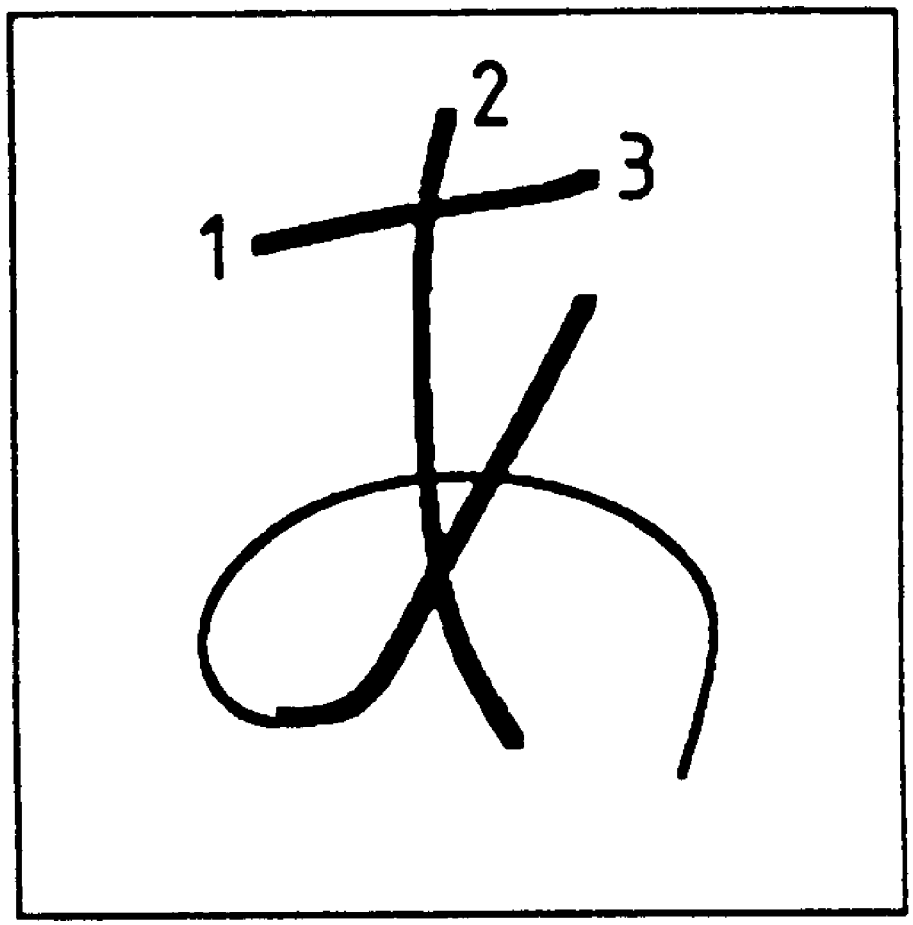
FIG. 55 illustrates the order of handwriting.

For example, the overall shape of a character is displayed prior to each stroke in a display manner apparently different from that of each stroke (in this case, displayed by the fine line in comparison with each stroke displayed by the bold line) as illustrated in FIG. 55, and the track of each stroke is displayed over. Also, the color may be changed.

Embodiment 4

A fourth preferred embodiment of the present invention will be now described in detail with reference to FIGS. 3, 5, 7, 8, 10–13, 14, 16, 18, 19–21, 23, 24, 30, 45, 46, and 56–66.

FIG. 30 is a schematic configurational diagram illustrating the configuration of an information processing apparatus according to one embodiment of the present invention. In the same figure, reference numeral 1 represents a CPU for controlling the whole apparatus, wherein various processings are preformed in accordance with programs stored in RON 2. Reference numeral 2 represents a ROM for storing a control program, an error processing program, and various programs operating in accordance with the flowcharts as hereinafter described. Reference numeral 3 represents a RAM for use as the work area of various programs and the temporary save area at the time of error processing. In this RAM are stored various data bases, including dictionaries for use with recognition operations, as will be described later, a user dictionary 106 operations, a user name index file 107, a character type file 108, and a character standard stroke number data base 109. Reference numeral 4 represents a coordinate input unit having a transparent coordinate input plate, not shown, and a pin, not shown, for designating the position of a coordinate point on the coordinate input plate, wherein electromagnetic induction or ultrasonic vibration is used in detecting the position of a coordinate point. Reference numeral 5 represents a VIDEO RAM (hereinafter referred to as "VRAM") having a memory corresponding one by one to the coordinate point on the coordinate input plate and storing bit information of a coordinate point input on the coordinate input plate or bit information of a dot calculated based on the coordinate point as will be described later. Reference numeral 6 represents a display for displaying bit image based on bit information stored in VRAM 5, wherein this display 6 uses an LCD but may be an EL element or CRT, for example. On this display 6, a variety of windows, as will be described later, are displayed.

Figure 56:
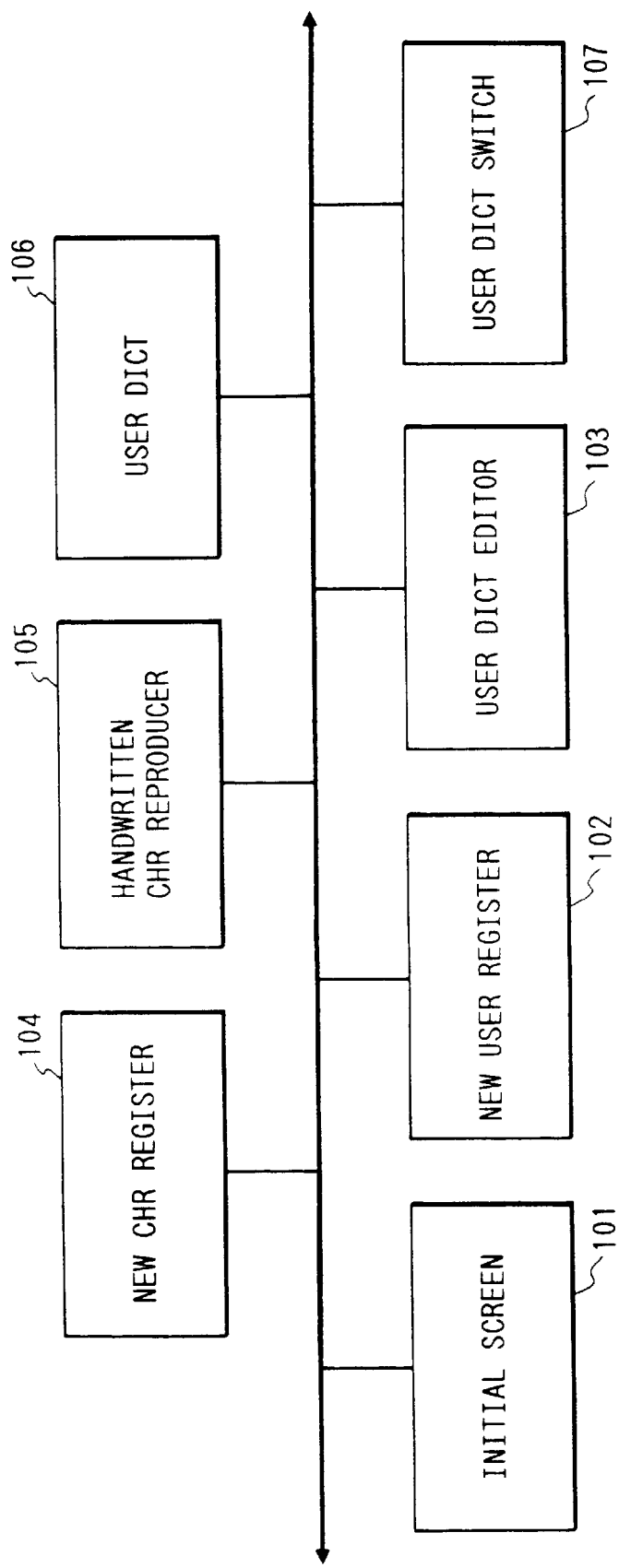
FIG. 56 is a configuration block diagram of a user registration application.

FIG. 56 is a configuration block diagram of a user registration application for implementing the present invention. Reference numerals 101 to 107 represent units each serving as a functional element of user registration in the on-line character recognition, the units being classified into a window application execution section with GUI (Graphical User Interface) and a dictionary section.

Initial screen 101 allows for the display of the list of registered users, and the confirmation for the owner of the user dictionary presently set. It has other functions including a designating function for the mode of newly registering the user and the mode of editing registered character within a user dictionary. New user register 102 effects the registration of the new user. User dictionary editor 103 displays the list of characters within the user dictionary, and allows for the designation of deletion or handwritten reproduction for each character. Also, it includes a designation function for newly registering the character handwritten by the user. New character register 104 carries out the character registration designated at the previous stage 103. Handwritten character reproducer 105 draws or reproduces the registered character designated at the previous stage 103 in the hand order. User dictionary 106 stores information of registered characters to implement the above functions. Herein, a plurality of users own different user dictionaries. User dictionary switch unit 107 switches the user dictionary set by 101 based on the information from a pen input unit and a screen output unit processed by a user application.

FIG. 3 is a window state transition diagram of user registration application. Reference numerals 201 to 205 represent windows for executing each function as described above. Reference numeral 206 represents a system to which the control is returned when this user registration application is ended. The arrows in the figure indicate the flow of control command to be entered with the button control in each window. The flow of control command and the transition of windows will be described below.

If a "new user registration" command is issued in new window 201, a new user registration window 202 appears newly in the form of a pop-up window. If a "registration & end" command is issued in the new user registration window 202, this pop-up window disappears, and the control is returned to the new item window 201. If a "user dictionary edit" command is issued in the new item window 201, the new item window 201 disappears, and a user dictionary edit window 203 appears newly. Herein, if a "new character registration" command is issued, a new character registration window 204 appears in the form of a pop-up window. The character registration operation on this window can be repeatedly executed unless an "end" command is issued. If the "end" command is instructed after the character is registered, the new character registration window 204 disappears, and the control is returned to the user dictionary edit window 203. A "character delete" command can be executed by plural times in the user dictionary edit window 203. Further, if a "handwritten reproduction" command is issued, a handwritten character reproduction window 205 appears in the form of a pop-up window. At the same time when the window is displayed, the reproduction is started, whereby the user of a "redisplay" command allows for the redisplay repetitively. The handwritten character reproduction window disappears by issuing the "end" command, and the control is returned to the user dictionary edit window. If the "end" is issued in the user dictionary edit window 203, the window of its own disappears and the new item window 201 appears again. Accordingly, it is only when the "end" command is issued in the initial item window 201 that the user registration application can be ended.

Note that the number of windows in the user registered application is two when the pop-up window of window 202, 204 or 205 appears, and one when the pop-up window of window 201 or 203 appears, as described above.

Figure 63:
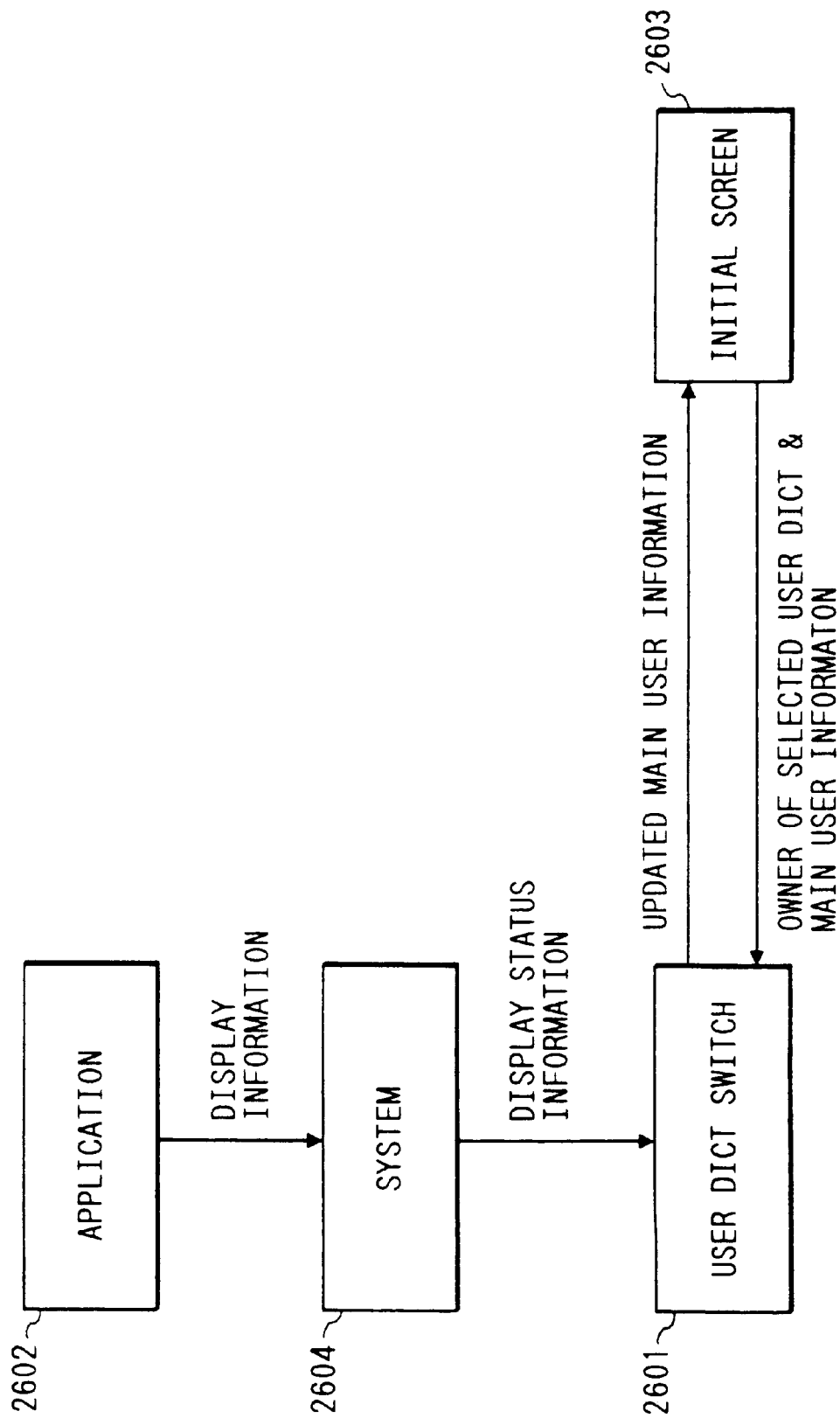
FIG. 63 is a block diagram of a user dictionary switch.

FIG. 63 is a block diagram illustrating the operation of a user dictionary switch unit for user registration application. Reference numerals 2601 to 2604 represent a user dictionary switch unit and other associated units involving the flow of information thereto or therefrom. It is noted herein that the owner of a user dictionary presently selected and main user information is transmitted from initial item window 2603 to user dictionary switch unit 2601, while the updated main user information is transmitted from user dictionary switch unit 2601 to initial item window 2603. Also, display status information is transmitted from a system 2604 from which the user dictionary switch unit 2601 is called. Reference numeral 2602 represents an arbitrary application for performing the recognition operation in which the user is involved, wherein the application display information is transmitted from this application 2602 to the system 2604, while the display status information from the system 2604 to the application 2602.

Figure 57:
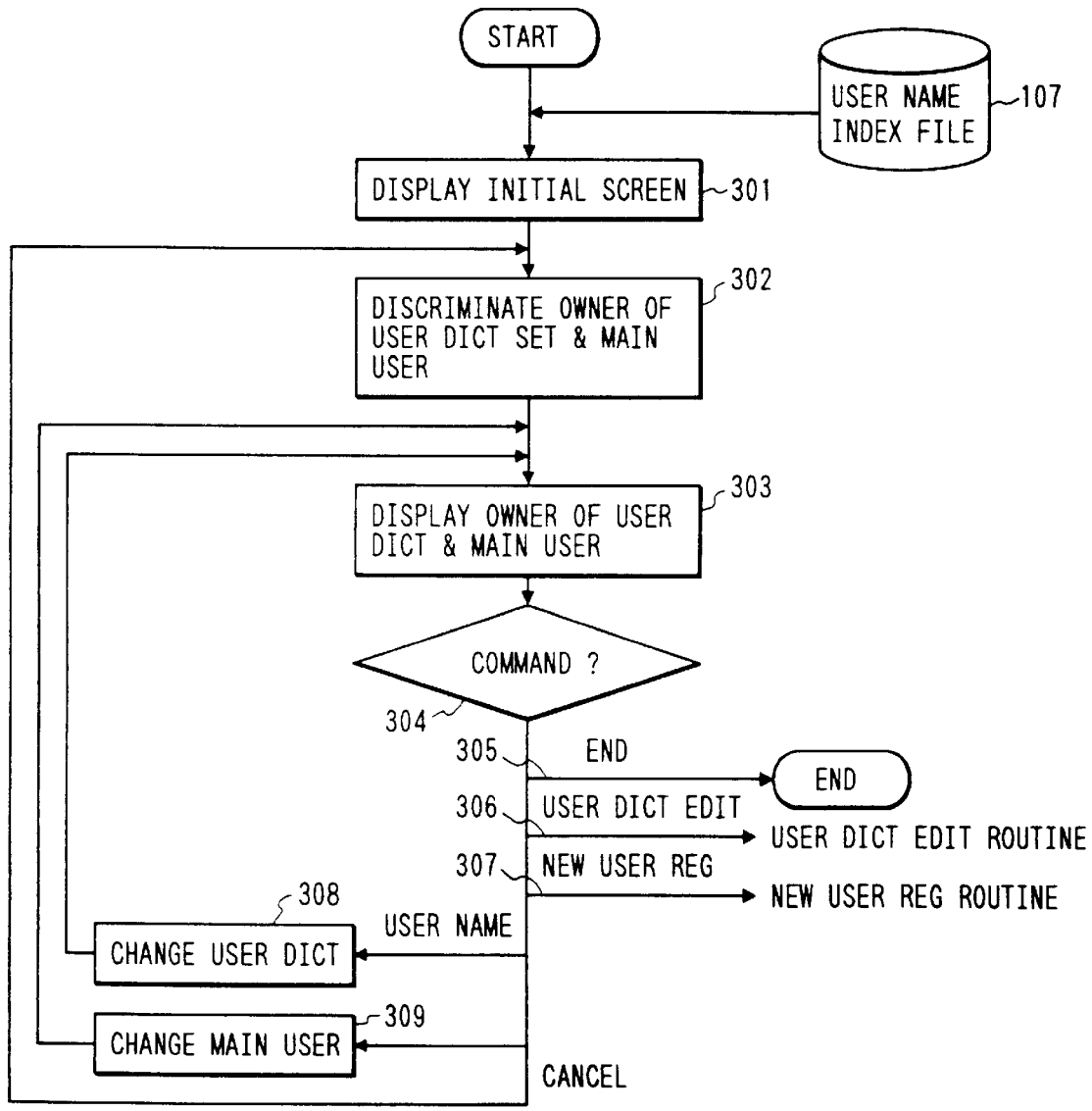
FIG. 57 is a flowchart of a process in an initial screen.

The details of the function in each window and the process flow will be now described with reference to the drawings of FIG. 57 and beyond.

Figure 62:
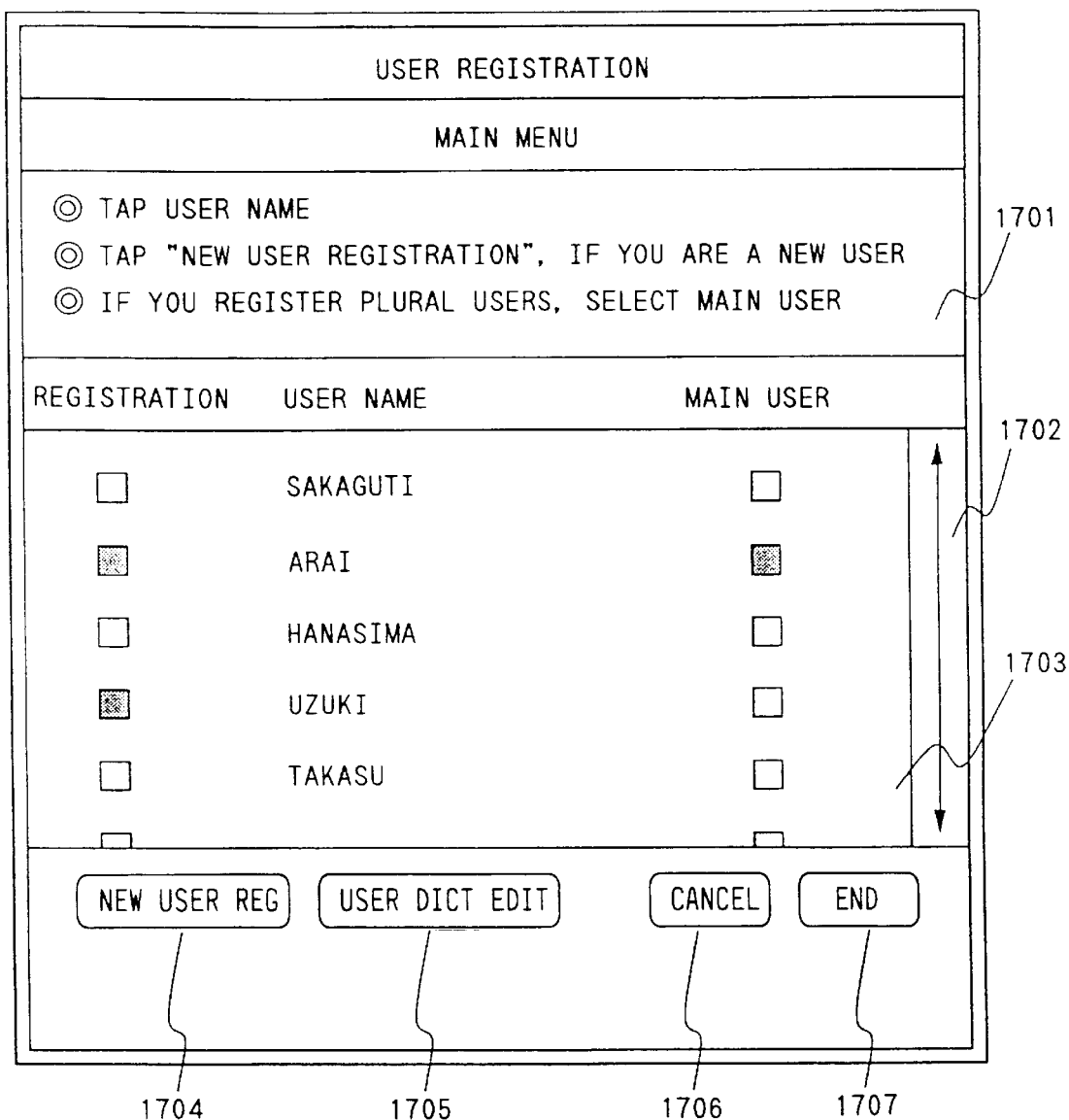
FIG. 62 is an initial screen window.

First, the process flow in the initial item window will be described using FIG. 62 and a flowchart of FIG. 57. In FIG. 62, reference numeral 1701 represents a message display area, reference numeral 1702 represents a user name list display and user dictionary owner display area, reference numeral 1703 represents a scroll bar for use when registered users can not be accommodated within one screen, and reference numerals 1704 to 1707 represent buttons for calling a function by a pen tap.

If the user registration application is started, a window is created at step 301, whereupon a registered user name is read from the user name index file 107. This user name index file 107 is a disk file having a structure as shown in FIG. 24, and which is readable and writable. The created window is as shown in FIG. 62. At step 302, the owner of a user dictionary set in the system is discriminated. If the owner is discriminated, the user who is an owner of the user dictionary selected is marked in the user name display area 1701 at step 303. Also, in this case, one particular user who has been registered as the main user is marked with a main user mark indicating the main user. For example, two users whose user name is "arai" and whose user name is "uzuki" are registered in FIG. 62, and particularly, the user whose user name is "arai" is provided with a main user mark indicating the main user. If the processing up to this point is ended, the procedure waits for a command instruction by the user (304).

If the user name is selected directly by a pointing device such as a pen, the addition of the owner of a user dictionary is demanded to the system at step 308 to change the setting. Similarly, if the check button portion directly indicating the main user is selected by a pointing device such as a pen, the registration of a main user of user dictionary 107 is demanded to the system at step 309 to change the setting. For other operations with the button command, if a "user dictionary edit" button 1704 is depressed (306), the control is transferred to a user dictionary edit routine, if a "new user registration" button 1705 is depressed (307), the control is transferred to a new user registration routine, and if a "cancel" button 1706 is depressed, the setting change of the user dictionary with the user name selection as performed before is invalidated, and the user dictionary setting is restored to the state before starting the application. If an "end" button 1707 is depressed (305), this user registration application is ended, and the control is returned to the system.

The process flow in the new user registration window will be described below with reference to FIG. 19 and a flowchart of FIG. 5. In FIG. 19, reference numeral 1801 represents a user name input area for inputting the user name, reference numeral 1802 represents a cancel function button for canceling the input of a user name, and reference numeral 1803 represents a registration & end function button for registering the input user name and ending this window.

If a "new user registration" command 1704 in the previous initial item window is instructed, a pop-up window as shown in FIG. 19 is displayed (401). Then, the operation is placed in a wait state for a command to be instructed by the user. If an event signal by a pen-down operation is detected in user name input area 1801 (404), an existing recognition routine is called. This routine subjects a character hand drawn in the user name input area to the on-line character recognition process to convert character data to character code (407). If a "registration & end" button command 1803 is instructed, the user name input and converted in the user name input area is determined as a new user name which is then additionally registered to the user name index file 107 (406). Thereafter, the current window is erased, and the control is returned to the initial item window again. On the other hand, if a "cancel" button command 1802 is instructed, the characters entered into the user name input area are all deleted (408), and the operation is placed again in a wait state for a user name input command.

Figure 58:
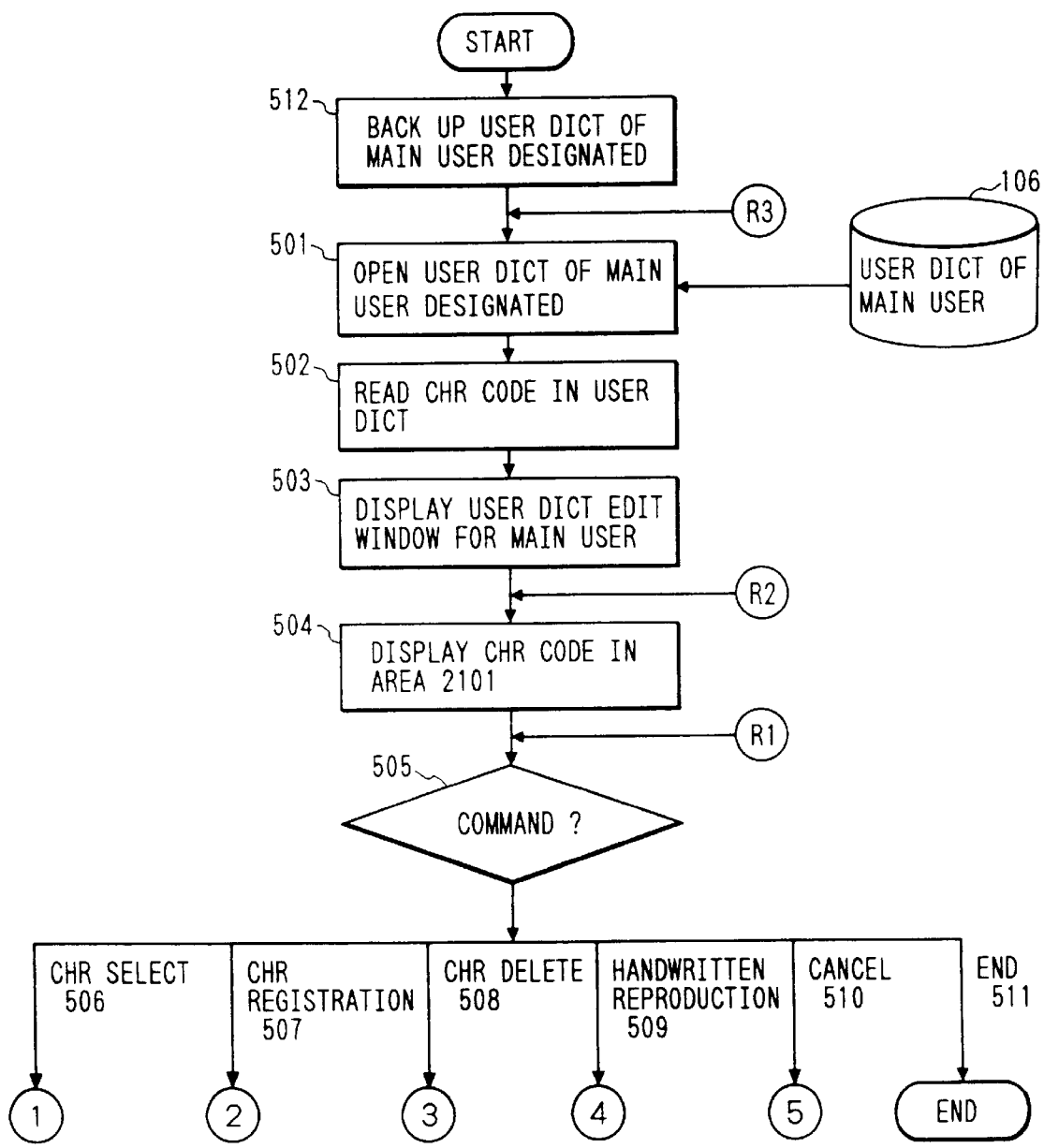
FIG. 58 is a flowchart (1) of a process in a user dictionary editor.
Figure 59:
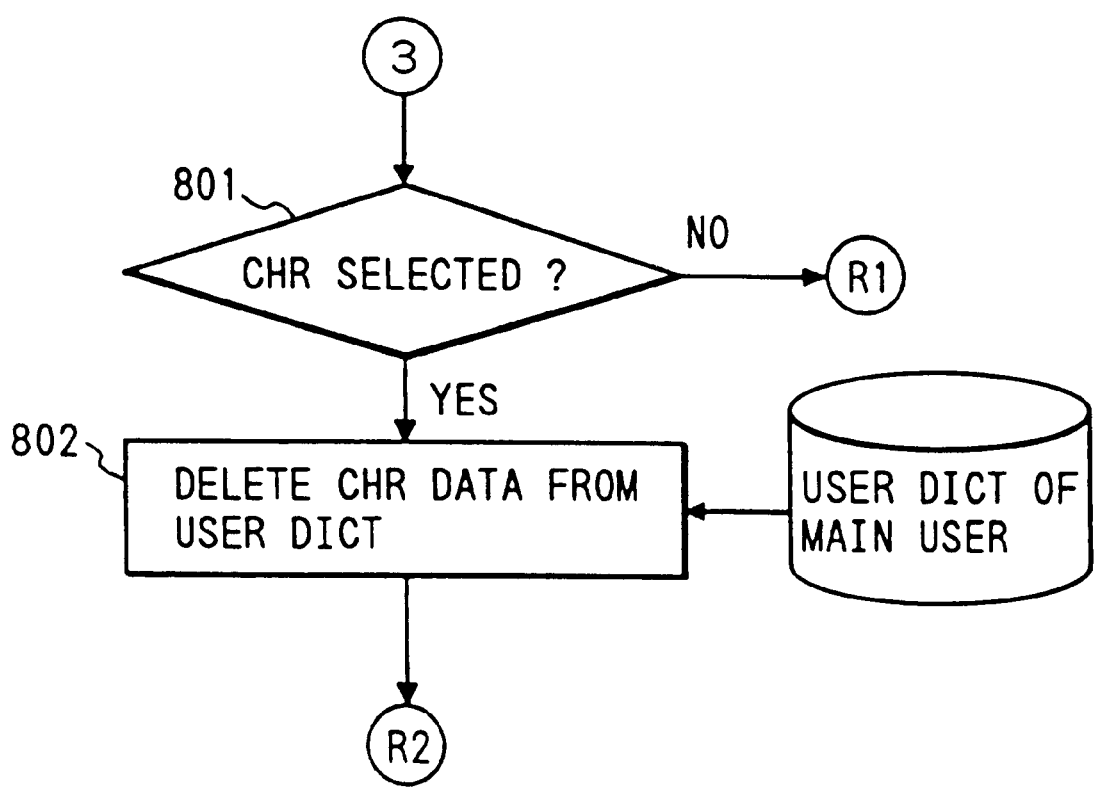
FIG. 59 is a flowchart (4) of a process in a user dictionary editor.
Figure 60:
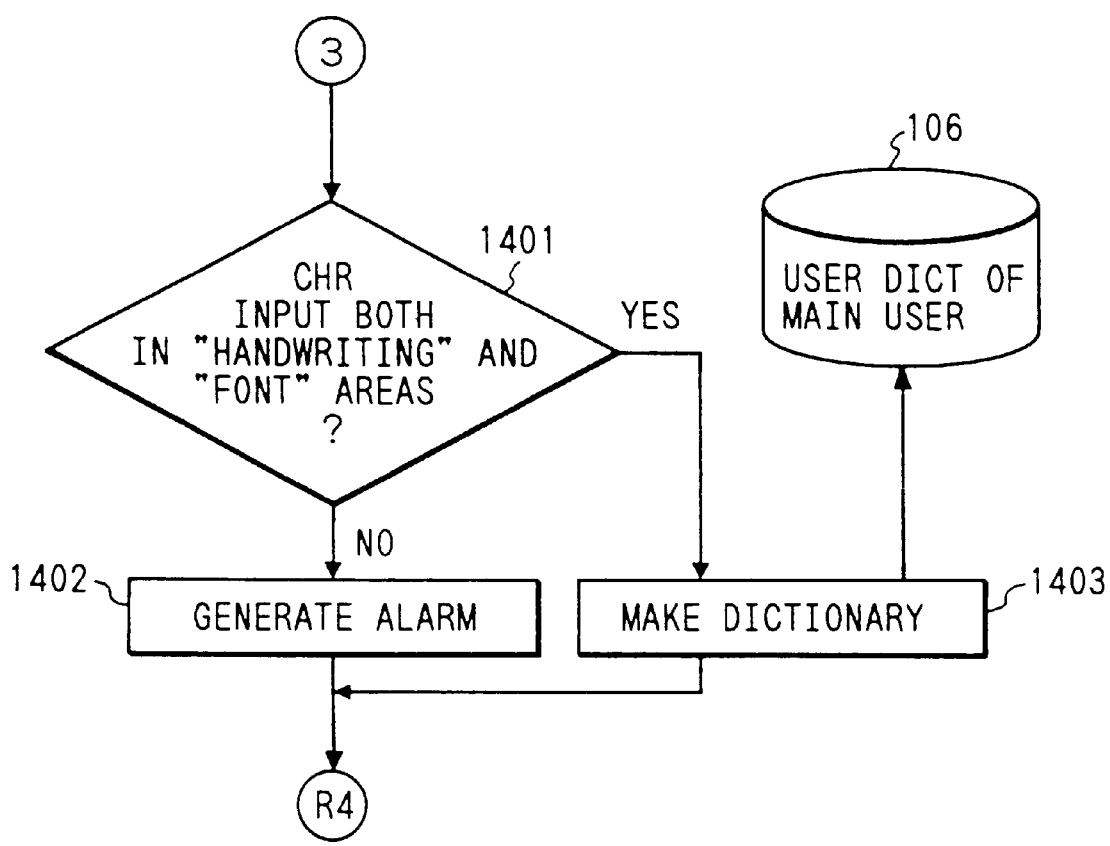
FIG. 60 is a flowchart (4) of a process in the new character register.
Figure 61:
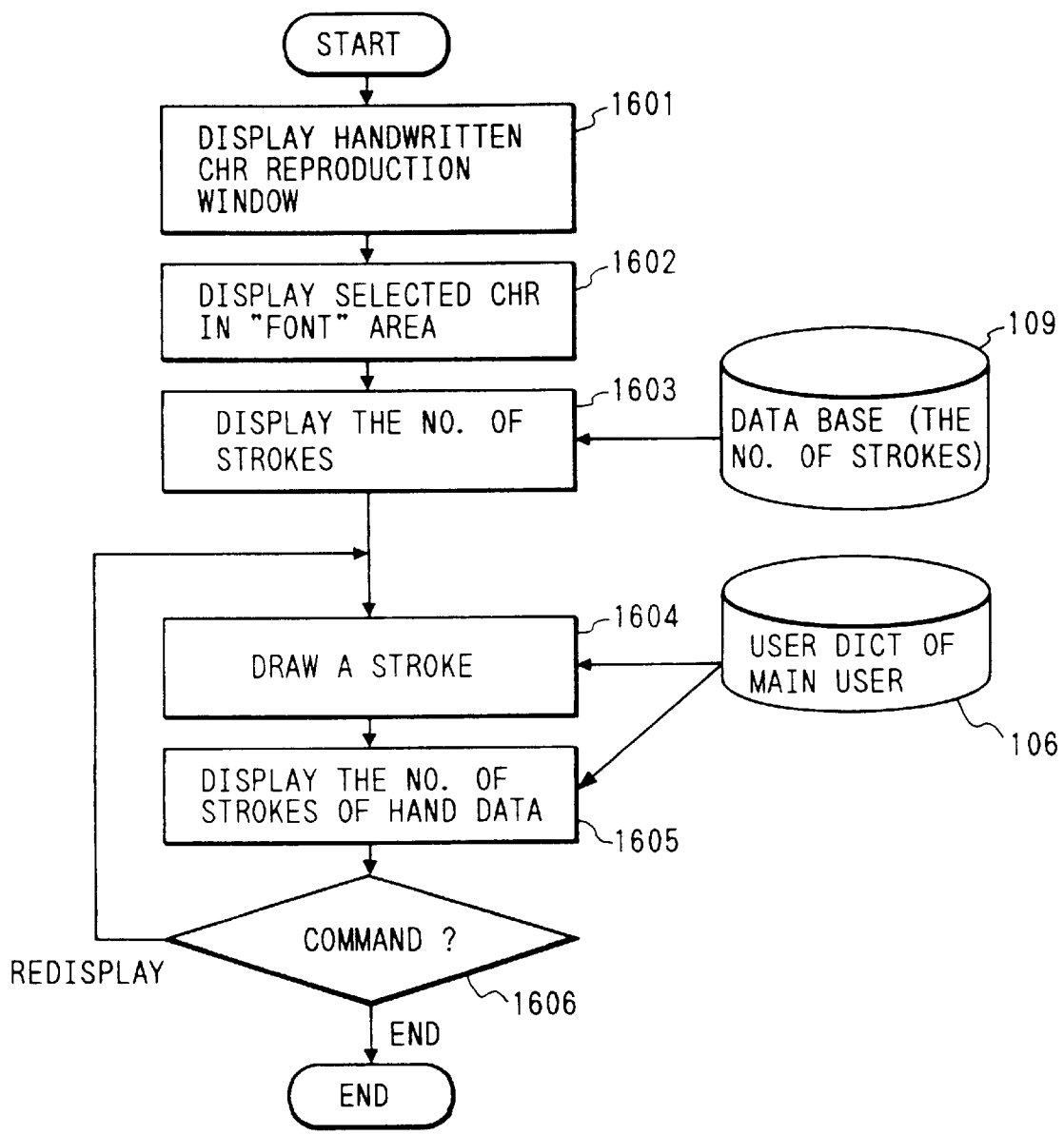
FIG. 61 is a flowchart of a process in a handwritten character reproducer.

The process flow in the user dictionary editor will be described below with reference to FIG. 45 and a flowchart of FIG. 58. In FIG. 45, reference numeral 2101 represents a message display area, reference numeral 2102 represents a registered character list display area, reference numeral 2103 represents a scroll bar which allows more registered characters to be displayed, and reference numerals 2104 to 2108 represent pen tap responsive function calling buttons.

If a "user dictionary edit" button 1705 is depressed in the previous initial item window, a user dictionary of a main user designated is copied and stored separately (512). This provides for a back up copy if the dictionary edit operation is canceled. Then, the user dictionary 106 is opened to read character codes within the user dictionary into a buffer area (502). Herein, to make characters within the user dictionary 106 to correspond to displayed characters, one to one, a character code correspondence table is created (601 in FIG. 3). For example, when six characters are registered, the correspondence table is as shown in FIG. 46. This character code correspondence table is created because if a multiplicity of dictionary character data with the same character code exist, the retrieval of dictionary data is not allowed uniquely only with the information of the character code in the editing of the character with the "delete" or "reproduce" command. User dictionary edit window of a main user as illustrated in FIG. 45 is displayed based on this character code correspondence table (503). A character code read at this time is displayed in the registered character list display area 2101 (504). Thereafter, the operation is placed in the wait state for a command instructed by the user (505). If a signal input by pen down operation is detected in the registered character list display area, a character located by a pen down operation is selected (506). The display number on the character code table is obtained from positional information of the selected character. The storage location of dictionary character data practically stored in the user dictionary is determined from its display number to obtain dictionary character data to be edited. If a "character registration" button command 2104 is designated (507), the control is transferred to a new character registration routine (701 in FIG. 8). If a "character delete" button command 2105 is designated (509), a discrimination is made as to whether or not the character in the registered character list display area is selected (801 in FIG. 59). If not selected, the operation returns to the wait state for a command instruction (505). If already selected, the dictionary data storage area of a character to be deleted is located using the character code correspondence table as previously noted. When it is found, the dictionary character data stored in the actual user dictionary 106 is deleted (802).

At the same time when the content of the user dictionary is changed, the character code correspondence table is also changed to update the character display of registered character list display area (504). If a "handwritten reproduction" button 2106 is depressed (509), the control is transferred to a handwritten reproduction routine when there is a character selected, or the operation is placed in the wait state for a character to be selected when there is no character selected (901). If a "cancel" button command 2107 is designated (510), a discrimination is made as to whether or not the character in the registered character list display area is selected (1001 in FIG. 11). If any character is selected, the character is invalidated, the display is placed in a character unselected state (1002), and the content of registered dictionary is restored to the original state before starting the dictionary edit window (1003). With this operation, the editing is enabled to restart. An "end" button command 2108 erases this user dictionary edit window, and returns the control to the previous initial item window.

The process flow of the new character register will be described below using FIGS. 20 and 21 and a flowchart of FIG. 12. In FIG. 20, reference numeral 1901 represents a message display area, reference numeral 1902 represents a handwritten character input area, reference numeral 1903 represents a font character input area, reference numeral 1904 represents an input code list area, reference numeral 1905 represents a scroll bar which allows more character codes to be displayed, and reference numerals 1906 to 1908 represent pen tap responsive function calling buttons.

If a "character registration" 2104 is designated in the previous user dictionary editor, a skeleton of a screen as illustrated in FIG. 20 is created for the display in the form of pop-up window (1101). By the character registration herein used is meant a task for assigning character data by a user's original handwriting to a corresponding character code. Hence, a data input area for acquiring user's handwritten data and a character code input area corresponding thereto are necessary, wherein "handwritten" column 1902 is a handwritten data input area and "font" column 1903 is a character code input area, as illustrated in FIG. 20. Reference numeral 1904, indicated centrally downward in FIG. 20, represents an input code list for inputting the character code, the character code being input by selecting it from the list. Accordingly, the registerable character types must be displayed in the input code list, for which it is necessary that a character type file 108 storing the registerable character types is created beforehand (1109). The registerable character types are displayed by reading this file (1102). If this display is ended, the operation waits for a command instruction from the user (1103). If a pen down input signal by the user is detected in the "handwritten" column, its hand data is stored as a set of two-dimensional coordinates in a buffer area (1201 in FIG. 13), and drawn in the "handwritten" column at the same time. FIG. 20 illustrates a state where the user has entered a handwritten pattern corresponding to a font "豫" as indicated at 1902. The input of a corresponding character code is performed in such a manner as to select a character code from the input code list, temporarily store it in the buffer area, and then get it (1301 in FIG. 14). The selected character is displayed in larger scale in the "font" column at every time (1302). If a "registration" button command 1906 is designated, it is confirmed whether or not both the handwritten character in the "handwritten" column and the character in the "font" column are input (1401). If both are input, the creation of a recognition dictionary for that character is started (1403). The creation of the recognition dictionary is accomplished by creating the standard pattern from character data by a well-known method. As a result, this standard pattern is newly created in the user dictionary 106, or added thereto (1404). If the input of hand data and character code is insufficient, a warning is generated (1402), and the same process is repeated until both the handwritten character data and the character code of the character to be registered are input. If a "cancel" button command 1907 is designated, both the character data and the character code input in the "handwritten" and "font" columns are invalidated (1501 in FIG. 16), and the input is enabled again. FIG. 21 illustrates a state where a character "豫" has been entered by selecting it from the character code list. The "end" button command 1908 serves to erase this new character registration window and return the control to the user dictionary editor.

The process flow in the handwritten character reproducer will be described below using FIG. 23 and a flowchart of FIG. 19. In FIG. 23, reference numeral 2201 represents a handwritten character reproduction area, reference numeral 2202 represents a font display area destined for the handwritten character, reference numeral 2203 represents a hand stroke number display area of the handwritten character, reference numeral 2204 represents a standard stroke number display area of a subject font, and reference numerals 2205, 2206 represent pen tap responsive function calling buttons.

If a "handwritten reproduction" command button 2106 is designated in the previous user dictionary editor, a skeleton of a screen as illustrated in FIG. 23 is created and displayed in the form of pop-up window (1602). Since it is already confirmed that the character code is selected in the previous user dictionary editor, the enlarged font of the character is first displayed in the font area (1603). The number of strokes of the character is displayed together with the font display (1603), which is accomplished by preparing for a data base for a character standard stroke number in which the standard stroke number is described for each character (1607), and retrieving the subject character. To reproduce the character data within the user dictionary 106 requires temporary extraction of dictionary data corresponding to the selected character, which is enabled by utilizing the previous character code correspondence table. Since the dictionary data of the corresponding character contains coordinate points as well as information of pen down and pen up operations, it is possible to determine of which stroke number the coordinate point belongs to,a hand (called a stroke). Using this, the handwriting can be drawn by linearly connecting the coordinate points sequentially within the same stroke (1604). The number of strokes for hand data is defined by counting how many times the pen down operation is made, and displayed (1605). If the button command (1606) is "redisplays" 2205, the reproduced drawn data is erased, and hand reproduction is performed again by using dictionary data. If an "end" button command 2206 is designated, this handwritten character reproduction window is erased, and the control is transferred to the registered character editor. FIG. 23 illustrates a view where the character "あ" is selected and character hand is half reproduced.

Figure 64:
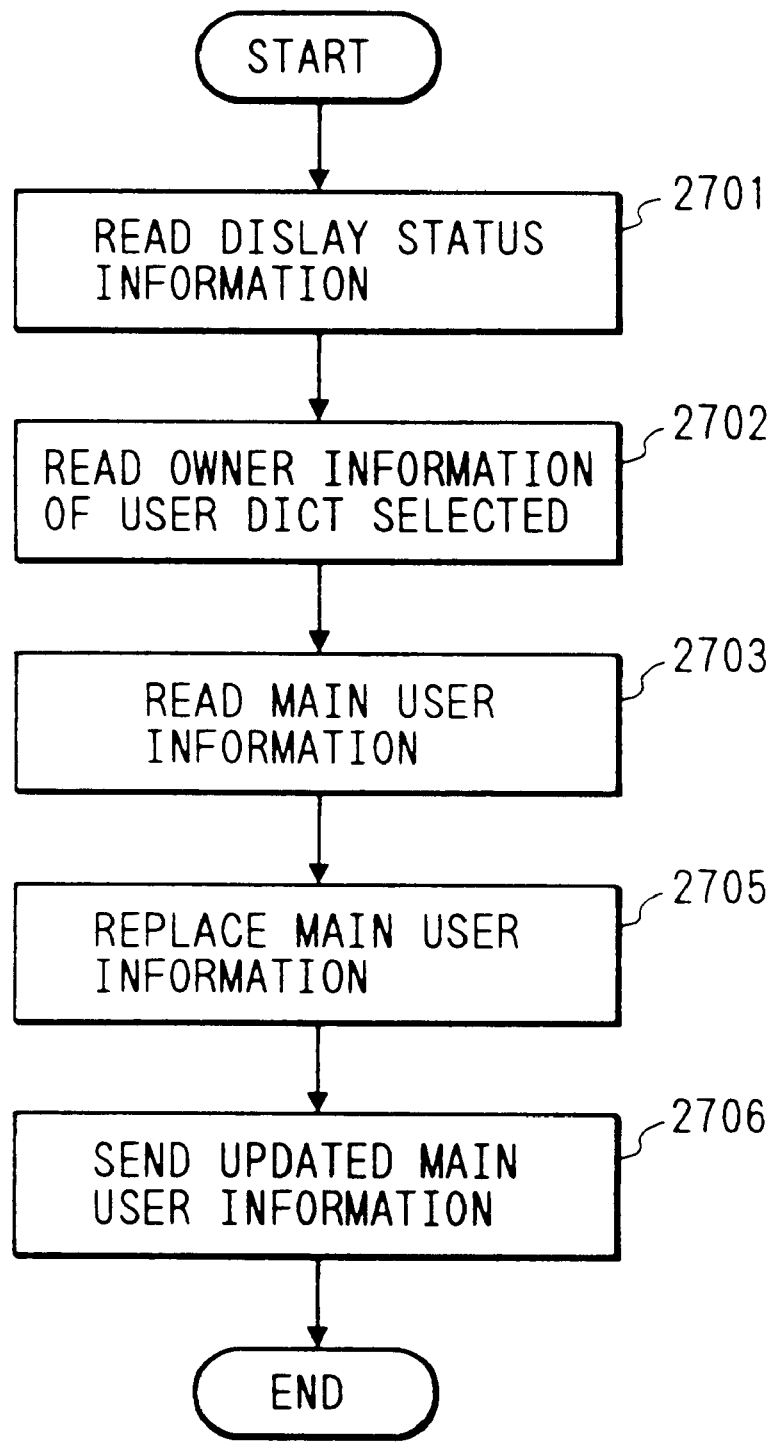
FIG. 64 is a flowchart of a process in the user dictionary switch.
Figure 65:
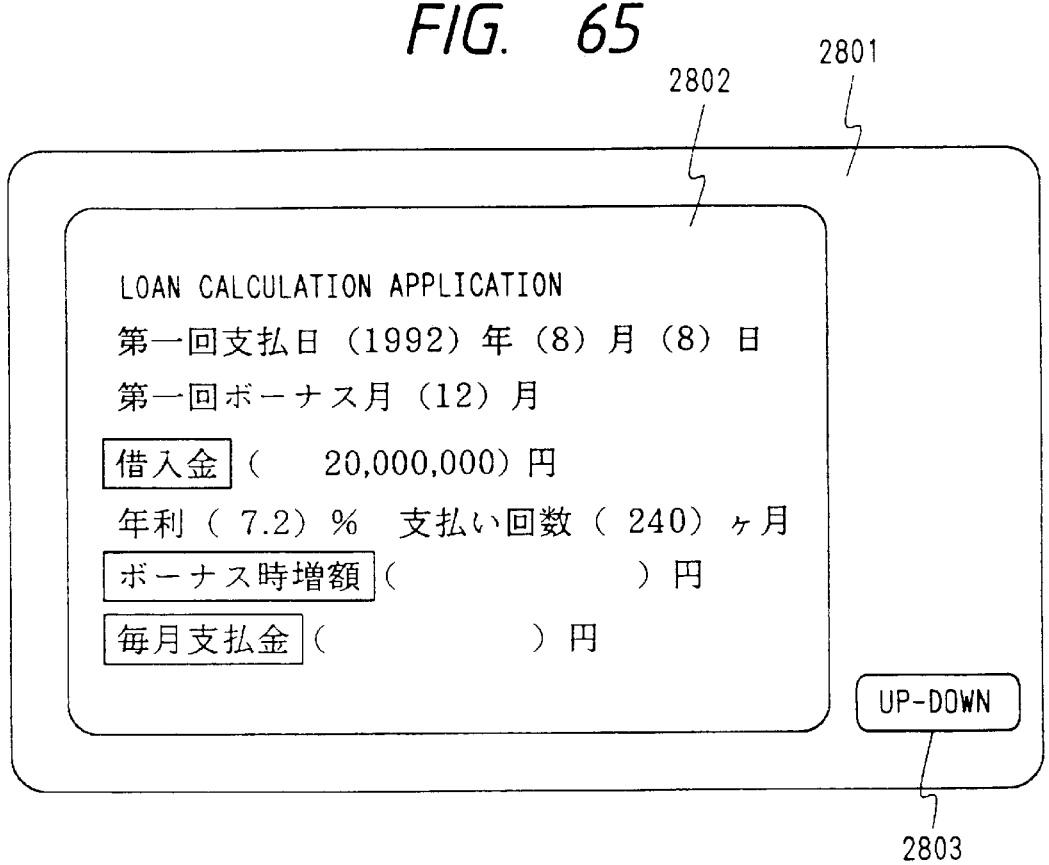
FIG. 65 is a window (1) of the user dictionary switch.
Figure 66:
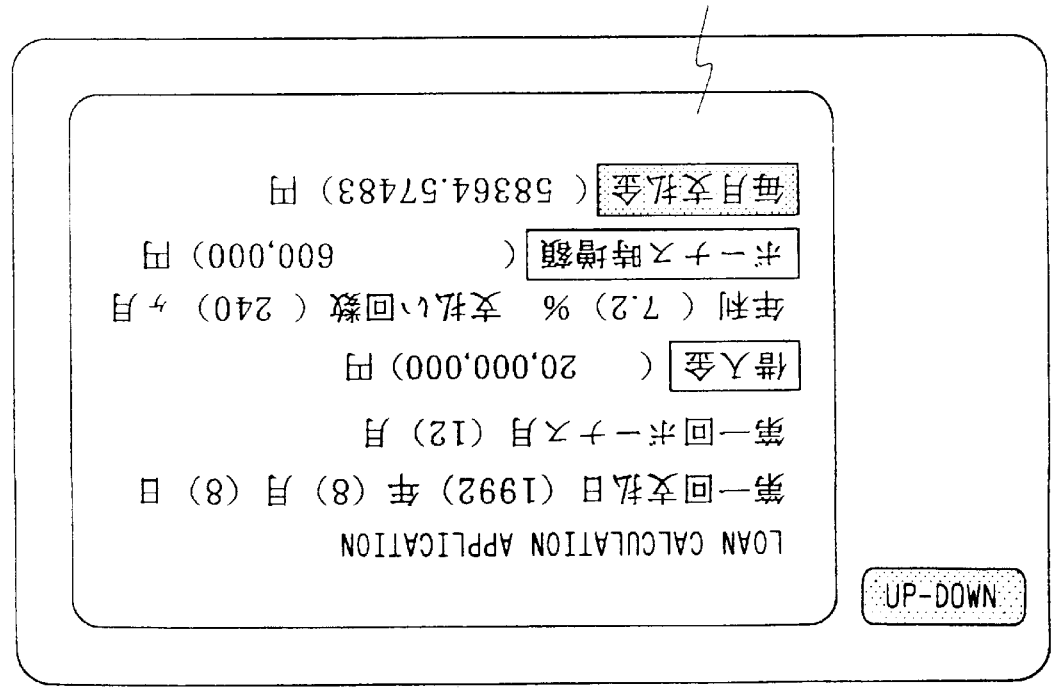
FIG. 66 is a window (2) of the user dictionary switch.

Finally, the process flow in the user dictionary switch unit will be described below using FIG. 63 and a flowchart of FIG. 64. Application 2602 in FIG. 63 is an arbitrary application. Herein, it is supposed to be a "loan calculation application" by handwriting input as illustrated in FIGS. 65 and 66. System 2604 is a system which governs a user dictionary registration application of the present invention and the application 2602. The system is provided with a specification of turning a display screen 2802 upside down by 180 degrees upon depression of a screen up-down button 2803 in FIG. 65 to change into a reverse display screen 2901 as shown in FIG. 66. This function is a very convenient function when a plurality of users, faced to each other, are alternately engaged in the input operation in applications for the presentation of a number of handwriting input items as shown in FIGS. 65 and 66, and has been long employed in many machines. In the application screen in FIG. 65, it is assumed that the registered content of a user registration application is as illustrated in FIG. 62. Among the user dictionaries registered, the user dictionaries are selected for a user whose user name is "arai" and a user whose user name is "uzuki", and particularly the user whose user name is "arai" is selected as the main user. Accordingly, in initial user condition of FIG. 65, the user dictionary of the user whose user name is "arai1" is preferentially employed, so that when a stroke information quite similar is registered as different font data in two user dictionaries with the user name "arai" and "uzuki" in the user registration application, the registered content which main user "arai" has registered can be caused to appear as a more preferential candidate whereby a comfortable operation can be expected. In this case, when the description of display screen 2802 is engaged by the user placed oppositely, namely, whose user name is "uzuki", the system 2604 switches the display screen to up-down display screen 2901 upon either of the users depressing the screen up-down button 2803. As a result, the system 2604 starts a process as shown in FIG. 64. First, at step 2701, display status information passed from the system is read, and subsequently, the owner information and main user information of a user dictionary selected in the initial item window 2603 are read (2702 and 2703). Based on the user dictionary information obtained at steps 2702 and 2703, main user information is replaced (2705). Finally, at step 2706, updated main user dictionary information is sent to the initial item window 2603, and the process of the user dictionary switch unit is ended. Consequently, in the state of FIG. 66, the user whose user name is "uzuki" is registered as the main user in the user registration application.

As described above, according to the present invention, by the up-down display screen, i.e., the change of user in charge of handwritten recognition, is notified by the system, the user dictionary of a main user is automatically switched among a plurality of registered users having preassigned priority, whereby a comfortable handwriting input environment can be subsequently provided.

Note that the creation of a window, the detection of a signal, and the reversion of a display screen as described in the text can be realized by well-known techniques. Also, though a pen was adopted as the pointing device, it is apparent that the operation by mouse also allows for the selection and entry of items.

While an example of automatic switching of a user dictionary was described in which with two user dictionaries can be selected, the registration of a main user is switched corresponding to two patterns of normal and reverse display, it should be noted that more user dictionaries can be registered at the same time, with more screen display directions corresponding thereto in an internal memory table, and subject user dictionaries are reset as the main user dictionary by switching of the screen display direction, whereby the use of a recognition dictionary for user registration corresponding to more complex switching between users can be realized.

While an example of switching the user engaged in recognition by changing the screen display direction was described, it should be noted that another means for detecting the switching of users, i.e., means for detecting by the user of a pen device, for example, composed of multiple stylus pens having distinguishable individual IDs which are provided in correspondence to a plurality of users may be employed, so that the switching of more users can be detected.

Embodiment 5

A fifth preferred embodiment of the present invention will be now described in detail with reference to FIGS. 3, and 67–80 of the accompanying drawings.

Figure 80:
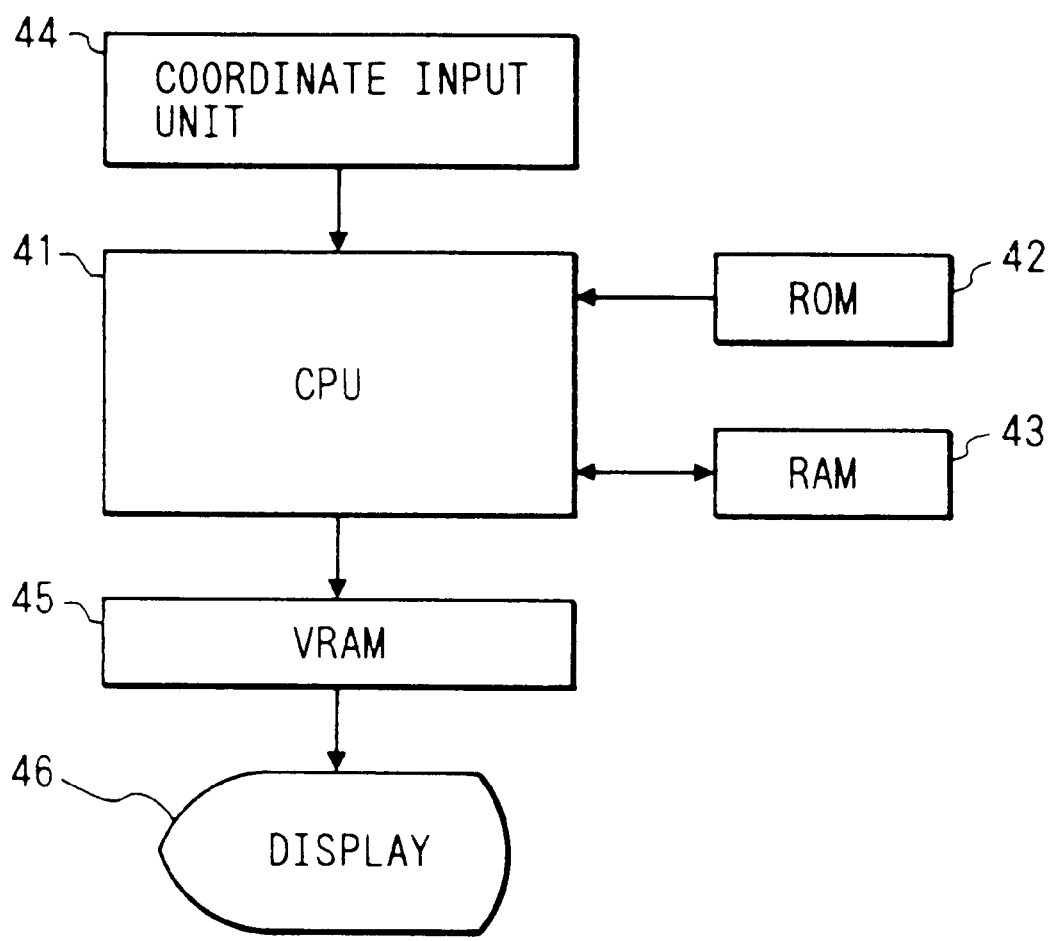
FIG. 80 is a block diagram illustrating the configuration of an information processing apparatus.

FIG. 80 is a schematic configurational diagram illustrating the configuration of an information processing apparatus according to one embodiment of the present invention. In the same figure, reference numeral 41 represents a CPU for controlling the whole apparatus, wherein various processings are performed in accordance with programs stored in ROM 42. Reference numeral 42 represents a ROM for storing a control program, an error processing program, and various programs operating in accordance with the flowcharts as hereinafter described. Reference numeral 43 represents a RAM for use as the work area of various programs and the temporary save area at the time of error processing. In this RAM 43 are stored various data bases, including dictionaries for use with the recognition operation, as will be described latter, a user dictionary 106, a user name index file 107, a character type file 108, and a character standard stroke number data base 109. Reference numeral 44 represents a coordinate input unit having a transparent coordinate input plate, not shown, and a pen, not shown, for designating the position of a coordinate point on the coordinate input plate, wherein electromagnetic induction or ultrasonic vibration is used in detecting the position of a coordinate point. Reference numeral 45 represents a VIDEO RAM (hereinafter referred to as "VRAM") having a memory corresponding one by one to the coordinate point on the coordinate input plate and storing bit information of a coordinate point input on the coordinate input plate or bit information of a dot calculated based on the coordinate point as will be described later. Reference numeral 46 represents a display for displaying bit image based on bit information stored in VRAM 5, wherein this display 46 uses an LCD but may be an EL element or CRT, for example. On this display 46, a variety of windows, as will be described later, are displayed.

In this embodiment, a user registration function will be particularly presented which allows the user to register a user's hand to the dictionary with an example of the on-line character recognition device.

Figure 79:
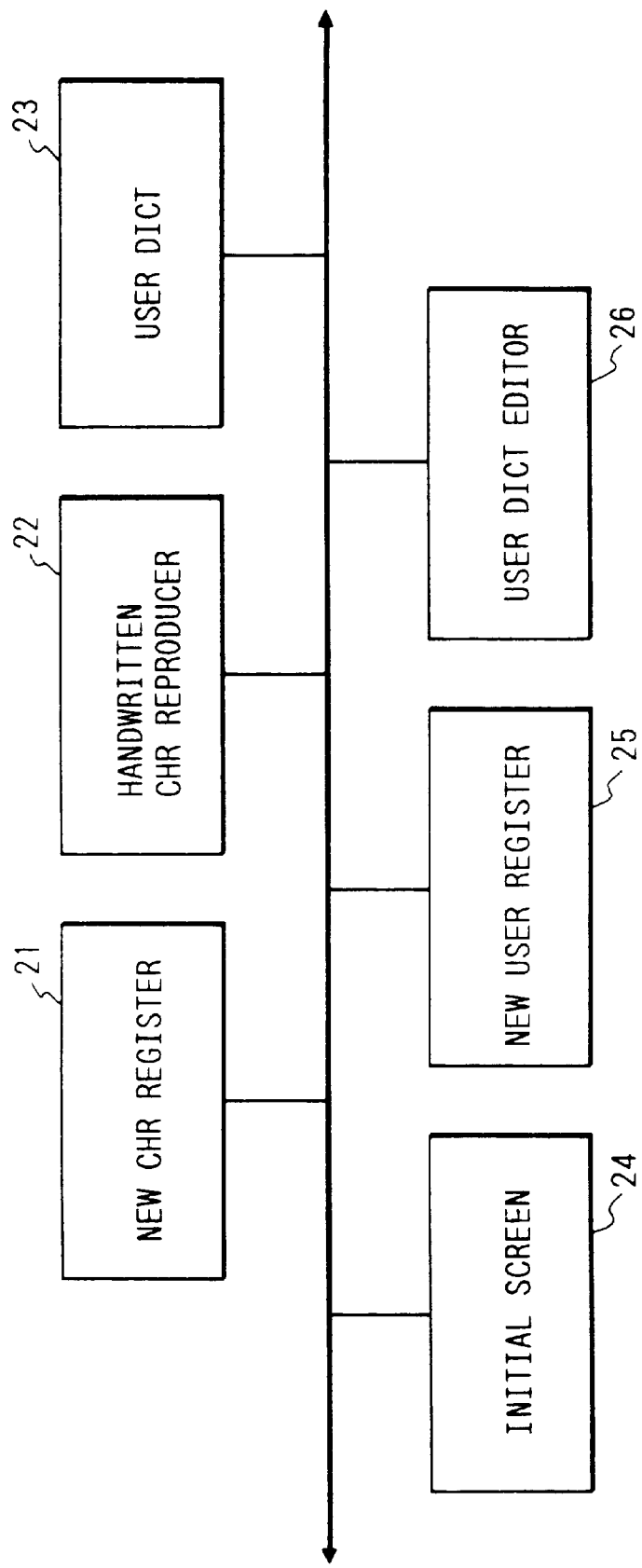
FIG. 79 is a block diagram of a user register.

FIG. 79 is a configuration block diagram of a user registration application for implementing the present invention. Reference numerals 21 to 26 represent units each serving as a functional element of user registration in on-line character recognition, the units being classified into a window application execution section (21 to 25) with GUI (Graphical User Interface) and a dictionary section (106).

Initial screen 24 allows for the display of the list of registered users, and the confirmation for the owner of the user dictionary presently set. It has other functions including a designating function for the mode of newly registering the user and the mode of editing registered character within the user dictionary. New user register 25 effects the registration of a new user. User dictionary editor 26 displays the lit of characters within the user dictionary, and allows for the designation of deletion or handwritten reproduction for each character. Also, it includes a designation function for newly registering the character handwritten by the user. New character register 21 carries out the character registration designated by the user dictionary editor 26. Handwritten character reproducer 22 draws or reproduces the registered character designated by the user dictionary editor 26 in the hand order. User dictionary 23 stores information of registered characters to implement the above functions. Herein, a plurality of users own different user dictionaries.

FIG. 3 is a window state transition diagram of user registration application. Reference numerals 201 to 205 represent windows for executing each function of FIG. 79, as previously described. Reference numeral 206 represents a system to which the control is returned when this user registration application is ended. The arrows in the figure indicate the flow of control command to be entered with the button control in each window. The flow of control command and the transition of windows will be described below using FIG. 3.

If a "new user registration" command is issued in new item window 201, a new user registration window 202 appears newly in the form of a pop-up window. If a "registration & end" command is issued in the new user registration window 202, this pop-up window disappears, and the control is returned to the new item window 201. If a "user dictionary edit" command is issued in the new item window 201, the new item window 201 disappears, and a user dictionary edit window 203 appears newly. Herein, if a "new character registration" command is issued, a new character registration window 204 appears in the form of a pop-up window. The character registration operation on this window can be repeatedly executed unless an "end" command is issued. If the "end" command is instructed after the character is registered, the new character registration window 204 disappears, and the control is returned to the user dictionary edit window 203. A "character delete" command can be executed plural times in the user dictionary edit window 203. Further, if a "handwritten reproduction" command is issued, a handwritten character reproduction window 205 appears in the form of a pop-up window. At the same time when the window is displayed, the reproduction is started, whereby the use of a "redisplay" command allows for the redisplay repetitively. The handwritten character reproduction window disappears by issuing the "end" command, and the control is returned to the user dictionary edit window. If the "end" command is issued in the user dictionary edit window 203, the window of its own disappears and the new item window 201 appears again. Accordingly, it is only when the "end" command is issued in the initial item window 201 that the user registration application can be ended.

Note that the number of windows in the user registered application is two when the pop-up window of window 202, 204 or 205 appears, and one when the pop-up window of window 201 or 203 appears, as described above.

Figure 67:
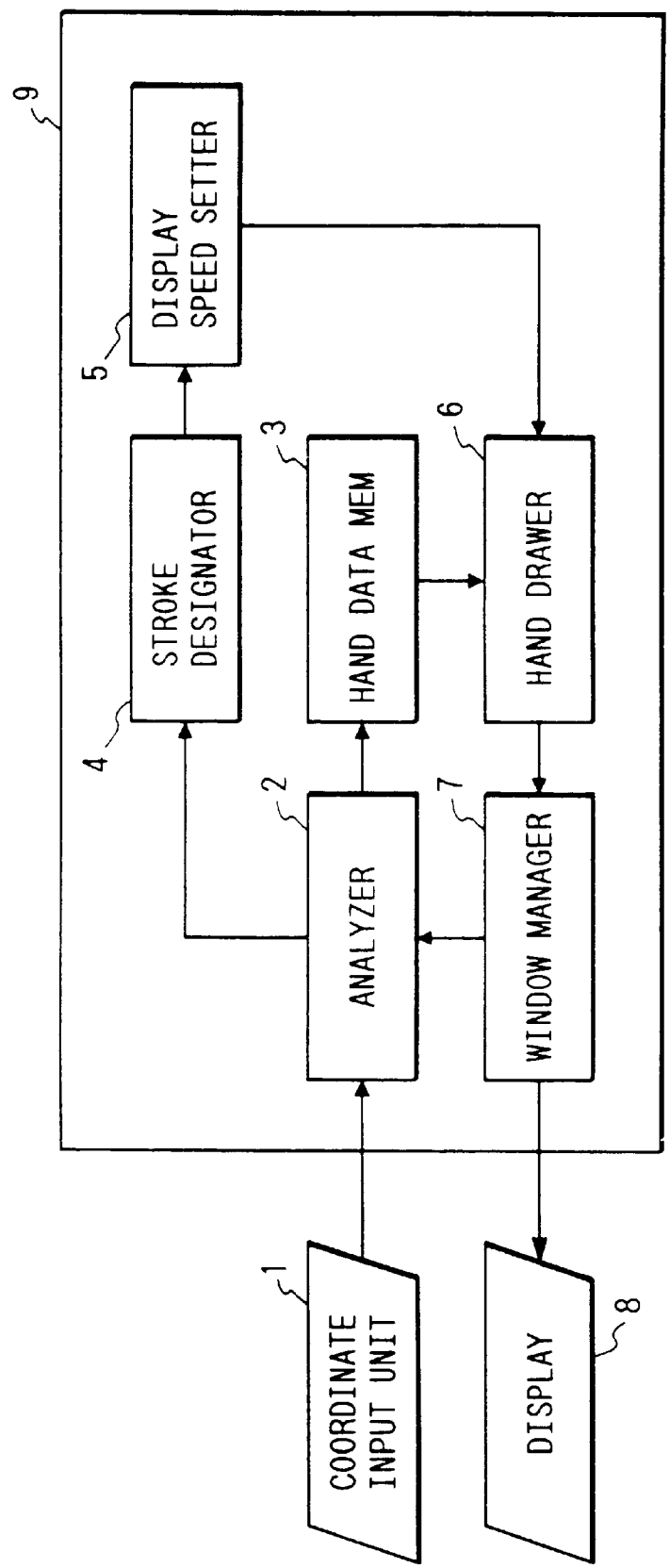
FIG. 67 is a block diagram of a handwriting display unit according to the fifth embodiment.

FIG. 67 illustrates a block diagram of a hand display device in this embodiment.

Display 8 is a liquid crystal display of dot matrix type, coordinate input unit 1 detects coordinates input by handwriting by a pen on the display, and processor 9 performs processing and displays on the display 8.

Figure 68:
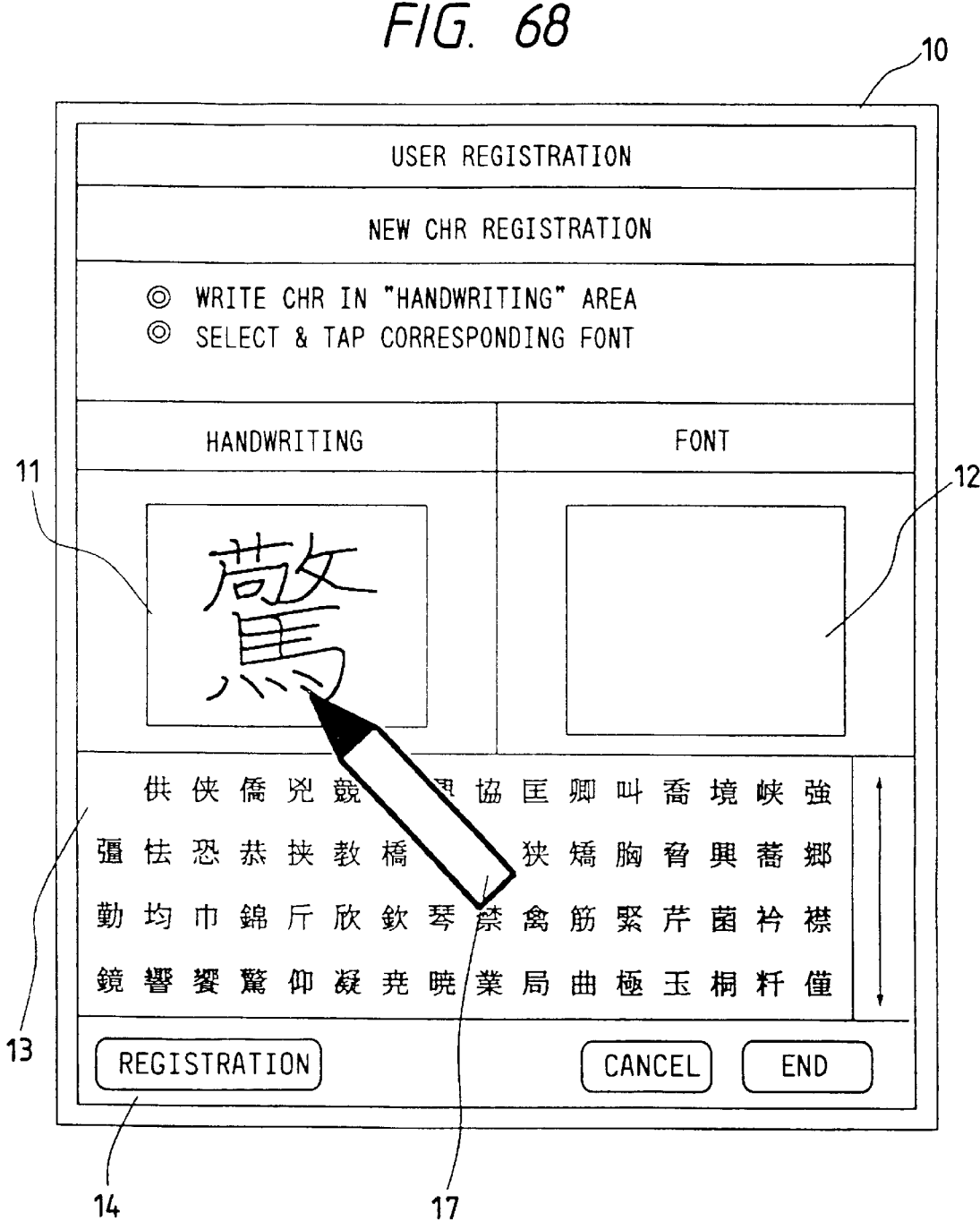
FIG. 68 is a view of a screen for the user to register new handwriting.
Figure 69:
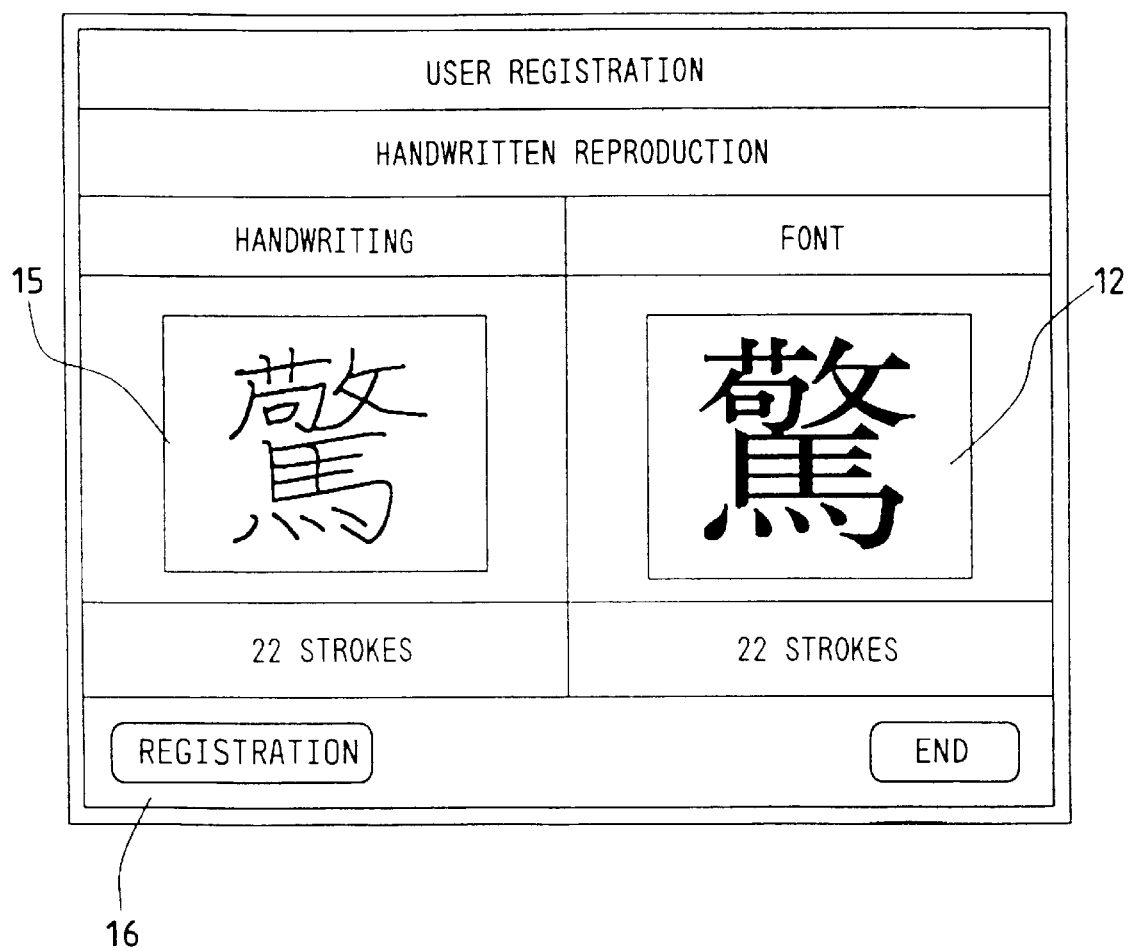
FIG. 69 is a view of a screen for the user to redisplay the handwriting registered.
Figure 70:
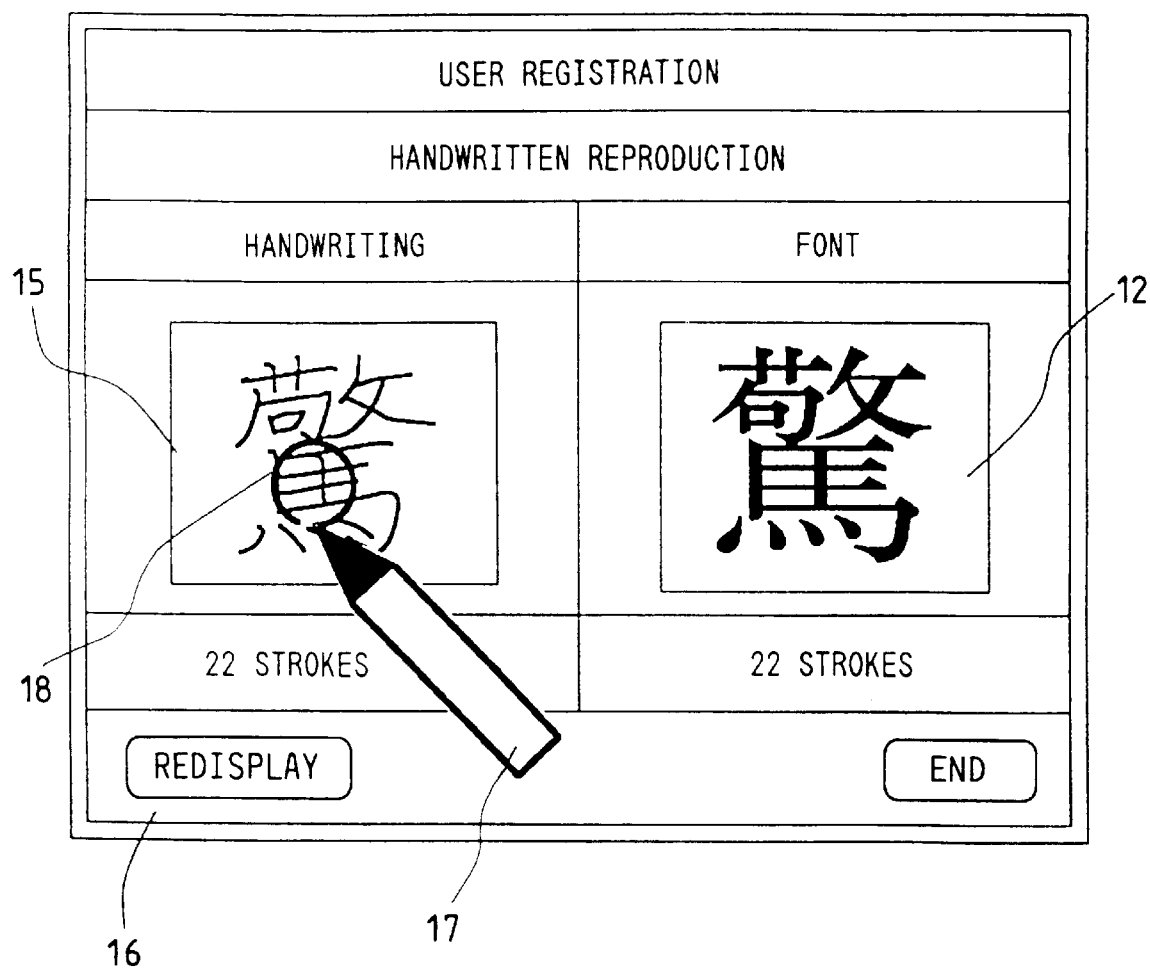
FIG. 70 is a view in which a gesture is drawn on the screen of FIG. 69 by a pen.

Examples of screen on the display 8 are illustrated in FIGS. 68–70.

The screen is created and displayed by the window manager 7.

FIG. 68 illustrates a screen for the user to register newly the hand in the new character register 21, corresponding to 204 in FIG. 3.

If a character is written by a pen on a handwritten input area 11 in new character registration screen 10, coordinate input unit 1 detects input coordinates thereof, input analyzer 2 analyzes the character input on the handwritten input area 11, and hand data memory unit 3 memorizes the hand data. Hand data is composed of the coordinate values making up the hand, a code indicating the termination of each stroke, and a code indicating the termination of all strokes.

By selecting one of the characters displayed on character selection area 13 by the pen, the selected character is made corresponding to hand data as above mentioned by a registration key 14, and registered in the user dictionary.

FIG. 69 illustrates a screen for redisplaying a user's registered hand by handwritten character reproducer 22 as designated in the user dictionary edit window 203, corresponding to 205 in FIG. 3.

Hand drawer 6 draws hand in a handwritten display area 15, based on hand data memorized in hand data memory unit 3.

Figure 71:
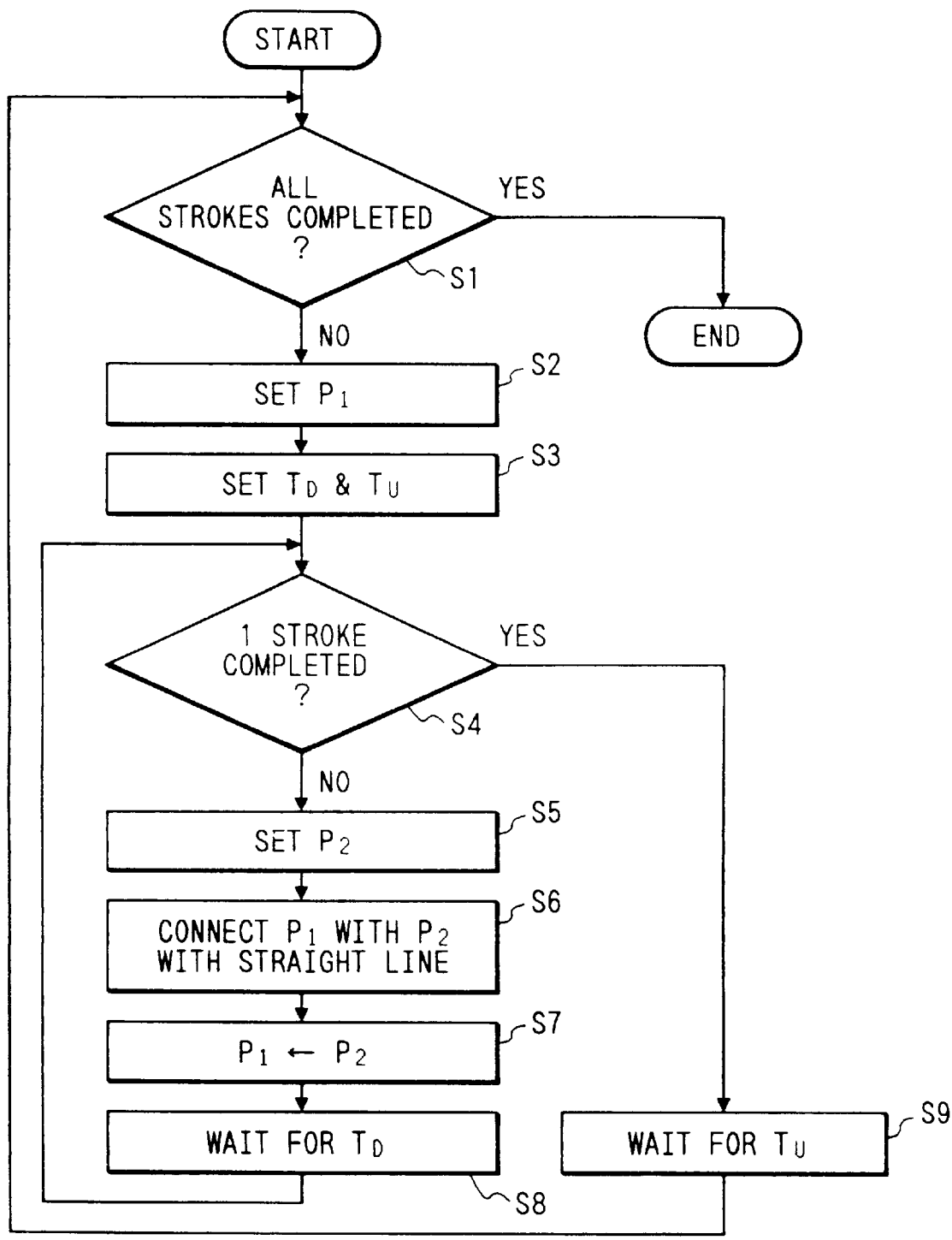
FIG. 71 is a flowchart illustrating an operation of handwriting display.

This operation will be described using a flowchart of FIG. 71.

At step S1, if a code indicating the termination of all strokes is detected from hand data, the program is ended, or otherwise proceeds to the subsequent operation.

At step S2, one coordinate point is read from hand data, and set to variable $P_1$.

At step S3, variables $T_D$ and $T_U$ representing the time are set.

At step S4, if a code indicating the termination of one stroke is detected, the program proceeds to step S9, or otherwise to the subsequent operation.

At step S5, one coordinate point is read from hand data and set to variable $P_2$.

At step S6, a coordinate point $P_1$ and a coordinate point $P_2$ are connected by the straight line. Upon a drawing command being sent from the hand drawer 6 to the window manger 7, the line is displayed on the display 8.

At step S7, the value of variable P2 is substituted for variable $P_1$.

At step S8, the program is caused to wait for a time $T_D$ for the speed adjustment for displaying the stroke, and then returns to step S4.

AT step S9, the program is caused to wait for a time $T_U$ for the time adjustment between strokes, and then returns to step S1.

With the above operation, hand data is displayed in the hand display area 15.

Herein, with constant time $T_D$ and $T_U$, the character is displayed at constant rate, but in this embodiment, only a part of hand which the user wants to confirm can be slowly displayed by changing the value of time $T_D$ and $T_U$ for the stroke designated by the user.

Redisplay of a part of hand designated for which the user wants to confirm the hand order will now be described.

As illustrated in FIG. 70, a track 18 is entered by a pen 17 on the handwritten display area 15, and recognized as a command signifying the stroke selection. A track accepted as a command is referred to as a gesture. Input analyzer 2 determines the meaning and attribute of a command from the position and shape of the gesture.

Character stroke designator 4 selects a partial character stroke of handwritten character 15 surrounded by the gesture 18. Display speed setter 5 sets the display speed for a stroke selected by the character stroke designator 4 and other strokes.

Figure 72:
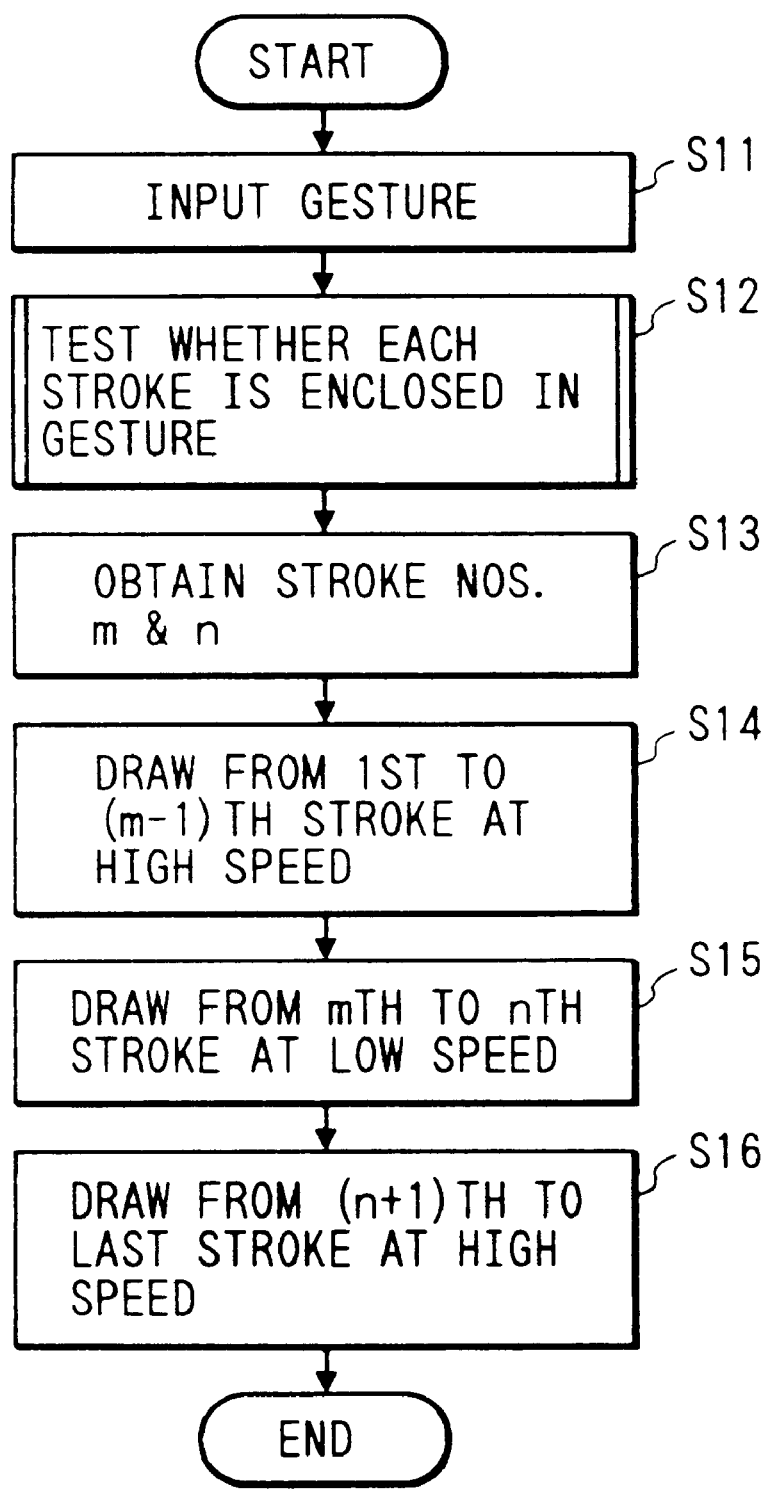
FIG. 72 is a flowchart illustrating an operation of selecting the character stroke and changing the drawing speed.

The operation of drawing at a drawing speed of each stroke set by the gesture of stroke selection will be described below with reference to a flowchart of FIG. 72.

At step S11, the input of a gesture is detected by coordinate input unit 1, and if a redisplay key 16 is designated, the following operation is initiated.

At step S12, the meaning of a gesture is analyzed by input analyzer 2. A test is performed to determine whether or not each stroke composed of a sequence of coordinate points memorized in hand data memory 3 is enclosed by the gesture. This test method will be described later with reference to FIG. 73.

At step S13, character stroke designator 4 calculates the minimum stroke number m and the maximum stroke number n among character strokes enclosed by the gesture. The stroke number signifies k at the k-th stroke. For example, for a character of eight strokes, there are strokes having stroke numbers 1 to 8, whereby if 3-rd, 5-th, 6-th and 7-th stroke are enclosed by the gesture, the minimum value m is equal to 3 and the maximum value n is equal to 7.

At step S14, hand drawer 6 draws first to (m−1)-th strokes at high speed. Display speed setter 5 sets the times $T_D$ and $T_U$ to respective predetermined values $T_{D1}$ and $T_{U1}$ to allow the drawing at high speed.

At step S15, hand drawer 6 draws m-th to n-th strokes at low speed. Display speed setter 5 sets the times $T_D$ and $T_U$ to respective predetermined values $T_{D2}$ and $T_{U2}$ to allow the drawing at low speed, where $T_{D2}>T_{D1}$ and $T_{U2}>T_{U1}$.

At step S16, hand drawer 6 draws (n+1)-th to final strokes at high speed.

The test method of whether or not each character stroke is enclosed by the gesture at step S12 will be now described in detail.

First, take notice of one point among the points making up each character stroke.

Figure 73:
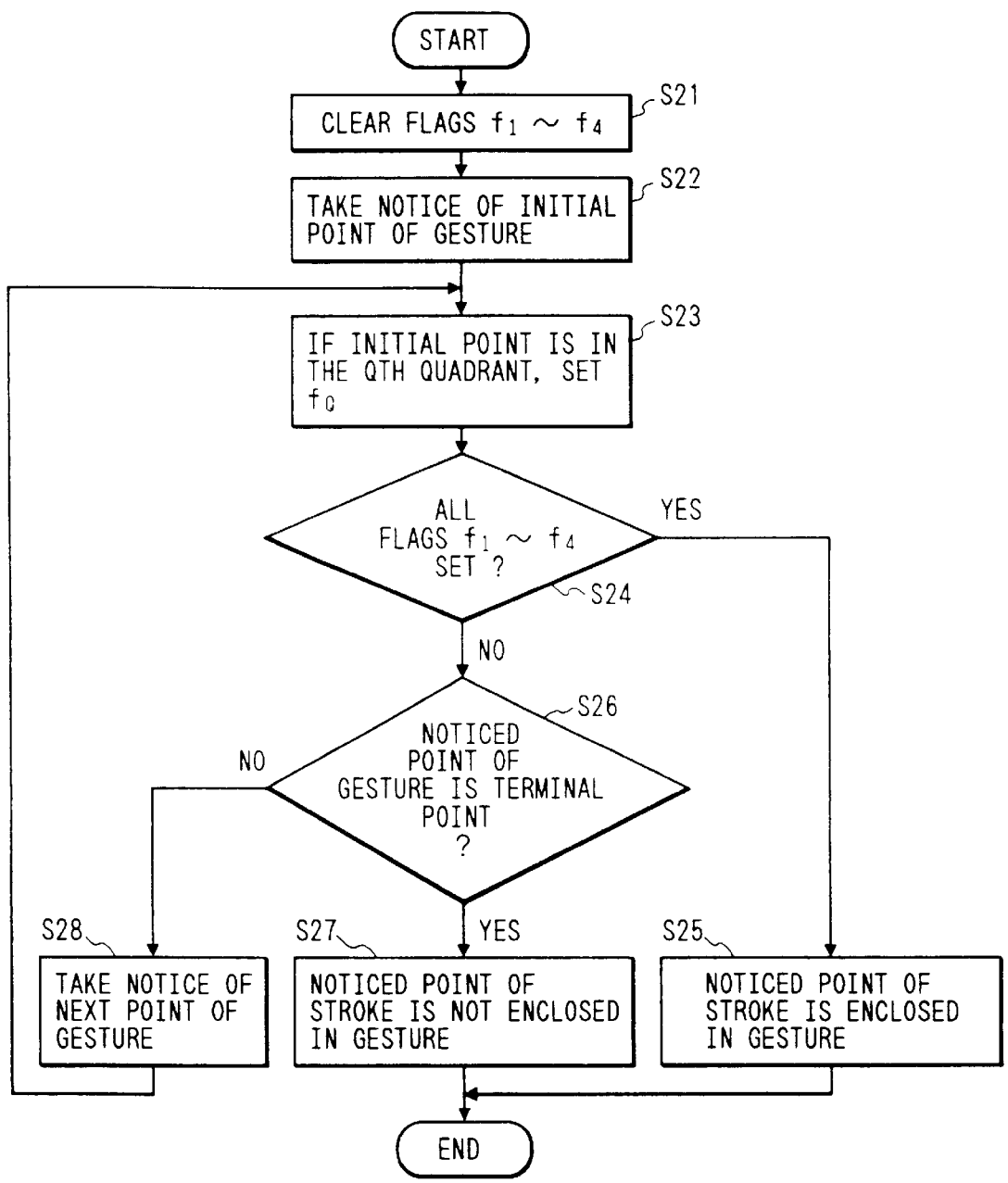
FIG. 73 is a flowchart of the discrimination method of whether or not the noticed point of the character stroke is surrounded by the gesture.

A method of investigating whether or not the notice point is enclosed by the gesture will be described with reference to a flowchart of FIG. 73.

At step S21, flags $f_1$, $f_2$, $f_3$ and $f_4$ are all cleared.

At step S22, the initial point of the gesture is taken notice of.

At step S23, it is investigated which quadrant the notice point of the gesture resides in, when the notice point of a character stroke is assumed to be an origin. For convenience sake, the coordinate axis is also included in the quadrant. When the coordinate for the notice point of character stroke is assumed to be $(X_S, Y_S)$ and the coordinate for the notice point of gesture $(X_G, Y_G)$, the notice point of the gesture resides in the first quadrant if $X_G \geq X_S$ and $Y_G \geq Y_S$, the second quadrant if $X_G < X_S$ and $Y_G \geq Y_S$, the third quadrant if $X_G < X_S$ and $Y_G < Y_S$ or the fourth quadrant if $X_G \geq X_S$ and $Y_G < Y_S$. If it resides in the Q-th quadrant, flag $f_Q$ is set (Q=1, 2, 3, 4).

At step S24, if the flags $f_1$, $f_2$, $f_3$ and $f_4$ are all set, the program proceeds to step S25, or otherwise to step S26.

At step S25, it is judged that the notice point of the character stroke is enclosed by the gesture, and the program is ended.

At step S26, if the notice point of the gesture is a terminal point, the program proceeds to step S27, or otherwise to step S28.

At step S27, it is judged that the notice point of the character stroke is not enclosed by the gesture, and the program is ended.

At step S28, the next point of gesture is taken notice of, and the program returns to step S23.

Figure 74:
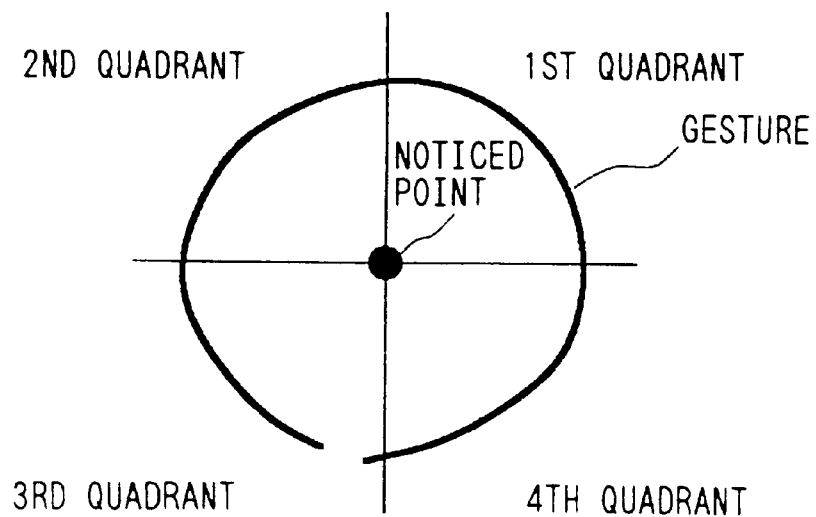
FIG. 74 is an example in which the noticed point is surrounded by the gesture.
Figure 75:
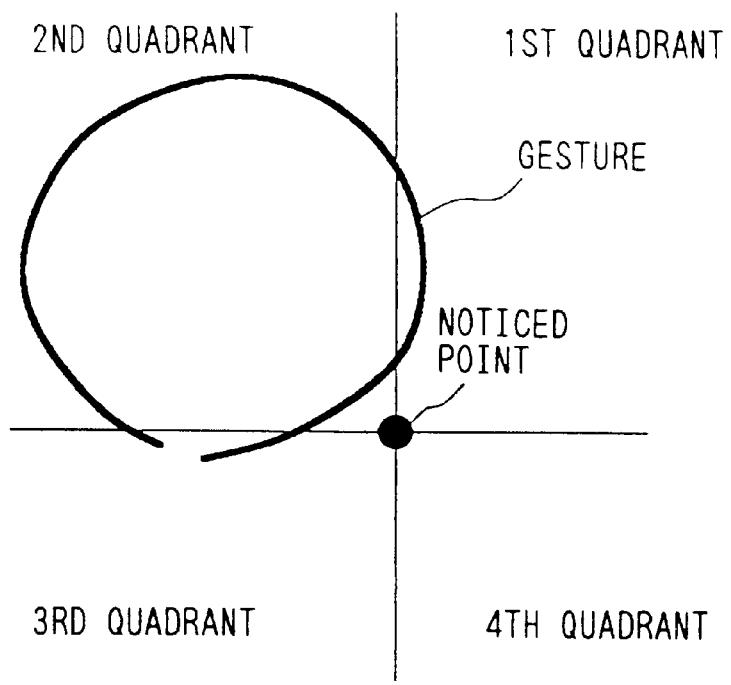
FIG. 75 is an example in which the noticed point of character stroke is not surrounded by the gesture.

FIG. 74 illustrates an instance where the notice point of the character stroke is enclosed by the gesture, and FIG. 75 illustrates an instance where the notice point of the character stroke is not enclosed by the gesture.

The program performs the above determinations while taking notice of each point making up the character stroke, wherein if any notice point of the character stroke is enclosed by the gesture, it is judged that the character stroke is enclosed by the gesture.

By adding a function of changing each value of time $T_{D1}$, $T_{U1}$, $T_{D2}$ and $T_{U2}$ to the above-described function, it is possible to confirm the hand at a desired speed of the user. For example, by setting $T_{D1}$ and $T_{U1}$ to 0, the stroke for which the confirmation for hand is unnecessary can be drawn almost instantaneously, resulting in elimination of wasteful time.

Also, if only the selected stroke is particularly necessary, the display color of the selected stroke may be changed, or the selected stroke only displayed.

In this embodiment, when redisplaying the hand data in accordance with the order of strokes, it is possible to designate a part of hand for which the user wants to confirm for the stroke in a simple operation.

An example of involving a device of displaying the font in accordance with the correct order of strokes will be described below.

Figures 76, 77:
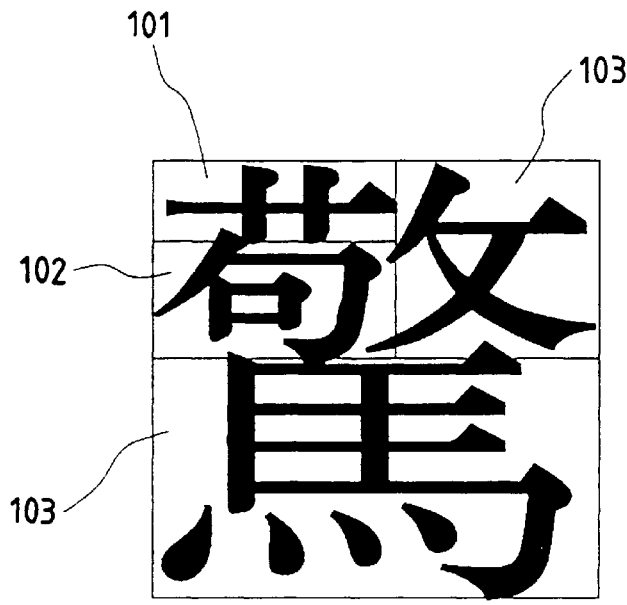
FIG. 76 is a review illustrating each partial pattern of a character "鬱" on the font display area.
FIG. 77 ia table illustrating the stroke number of each partial pattern of the character "鬱", and its location information.

FIG. 76 is a view illustrating a font display area 12 of a hand display device of FIG. 2.

In FIG. 76, a character "第" is displayed in the font display area 12, and divided into four partial sections 101 to 104.

As illustrated in FIG. 77, partial pattern 101 involves the first to third strokes, partial pattern 102 involves the fourth to eighth strokes, partial pattern 103 involves the ninth to twelfth strokes, and partial pattern 104 involves the thirteenth to twenty second strokes. Also, in FIG. 77, the positions of the left edge, right edge, top edge and bottom edge of each partial pattern are listed. This font display area is equally divided longitudinally and transversely into 16 sections, which is indicated by the numerical value of 0 to 15.

Note that the number of partial patterns and the position are different depending on the character to be displayed, the numerical values being memorized for each character as in FIG. 77.

In this embodiment, if a gesture is drawn with the pen 17 on the partial pattern of font display area 12, only the partial pattern over which the pens has passed is displayed slowly, and other partial patterns are displayed rapidly.

Figure 78:
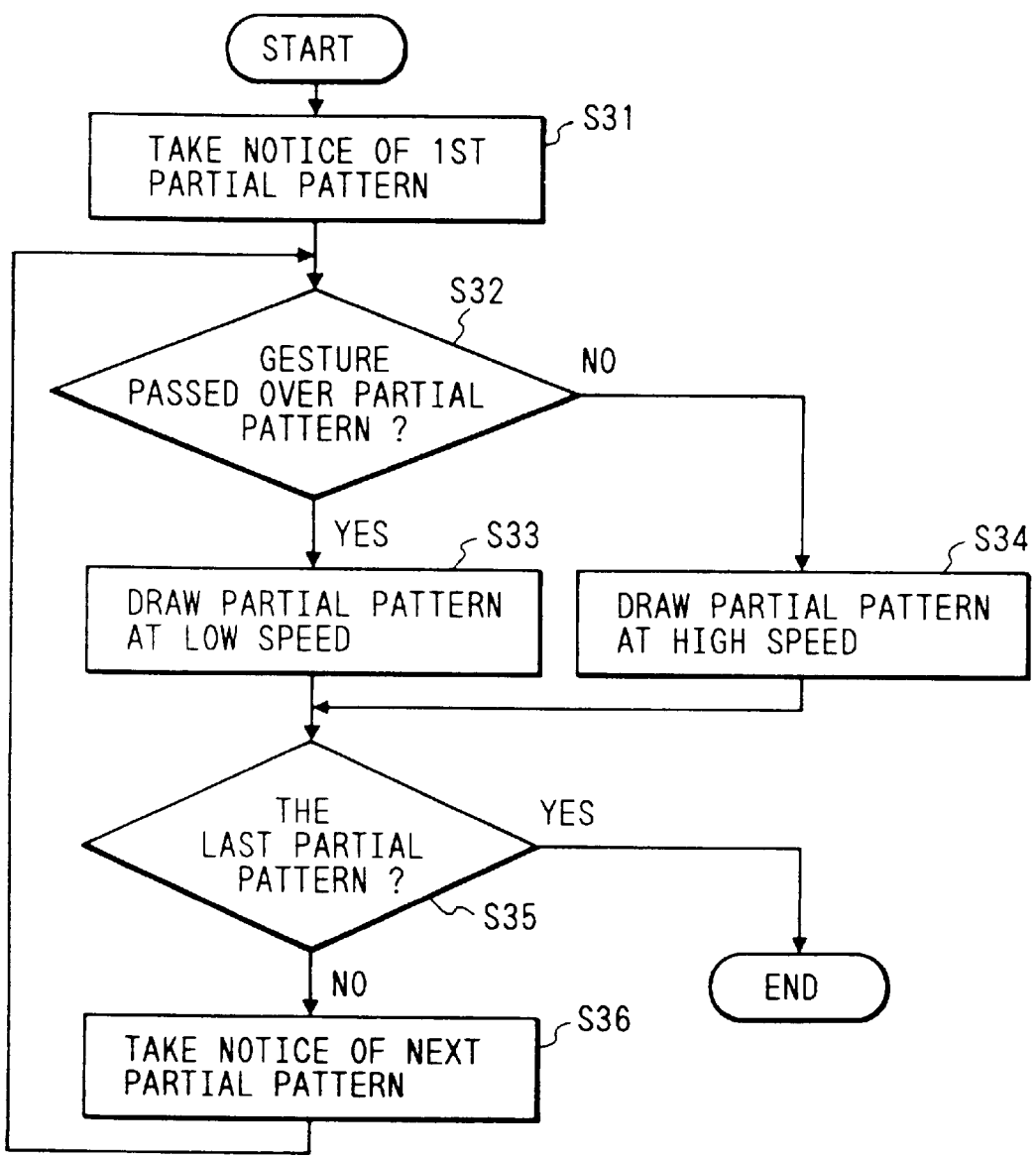
FIG. 78 is a flowchart illustrating an operation.

The operation of this embodiment will be described below using a flowchart of FIG. 78.

At step S31, the first partial pattern is first taken notice of.

At step S32, a check is made to determine whether or not the gesture has passed over the partial pattern noticed. If any one point of the coordinates making up the gesture is included between the left edge and right edge and between the bottom edge and top edge, it is judged that the gesture has passed over the partial pattern. If passed, the program proceeds to step S33, or otherwise to step S34.

At step S33, each stroke making up the partial pattern is displayed at low speed.

At step S34, each stroke making up the partial pattern is displayed at high speed.

At step S35, if the partial pattern is last, the processing is ended.

At step 36, the next partial pattern is taken notice of, and the program returns to step S32.

Usually, it is often demanded that the stroke for a certain partial pattern be known. In this embodiment, when redisplaying the font in accordance with the order of strokes, a part of the hand for which the stroke is confirmed can be designated in simple manner by memorizing the positional information of the partial pattern for each character.

Embodiment 6

A sixth preferred embodiment of the present invention will be now described in detail with reference to FIGS. 3, 7, 8, 10, 11, 13, 14, 16, 18–21, 24, 30, 38–46, and 81–87.

FIG. 30 is a schematic configurational diagram illustrating the configuration of an information processing apparatus according to one embodiment of the present invention. In the same figure, reference numeral 1 represents a CPU for controlling the whole apparatus, wherein various processings are performed in accordance with programs stored in ROM 2. Reference numeral 2 represents a ROM for storing a control program, an error processing program, and various programs operating in accordance with the flowcharts as hereinafter described. Reference numeral 3 represents a RAM for use as the work area of various programs and the temporary save area at the time of error processing. In this RAM are stored various data bases, including dictionaries for use with the recognition operation, as will be described later, a user dictionary 106, a user name index file 107, a character type file 108, and a character standard stroke number data base 109. Reference numeral 4 represents a coordinate input unit having a transparent coordinate input plate, not shown, and a pen, not shown, for designating the position of a coordinate point on the coordinate input plate, wherein electromagnetic induction or ultrasonic vibration is used in detecting the position of a coordinate point. Reference numeral 5 represents a VIDEO RAM (hereinafter referred to as "VRAM") having a memory corresponding one by one to the coordinate point on the coordinate input plate and storing bit information of a coordinate point input on the coordinate input plate or bit information of a dot calculated based on the coordinate point as will be described later. Reference numeral 6 represents a display for displaying a bit image based on bit information stored in VRAM 5, wherein this display 6 uses an LCD but may be an EL element or CRT, for example. On this display 6, a variety of windows, as will be described later, are displayed.

Figure 81:
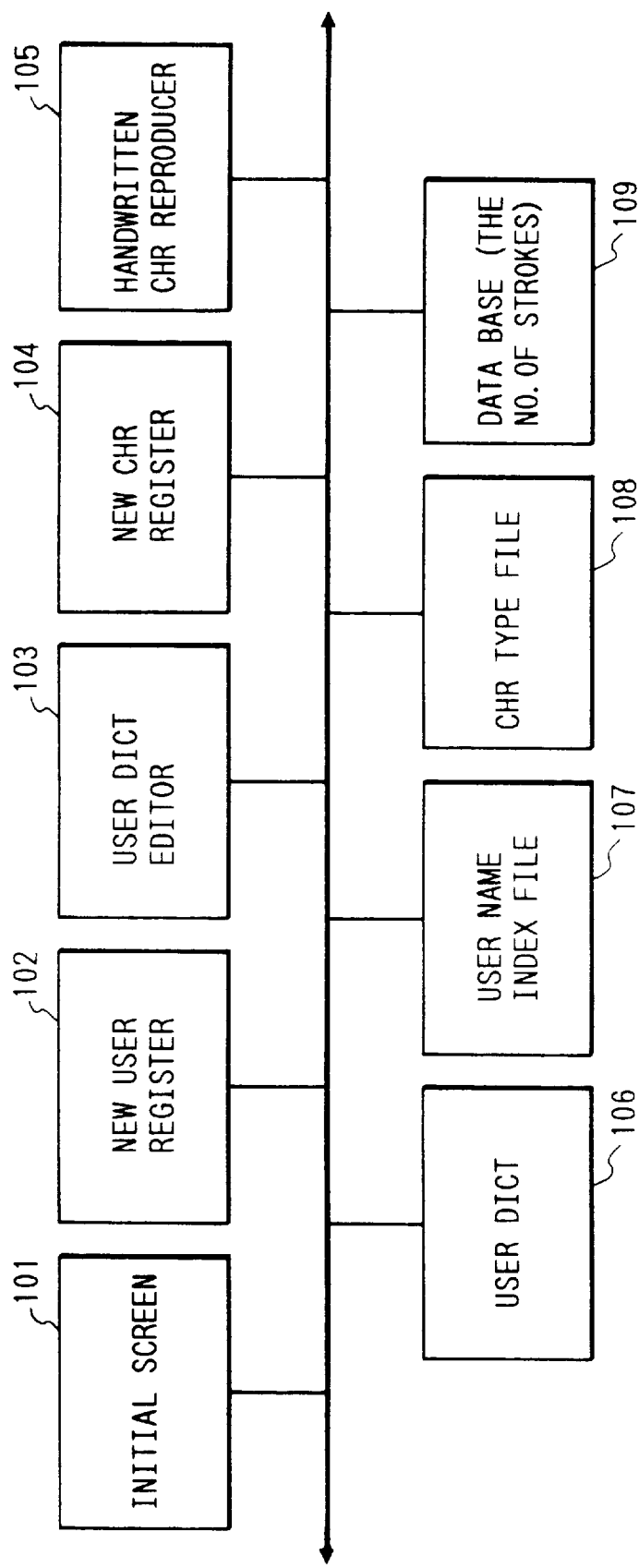
FIG. 81 is a block diagram illustrating the configuration of a user registration application.

FIG. 81 is a configuration block diagram of a user registration application for implementing the present invention. Reference numerals 101 to 106 represent units each serving as a functional element of user registration in on-line character recognition, the units being classified into a window application execution section (101 to 105) with GUI (Graphical User Interface) and a dictionary section (106 to 109).

Initial screen 101 allows for the display of the list of the registered users, and the confirmation for the owner of the user dictionary presently set. It has other functions including a designating function for the mode of newly registering the user and the mode of editing registered character within user dictionary. New user register 102 effects the registration of a new user. User dictionary editor 103 displays the list of characters within the user dictionary, and allows for the designation of deletion or handwritten reproduction for each character. Also, it includes a designation function for newly registering the character handwritten by the user. New character register 104 carries out the character registration designated at the previous stage 103. Handwritten character reproducer 105 draw or reproduces the registered character designated at the previous stage 103 in the hand order. User dictionary 106 stores information of registered characters to implement the above functions. Herein, a plurality of users own different user dictionaries. User name index file 107 registers user names owning the user dictionary 106. Character type file 108 stores registerable character type data, and character standard stroke number data base 109 stores the standard stroke number for each character.

FIG. 3 is a window state transition diagram of user registration application. Reference numerals 201 to 205 represent windows for executing each function of FIG. 81, wherein each window, the example of which will be described later, appears on the display 6. Reference numeral 206 represents a system to which the control is returned when this user registration application is ended. The arrows in the figure indicate the flow of control command to be entered with the button control in each window. The flow of control command and the transition of windows will be described below using FIG. 3.

If a "new user registration" command is issued in new item window 201, a new user registration window 202 appears newly in the form of a pop-up window. If a "registration & end" command is issued in the new user registration window 202, this pop-up window disappears, and the control is returned to the new item window 201. If a "user dictionary edit" command is issued in the new item window 201, the new item window 201 disappears, and a user dictionary edit window 203 appears newly. Herein, if a "new character registration" command is issued, a new character registration window 204 appears in the form of a pop-up window. The character registration operation on this window can be repeatedly executed unless an "end" command is issued. If the "end" command is instructed after the character is registered, the new character registration window 204 disappears, and the control is returned to the user dictionary edit window 203. A "character delete" command can be executed plural times in the user dictionary edit window 203. Further, if a "handwritten reproduction" command is issued, a handwritten character reproduction window 205 appears in the form of a pop-up window. At the same time when the window is displayed, the reproduction is started, whereby the use of a "redisplay" command allows for the redisplay repetitively. The handwritten character reproduction window disappears by issuing the "end" command, and the control is returned to the user dictionary edit window. If the "end" command is issued in the user dictionary edit window 203, the window of its own disappears and the new item window 201 appears again. Accordingly, it is only when the "end" command is issued in the initial item window 201 that the user registration application can be ended.

Note that the number of windows in the user registered application is two when the pop-up window of window 202, 204 or 205 appears, and one when the pop-up window of window 201 or 203 appears, as described above.

The details of the function in each window and the process flow will be now described with reference to the drawings of FIG. 38 and beyond.

First, the process flow in the initial item window will be described using FIG. 18 and a flowchart of FIG. 38. In FIG. 18, reference numeral 1701 represents a message display area, reference numeral 1702 represents a user name list display and user dictionary owner display area, reference numeral 1703 represents a scroll bar for use when registered users can not be accommodated within one screen, and reference numerals 1704 to 1707 represent buttons for calling a function by a pen tap.

If the user registration application is started, a window is created at step 301, whereupon a registered user name is read from the user name index file 107. This user name index file is a disk file having a structure as shown in FIG. 24, and which is readable and writable. The created window is as shown in FIG. 18. At step 302, the owner of a user dictionary set in the system is discriminated. If the owner is discriminated, the user who is an owner of the user dictionary is marked in the user name display area 1701 at step 303. For example, the user whose user name is "Arai" is an owner in FIG. 18. If the processing up to this point is ended, the procedure waits for a command instruction by the user at step 304. If the user name is selected directly by a pointing device such as a pen, the change of the owner of the user dictionary is demanded to the system at step 308 to change the setting. For other operations with the button command, if a "user dictionary edit" button 1704 is depressed (306), the control is transferred to a user dictionary edit routine, if a "new user registration" button 1705 is depressed (307), the control is transferred to a new user registration routine, and if a "cancel" button 1706 is depressed, the setting change of the user dictionary with the user name selection as performed before this point is invalidated, and the user dictionary setting is restored to the state before starting the application. If an "end" button 1707 is depressed (305), this user registration application is ended, and the control is returned to the system.

The process flow in the new user registration window will be described below with reference to FIG. 19 and a flowchart of FIG. 39. In FIG. 19, reference numeral 1801 represents a user name input area for inputting the user name, reference numeral 1802 represents a cancel function button for canceling the input of a user name, and reference numeral 1803 represents a registration & end function button for registering the input user name and ending this window.

If a "new user registration" command 1704 in the previous initial item window is instructed, a pop-up window as shown in FIG. 19 is displayed (401). Then, the operation is placed in a wait state for a command to be instructed by the user. If an event signal by a pen-down operation is detected in user name input area 1801 (404), an existing recognition routine is called. This routine subjects a character hand drawn in the user name input area to the on-line character recognition process to convert character data to character code (407). If a "registration & end" button command 1803 is instructed, the user name input and converted in the user name input area is determined as a new user name which is then additionally registered to the user name index file 107 (406). Thereafter, the current window is erased, and the control is returned to the initial item window again. On the other hand, if a "cancel" button command 1802 is instructed, the characters entered into the user name input area are all deleted (408), and the operation is placed again in a wait state for a user name input command.

The process flow in the user dictionary editor will be described below with reference to FIG. 45 and a flowchart of FIG. 40. In FIG. 45, reference numeral 2101 represents a message display area, reference numeral 2102 represents a registered character list display area, reference numeral 2103 represents a scroll bar which allows more registered characters to be displayed, and reference numerals 2104 to 2108 represent pen tap responsive function calling buttons.

If a "user dictionary edit" button 1705 is depressed in the previous initial item window, a user dictionary 106 designated is first copied and stored separately (512). This provides for a back up copy if the dictionary edit operation is canceled. Then, the user dictionary is opened to read character codes within the user dictionary into a buffer area (502). Herein, to make characters within the user dictionary to correspond one-to-one to displayed characters, a character code correspondence table is created (601 in FIG. 7). For example, when six characters are registered, the correspondence table is as shown in FIG. 46. This character code correspondence table is created because if a multiplicity of dictionary character data with the same character code exist, the retrieval of the dictionary data is not allowed uniquely only with the information of character code in the editing of character with the "delete" or "reproduce" command. User dictionary edit window as illustrated in FIG. 46 is displayed based on this character code correspondence table (503). A character code read at this time is displayed in the registered character list display area 2101 (504). Thereafter, the operation is placed in the wait state for a command instructed by the user (505). If a signal by a pen down operation is detected in the registered character list display area, a character located by a pen down operation is selected (506). The display number on the character code table is obtained from positional information of the selected character. The storage location of dictionary character data practically stored in the user dictionary is determined from its display number to obtain dictionary character data to be edited. If a "character registration" button command 2104 is designated (507), the control is transferred to a new character registration routine (701 in FIG. 8). If a "character delete" button command 2105 is designated (509), a discrimination is made as to whether or not the character in the registered character list display area is selected (801 in FIG. 41). If not selected, the operation returns to the wait state for a command instruction (505). If already selected, the dictionary data storage area of character to be deleted is located using the character code correspondence table as previously noted. When it is found, the dictionary character data stored in the actual user dictionary is deleted (802). At the same time when the content of the user dictionary is changed, the character code correspondence table is also changed to update the character display of registered character list display (504). If a "handwritten reproduction" button 2106 is depressed (509), the control is transferred to a handwritten reproduction routine when there is a character selected or the operation is placed in the wait state for a character to be selected when there is no character selected (901). If a "cancel" button command 2107 is designated (510), a discrimination is made as to whether or not the character in the registered character list display area is selected (1001 in FIG. 11). If any character is selected, the character is invalidated, the display is placed in a character unselected state (1002), and the content of registered dictionary is restored to the original state before starting the dictionary edit window (1003). With this operation, the editing is enabled to restart. An "end" button command 2108 erases this user dictionary edit window, and returns the control to the previous initial item window.

The process flow of the new character register will be described below using FIGS. 20 and 21 and a flowchart of FIG. 42. In FIG. 20, reference numeral 1901 represents a message display area, reference numeral 1902 represents a handwritten character input area, reference numeral 1903 represents a font character input area, reference numeral 1904 represents an input code list area, reference numeral 1905 represents a scroll bar which allows more character codes to be displayed, and reference numerals 1906 to 1908 represent function calling buttons by a pen tap.

If a "character registration" 2104 is designated in the previous user dictionary editor, a skeleton of a screen as illustrated in FIG. 20 is created for the display in the form of pop-up window (1101). By the character registration herein used is meant a task for assigning character data by the user's original handwriting to a corresponding character code. Hence, a data input area for acquiring user's handwritten data and a character code input area corresponding thereto are necessary, wherein "handwritten" column 1902 is a handwritten data input area and "font" column 1903 is a character code input area, as illustrated in FIG. 20. Reference numeral 1904 of FIG. 20 represents an input code list for inputting the character code, the character code being input by selecting it from the list. Accordingly, the registerable character types must be displayed in the input code list, for which it is necessary that a character type file storing the registerable character types is created beforehand (1109). The registerable character types are displayed by reading this file (1102). If this display is ended, the operation waits for a command instruction from the user (1103). If a pen down input signal input by the user is detected in the "handwritten" column, its hand data is stored as a set of two-dimensional coordinates in a buffer area (1201 in FIG. 13), and drawn in the "handwritten" column at the same time. FIG. 20 illustrates a state where the user has entered a handwritten character corresponding to a font "㦮" as indicated at 1902. The input of corresponding character code is performed in such a manner as to select a character code from the input code list, temporarily store it in the buffer area, and then get it (1301 in FIG. 14). The selected character is displayed in larger scale in the "font" column at every time (1302). If a "registration" button command 1906 is designated, it is confirmed whether or not both the handwritten character in the "handwritten" column and the character in the "font" column are input (1401). If both are input, the creation of a recognition dictionary for that character is started (1403). The creation of the recognition dictionary is accomplished by creating the standard pattern from character data by a well-known method. As a result, this standard pattern is newly created in the user dictionary, or added thereto (1404). If the input of hand data and character code is insufficient, a warning is generated (1402), and the same process is repeated until both the handwritten character data and the character code of the character to be registered are input. If a "cancel" button command 1907 is designated, both the character data and the character code input in the "handwritten" and "font" columns are invalidated (1501 in FIG. 16), and the input is enabled again. FIG. 21 illustrates a state where a character "㦮" has been entered by selecting it from the character code list. The "end" button command 1908 serves to erase this new character registration window and return the control to the user dictionary editor.

Figure 82:
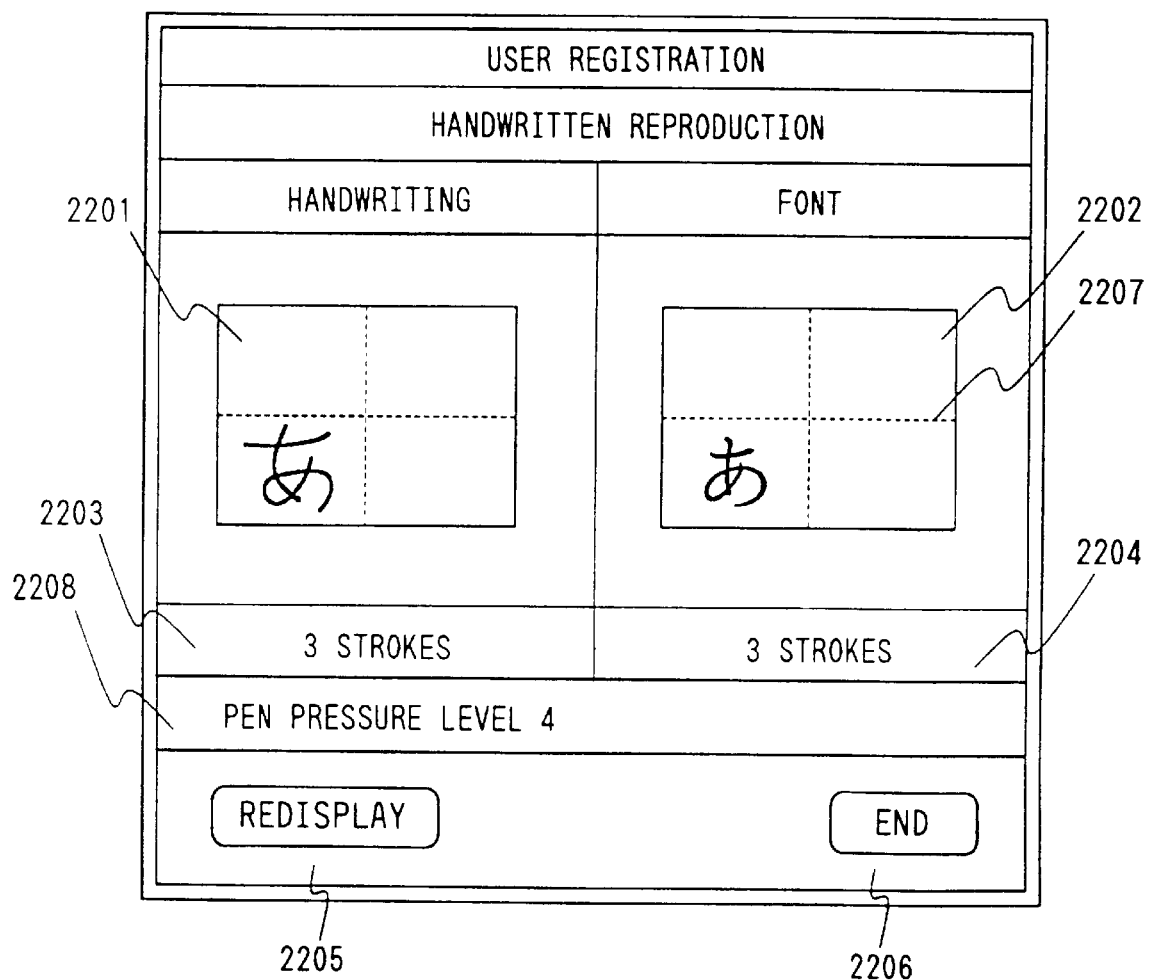
FIG. 82 is a handwritten character reproduction screen window (2).

The process flow in the handwritten character reproducer will be described below using FIG. 82 and a flowchart of FIG. 44. In FIG. 82, reference numeral 2201 represents a handwritten character reproduction area, reference numeral 2202 represents a font display area destined for the handwritten character, reference numeral 2203 represents a hand stroke number display area of the handwritten character, reference numeral 2204 represents a standard stroke number display area of a subject font, reference numerals 2205, 2206 represent function calling buttons by a pen tap, and reference numeral 2207 represents a character position reference line. Reference numeral 2208 represents pen pressure information of a handwritten character.

Herein, the user dictionary for use with the handwritten character reproduction will be described below.

Figure 83:
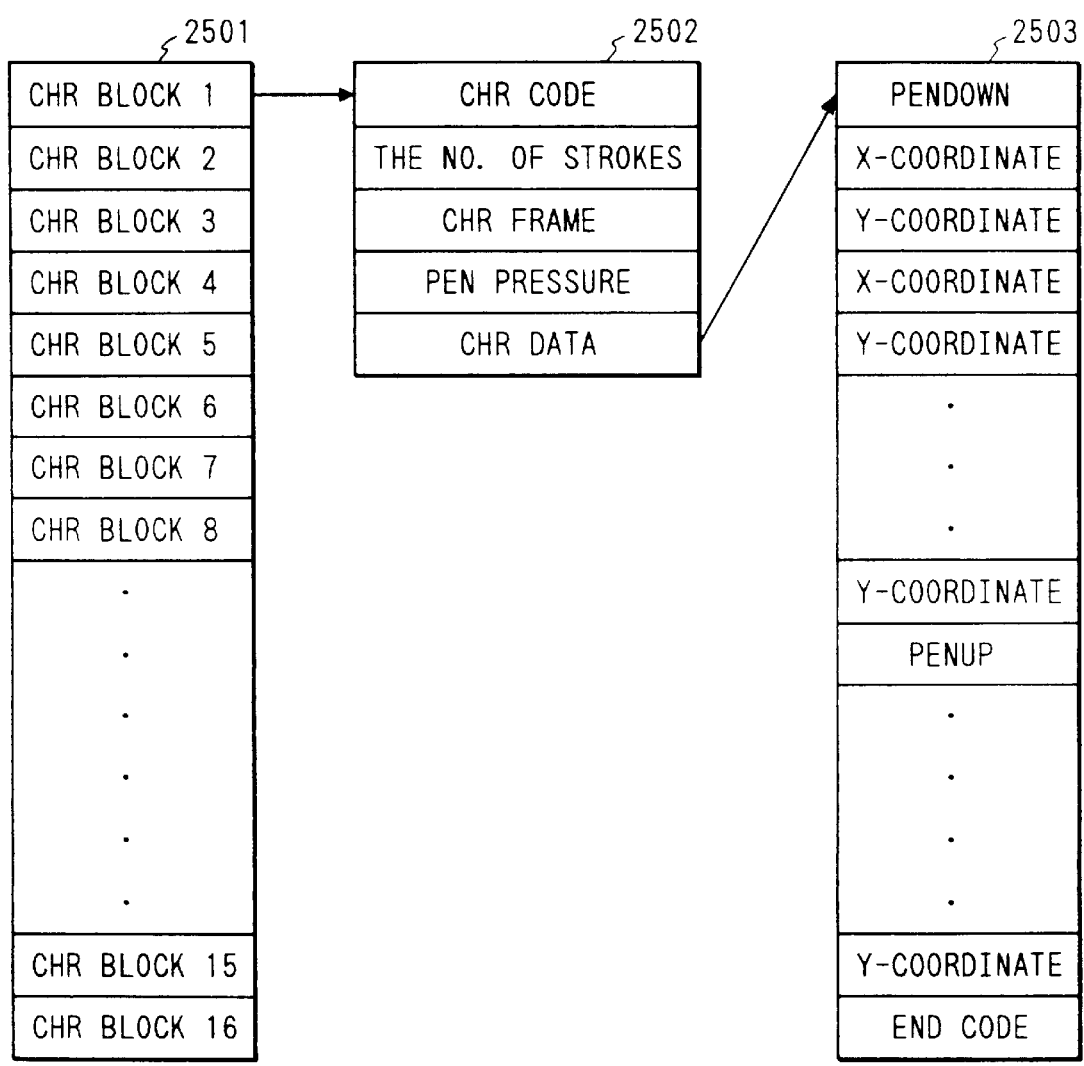
FIG. 83 is a recognition dictionary data format example (1).
Figure 84:
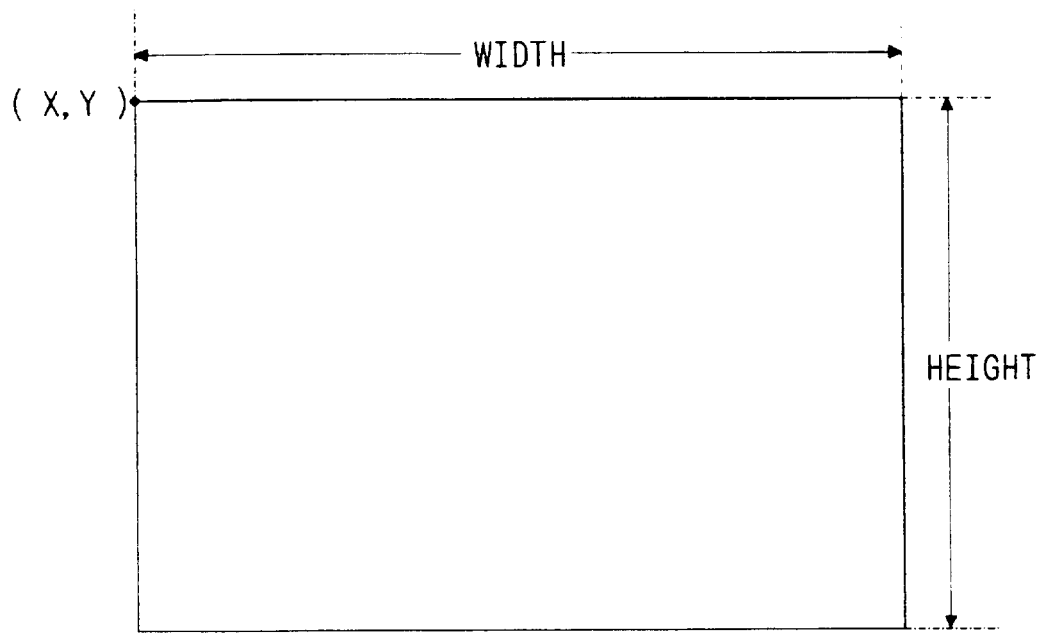
FIG. 84 is an explanation view of a character frame.

FIG. 83 is a diagram illustrating the structure of a recognition dictionary. The dictionary consists of a set of character blocks including a character code and other information, which is arranged as shown at 2501. The content of each character block is as illustrated in 2502. Each information contained in 2502 has been introduced and processed beforehand at the creation of standard pattern. A "character frame information" in 2502 stores information of a character frame as shown in FIG. 84. That is, "(X, Y)" is an absolute coordinate at the left upper corner of a character frame, "width" is a width of a frame, and "height" is a height of a frame. Also, the pen pressure information is an average pen pressure value of a character obtained from an input tablet. At the last location in the character block is stored character data, including a two-dimensional coordinate, as well as each code of pen-up, pen-down and termination operations. The coordinate of the character data is as it is input and stored, without undergoing any processing, and thus has a value with the left upper corner of the character frame defined as an origin.

If a "handwritten reproduction" command button 2106 is designated in the previous user dictionary editor, a skeleton of a screen as illustrated in FIG. 82 is created and displayed in the form of pop-up window (1602). Since it is already confirmed that the character code is selected in the previous user dictionary editor, the enlarged font of the character is first displayed in the font area (1603). The number of strokes of the character is displayed together with the font display (1603), which is accomplished by preparing for a data base for a character standard stroke number in which the standard stroke number is described for each character (1607), and retrieving the subject character. To reproduce the character data within the user dictionary requires temporary extraction of dictionary data corresponding to the selected character, which is enabled by utilizing the previous character code correspondence table. Since the dictionary data of the corresponding character contains coordinate points as well as information of pen down and pen up operations, it is possible to determine of which stroke number the coordinate point belongs to a hand. Using this, the handwriting can be drawn by linearly connecting the coordinate points sequentially within the same stroke (1604). The number of strokes for hand data is defined by counting how many times the pen down operation is made, and displayed (1605). Also, pen pressure information which is provided in the character block within the user dictionary is displayed (2208).

If the button command (1606) is "redisplay" 2205, the reproduced drawn data is erased, and hand reproduction is performed again by using dictionary data. If an "end" button command 2206 is designated, this handwritten character reproduction window is erased, and the control is transferred to the registered character editor. FIG. 82 illustrates a view where the character " あ " is selected and character hand is half reproduced.

Note that the window creation and signal detection as described in the text can be accomplished by using any of well-known techniques. While a pen was adopted as the pointing device, it is apparent that a mouse can be operated to enable the selection and entry.

While means for reproducing the character within the recognition dictionary as previously described draws sequentially character data present within the recognition dictionary which is stored in no processed state (raw data) to reproduce the character hand faithfully, a method will be now described in which a recognition dictionary for use with character hand reproduction is made of a different structure.

Figure 86:
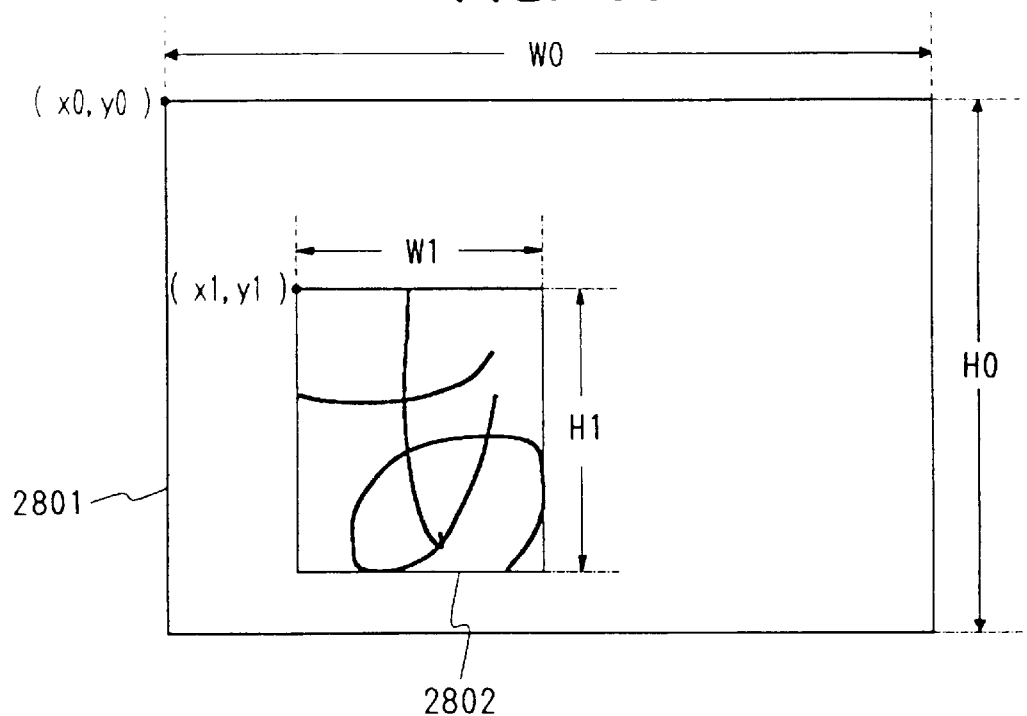
FIG. 86 is an explanation view of a character frame and a circumscribed frame.
Figure 85:
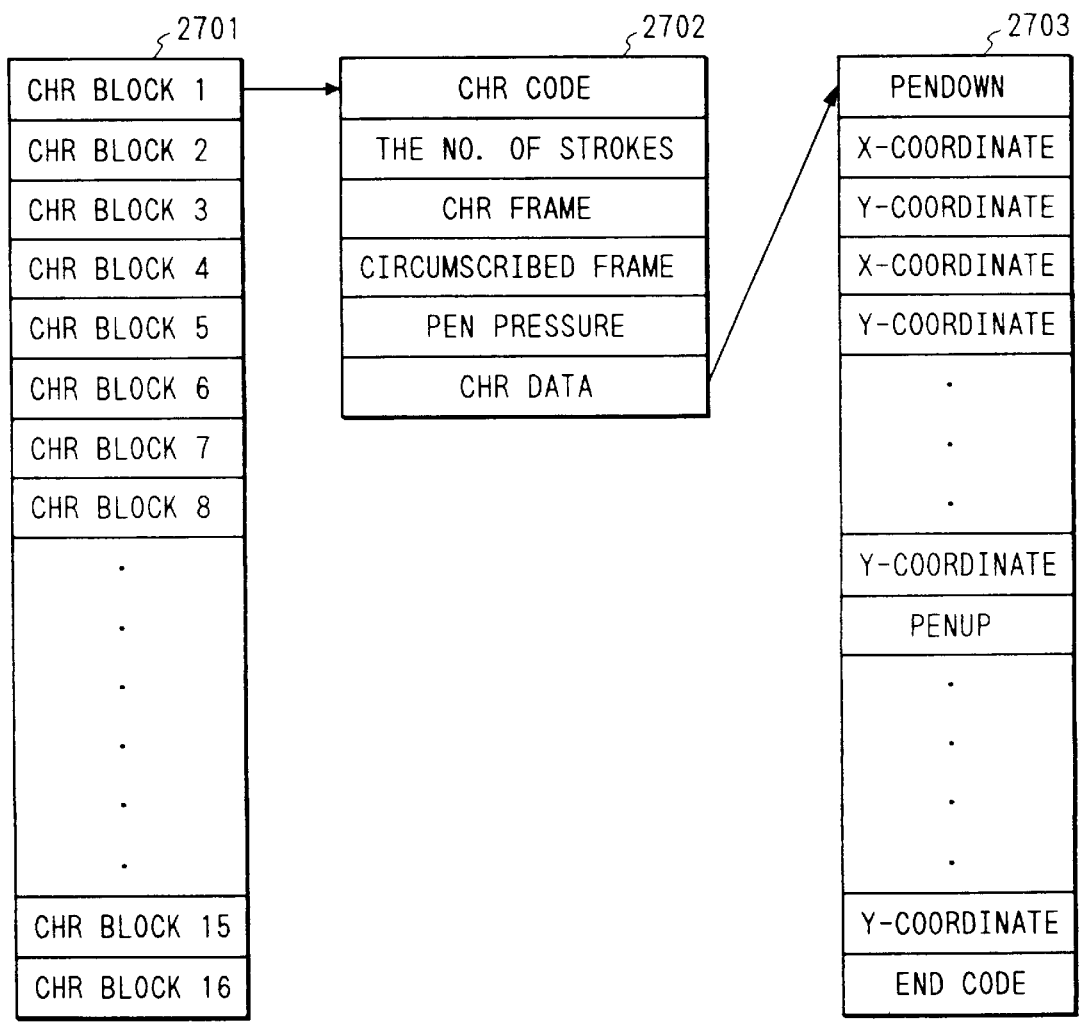
FIG. 85 is a recognition dictionary data format example (2).

First, the structure or recognition dictionary will be described using FIG. 85. Character block array 2701 is not different from that as previously described, but has a different structure for the character block. Character data is stored at the last location of character block 2701, each coordinate value of character data being a point coordinate having absorbed variations in the position and size at the creation of dictionary (2703). Since the information of position and size can not be obtained from character data, a circumscribed frame of entered character at the creation of dictionary is stored, in addition to character frame information, within the character block 2702. FIG. 86 is a view representing the portion regarding the character frame information and circumscribed frame information within the character block. Reference numeral 2801 represents a character frame and reference numeral represents a circumscribed frame of a character. As illustrated in embodiment 1, X0, Y0, W0 and H0 indicate absolute X and Y coordinates, located at the left upper corner of a character frame, character frame width and character frame height, and X1, Y1, W1 and H1 indicate absolute X and Y coordinates, located at the left upper corner of a character circumscribed frame, the character frame width and the character frame height. With the character block structure with the above information, a character reproducer as illustrated in FIG. 29 can be created. Reference numeral 2901 represents a handwritten character area, reference numeral 2902 represents a font character area, reference numeral 2903 represents a stroke number display area of a handwritten character, reference numeral 2904 represents a stroke number display area of a font character, reference numeral 2905 represents a redisplay button, reference numeral 2906 represents an end button, reference numeral 2907 represents a character frame, reference numeral 2908 represents a pen pressure display area for displaying the pen pressure, and reference numeral 2909 represents a character circumscribed frame. The output of a font character and a handwritten character can be performed in similar way as in embodiment 1. Also, the output of a circumscribed frame is enabled by utilizing the circumscribed frame information within the character block.

Note that the present invention may be applicable to either a system comprised of a plurality of equipments or a single equipment. It will be understood that the present invention is applicable to a system or apparatus to which a program for implementing the invention is supplied.

What is claimed is:

1. An information processing method using a recognition dictionary for recognizing a predetermined stroke pattern designated by a user as a specific character, said method comprising the steps of:

memorizing a usage frequency of recognition for each specific character; and displaying a list of the specific characters, wherein the specific characters are displayed with different density in accordance with the usage frequency of recognition.

2. An information processing method according to claim 1, wherein the usage frequency of recognition is the number of times the specific character is selected as a recognition candidate.

3. An information processing apparatus comprising:

a recognition dictionary which is used for recognizing a predetermined stroke pattern designated by a user as a specific character;

means for memorizing a usage frequency of recognition for each specific character; and means for displaying a list of the specific characters, wherein the specific characters are displayed with different density in accordance with the usage frequency of recognition.

4. An information processing apparatus according to claim 3, wherein the usage frequency of recognition is the number of times the specific character is selected as a recognition candidate.

5. A method according to claim 1, wherein the usage frequency is a relative actual usage frequency.

6. A method according to claim 1, wherein the recognition dictionary stores stroke patterns.

7. A method according to claim 1, wherein said stroke pattern is used for recognition of handwritten characters.

8. A method according to claim 7, wherein said usage frequency is updated whenever the recognition of handwritten characters is executed.

9. A method according to claim 1, wherein the usage frequency is displayed upon the list in said displaying step.

10. An apparatus according to claim 3, wherein the usage frequency is a relative actual usage frequency.

11. An apparatus according to claim 3, wherein the recognition dictionary stores stroke patterns.

12. An apparatus according to claim 3, wherein said stroke pattern is used for recognition of handwritten characters.

13. An apparatus according to claim 12, wherein said usage frequency is updated whenever the recognition of handwritten characters is executed.

14. An apparatus according to claim 3, wherein said display means displays the usage frequency upon displaying the list of specific characters.

15. An information processing method according to claim 1, wherein said list is displayed on a display screen of a liquid crystal display or a cathode ray tube in said displaying step.

16. An information processing apparatus according to claim 3, wherein said means for displaying comprises a display screen of a liquid crystal display or a cathode ray tube.

17. A computer-readable medium encoded with a program using a recognition dictionary for recognizing a predetermined stroke pattern designated by a user as a specific character, the program performing the steps of:

memorizing a usage frequency of recognition for each specific character; and displaying a list of the specific characters, wherein the specific characters are displayed with different density in accordance with the usage frequency of recognition.

18. A computer-readable medium according to claim 17, wherein the usage frequency of recognition is the number of times the specific character is selected as a recognition candidate.

19. An information processing method according to claim 1, further comprising a step of deleting information from the recognition dictionary.

20. An information processing apparatus according to claim 3, further comprising means for deleting information from the recognition dictionary.

21. A computer-readable medium according to claim 17, wherein the program further performs a step of deleting information from the recognition dictionary.

* * * * *

UNITED STATES PATENT AND TRADEMARK OFFICE
CERTIFICATE OF CORRECTION

PATENT NO. : 6,396,950 B1
DATED : May 28, 2002
INVENTOR(S) : Arai et al.

It is certified that error appears in the above-identified patent and that said Letters Patent is hereby corrected as shown below:

Column 3,
Line 14, right margin should be closed up.
Line 15, left margin should be closed up.

Column 6,
Line 37, "ia" should read -- is a --.
Line 61, "EMBODIMENT" should read -- EMBODIMENTS --.

Column 9,
Line 12, "203, appears." should read -- 203 appears, --.

Column 10,
Line 31, "back up" should read -- backup --.

Column 11,
Line 9, "if"" should read --if " あ "--.

Line 10, ""is" should be deleted.
Line 25, "t" should be deleted.

Column 12,
Line 7, "enable" should read -- enabled --.

Column 14,
Line 35, "characters" should read -- characters " 男 4 女 ".

Line 36, " か 代 " should be deleted.

Line 40, "of having" should read -- having -- and "i" should read -- is --.

Column 16,
Line 13, right margin should be closed up.
Line 14, left margin should be closed up.

Column 17,
Line 67, "At" should be deleted.

Column 20,
Line 4, "ansition" should read -- transition --.

UNITED STATES PATENT AND TRADEMARK OFFICE
CERTIFICATE OF CORRECTION

PATENT NO. : 6,396,950 B1
DATED : May 28, 2002
INVENTOR(S) : Arai et al.

It is certified that error appears in the above-identified patent and that said Letters Patent is hereby corrected as shown below:

<u>Column 21,</u>
Line 55, "back up" should read -- backup --.

<u>Column 22,</u>
Line 15, "FIG. 18)." should read -- FIG. 8). --.
Line 36, "FIG. 37)." should read -- FIG. 11). --.

<u>Column 23,</u>
Line 45, "front" should read -- font --.

<u>Column 25,</u>
Line 35, "the the" should read -- the --.
Line 66, "RON 2" should read -- ROM 2 --.

<u>Column 29,</u>
Line 4, "back up" should read -- backup --.
Line 9, "3)." should read -- 7). --.

<u>Column 31,</u>
Line 17, "to, a" should read -- to a --.

<u>Column 32,</u>
Line 66, "latter," should read -- later, --.

<u>Column 33,</u>
Line 28, "section (106)." should read -- section (26). --.
Line 35, "lit" should read -- list --.

<u>Column 35,</u>
Line 11, "manger 7," should read -- manager 7, --.
Line 17, "AT" should read -- At --.

<u>Column 36,</u>
Line 20, $(X_S, Y_s)$" should read -- $(X_S, Y_S)$ --.
Line 27, "$(f_1, f_2 lf_3)$" should read -- $(f_1, f_2, f_3)$ --.

<u>Column 37,</u>
Line 9, "twenty second" should read -- twenty-second --.
Line 21, "pens" should read -- pen --.

UNITED STATES PATENT AND TRADEMARK OFFICE
CERTIFICATE OF CORRECTION

PATENT NO. : 6,396,950 B1
DATED : May 28, 2002
INVENTOR(S) : Arai et al.

It is certified that error appears in the above-identified patent and that said Letters Patent is hereby corrected as shown below:

Column 38,
Line 41, "draw" should read -- draws --.

Column 40,
Line 42, "back up" should read -- backup --.

Column 43,
Line 59, "numeral" should read -- numeral 2802 --.

Signed and Sealed this

Eighteenth Day of March, 2003

JAMES E. ROGAN
*Director of the United States Patent and Trademark Office*